US010644491B2

(12) United States Patent
Korcz et al.

(10) Patent No.: US 10,644,491 B2
(45) Date of Patent: May 5, 2020

(54) ELECTRICAL BOX CABLE CONNECTOR

(71) Applicant: Hubbell Incorporated, Shelton, CT (US)

(72) Inventors: Krzysztof W. Korcz, Granger, IN (US); Steven James Johnson, Buchanan, MI (US)

(73) Assignee: Hubbell Incorporated, Shelton, CT (US)

( * ) Notice: Subject to any disclaimer, the term of this patent is extended or adjusted under 35 U.S.C. 154(b) by 10 days.

(21) Appl. No.: 16/159,929

(22) Filed: Oct. 15, 2018

(65) Prior Publication Data

US 2019/0115735 A1    Apr. 18, 2019

Related U.S. Application Data

(60) Provisional application No. 62/572,116, filed on Oct. 13, 2017.

(51) Int. Cl.
*H02G 3/16* (2006.01)
*H02G 3/12* (2006.01)
*H02G 3/22* (2006.01)
*H02G 15/10* (2006.01)
*H01R 13/58* (2006.01)
*H02G 3/08* (2006.01)
*H02G 3/06* (2006.01)

(52) U.S. Cl.
CPC ........... *H02G 3/16* (2013.01); *H01R 13/5816* (2013.01); *H02G 3/0691* (2013.01); *H02G 3/086* (2013.01); *H02G 3/0625* (2013.01); *H02G 3/083* (2013.01); *H02G 3/12* (2013.01); *H02G 3/22* (2013.01); *H02G 15/10* (2013.01)

(58) Field of Classification Search
CPC ........ H02G 3/16; H02G 3/0691; H02G 3/086; H02G 3/0625; H02G 3/083; H02G 3/12; H02G 3/22; H02G 15/10; H01R 13/5816
USPC ...................................................... 174/50.52
See application file for complete search history.

(56) References Cited

U.S. PATENT DOCUMENTS

| 2,708,122 | A |   | 5/1955  | Clark                   |
|-----------|---|---|---------|-------------------------|
| 2,967,722 | A | * | 1/1961  | Lifka ........ H01B 17/34 |
|           |   |   |         |              285/179.1  |
| 2,973,212 | A |   | 2/1961  | Rose                    |
| 3,006,661 | A |   | 10/1961 | McNeil                  |
| 3,858,151 | A |   | 12/1974 | Paskert                 |
| 4,012,578 | A |   | 3/1977  | Moran et al.            |
| 4,190,222 | A |   | 2/1980  | Appleton et al.         |
| 4,299,363 | A |   | 11/1981 | Datschefski             |
| 4,302,035 | A |   | 11/1981 | Ochwat                  |

(Continued)

OTHER PUBLICATIONS

International Search Report and Written Opinion mailed in PCT/US2018/055805 dated Jan. 31, 2019.

(Continued)

*Primary Examiner* — Timothy J Thompson
*Assistant Examiner* — Michael F McAllister
(74) *Attorney, Agent, or Firm* — Wissing Miller LLP

(57) ABSTRACT

An electrical box assemblies and cable connectors are provided. The cable connectors include a frame and a cable retaining member releasably secured to the frame. The cable retaining members releasably secure an electrical cable to an electrical box by engaging the sheathing of the electrical cable. The electrical box assembly includes an electrical box and at least one cable connector.

24 Claims, 41 Drawing Sheets

(56) References Cited

U.S. PATENT DOCUMENTS

| | | | |
|---|---|---|---|
| 4,304,957 A | 12/1981 | Slater et al. | |
| 4,350,839 A | 9/1982 | Lass | |
| 4,361,302 A | 11/1982 | Lass | |
| 4,605,816 A | 8/1986 | Jorgensen et al. | |
| 4,640,433 A | 2/1987 | Jorgensen et al. | |
| 4,880,387 A | 11/1989 | Stikeleather et al. | |
| 4,990,721 A | 2/1991 | Sheehan | |
| 5,118,057 A | 6/1992 | Martin | |
| 5,241,136 A | 8/1993 | Michaelis et al. | |
| 5,285,013 A | 2/1994 | Schnell et al. | |
| 5,374,017 A | 12/1994 | Martin et al. | |
| 5,422,437 A | 6/1995 | Schnell | |
| 5,442,141 A | 8/1995 | Gretz | |
| 5,594,207 A | 1/1997 | Fabian | |
| 5,607,323 A | 3/1997 | Foster et al. | |
| 5,789,706 A | 8/1998 | Perkins | |
| 6,043,432 A | 3/2000 | Gretz | |
| 6,080,933 A | 6/2000 | Gretz | |
| 6,091,023 A | 7/2000 | O'Donnell | |
| 6,114,630 A | 9/2000 | Gretz | |
| 6,143,982 A | 11/2000 | Gretz | |
| 6,175,078 B1 | 1/2001 | Bambardekar | |
| 6,335,488 B1 | 1/2002 | Gretz | |
| 6,380,483 B1 | 4/2002 | Blake | |
| 6,395,981 B1 | 5/2002 | Ford et al. | |
| 6,444,907 B1 | 9/2002 | Kiely | |
| 6,604,400 B1 | 8/2003 | Gretz | |
| 6,670,553 B1 | 12/2003 | Gretz | |
| 6,682,355 B1 | 1/2004 | Gretz | |
| 6,709,280 B1 | 3/2004 | Gretz | |
| 6,768,057 B2 * | 7/2004 | Blake | H02G 3/18 174/135 |
| 6,780,029 B1 | 8/2004 | Gretz | |
| 6,849,803 B1 | 2/2005 | Gretz | |
| 7,154,042 B2 * | 12/2006 | Auray | H01R 4/646 174/70 R |
| 7,154,054 B1 * | 12/2006 | Gretz | H02G 3/0666 174/655 |
| 7,214,890 B2 * | 5/2007 | Kiely | H02G 3/0683 174/659 |
| 7,226,309 B1 * | 6/2007 | Gretz | H01R 13/5808 174/660 |
| 7,238,894 B1 | 7/2007 | Gretz | |
| 7,304,251 B1 | 12/2007 | Gretz | |
| 7,329,144 B1 | 2/2008 | Gretz | |
| 7,390,979 B1 | 6/2008 | Johnson | |
| 7,432,443 B2 | 10/2008 | Johnson | |
| 7,459,643 B2 | 12/2008 | Johnson | |
| 7,495,184 B1 | 2/2009 | Gretz | |
| 7,576,290 B1 | 8/2009 | Korcz | |
| 7,645,947 B2 | 1/2010 | Kiely et al. | |
| 7,824,213 B1 | 11/2010 | Korcz et al. | |
| 7,922,020 B2 | 4/2011 | Wronski | |
| 8,124,891 B1 | 2/2012 | Gretz | |
| 8,646,813 B1 | 2/2014 | Shemtov | |
| 8,664,543 B2 | 3/2014 | Chen | |
| 8,759,674 B2 | 6/2014 | Korcz et al. | |
| 8,791,374 B1 | 7/2014 | Smith | |
| 8,816,222 B2 | 8/2014 | Pimentel | |
| 9,247,662 B2 | 1/2016 | Korcz et al. | |
| 9,252,578 B2 | 2/2016 | Korcz et al. | |
| 9,425,596 B2 | 8/2016 | Laverdiere et al. | |
| 9,553,415 B1 | 1/2017 | Gretz | |
| 9,553,432 B2 | 1/2017 | Korcz et al. | |
| 9,559,506 B2 | 1/2017 | Korcz et al. | |
| 9,614,358 B2 | 4/2017 | Korcz et al. | |
| 9,762,042 B2 | 9/2017 | Korcz et al. | |
| 9,929,551 B2 | 3/2018 | Korcz et al. | |
| 10,158,216 B2 | 12/2018 | Korcz et al. | |
| 2004/0012276 A1 | 1/2004 | Okamoto et al. | |
| 2006/0005988 A1 | 1/2006 | Jorgensen | |
| 2006/0272142 A1 | 12/2006 | Johnson | |
| 2007/0261881 A1 | 11/2007 | Wronski | |
| 2008/0230267 A1 | 9/2008 | de la Borbolla | |
| 2008/0296061 A1 | 12/2008 | Kerr, Jr. | |
| 2009/0111337 A1 * | 4/2009 | Kiely | H01R 9/0521 439/884 |
| 2009/0205865 A1 | 8/2009 | Korcz | |
| 2010/0000756 A1 | 1/2010 | Peck | |
| 2011/0204619 A1 | 8/2011 | Sathyanarayana et al. | |
| 2011/0209913 A1 | 9/2011 | Green et al. | |
| 2013/0153265 A1 | 6/2013 | Chen | |
| 2013/0233615 A1 | 9/2013 | Pimentel | |
| 2014/0262486 A1 | 9/2014 | Korcz et al. | |
| 2014/0262488 A1 | 9/2014 | Korcz et al. | |
| 2015/0090488 A1 | 4/2015 | Laverdiere et al. | |
| 2015/0357806 A1 | 12/2015 | Korcz et al. | |
| 2016/0099554 A1 | 4/2016 | Korcz et al. | |
| 2016/0105011 A1 | 4/2016 | Korcz et al. | |
| 2017/0207571 A1 | 7/2017 | Korcz et al. | |

OTHER PUBLICATIONS

Arlington Industries Brochure, 90 degrees Snap2It (R) MC Cable Connectors, 2014.

* cited by examiner

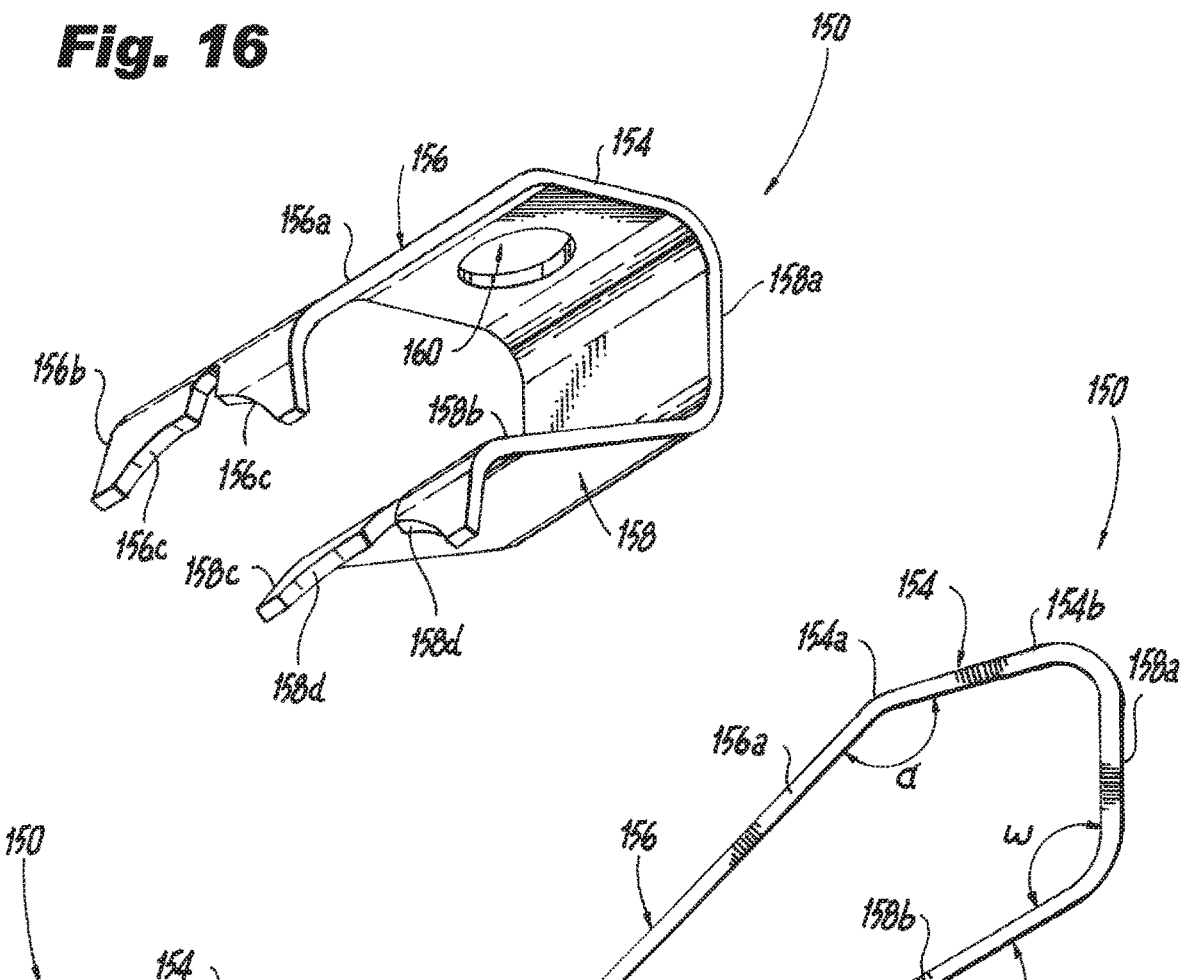
Fig. 16
Fig. 17
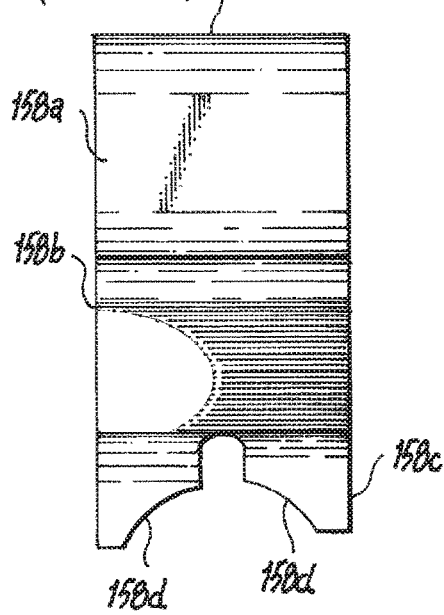
Fig. 18

ELECTRICAL BOX CABLE CONNECTOR

CROSS-REFERENCE TO RELATED APPLICATIONS

The present disclosure is based on and claims benefit from co-pending U.S. Provisional Patent Application Ser. No. 62/572,116 filed on Oct. 13, 2017 entitled "Electrical Box Cable Connector" the entire contents of which are incorporated herein by reference.

BACKGROUND

Field

The present disclosure relates generally to electrical box assemblies for electrical cables, and cable connectors that can be installed within or attached to electrical boxes to form electrical box assemblies.

Description of the Related Art

Electrical boxes are mounted in various residential, commercial, and industrial locations depending on the particular application. Electrical cables are commonly supplied to such electrical boxes and are used for connecting wires or conductors to electrical devices or fixtures or conductors in other electrical cables. Current electrical codes typically require electrical cabling to be secured to the electrical boxes. In some electrical box configurations, the electrical cables generally pass through an opening in a wall of an electrical box, also known as a knock-out or a pry-out, and are secured in place by a cable connector or clamp. Conventional cable clamps for armored sheathed cabling differ from cable clamps for non-metallic sheathed cabling, but in either case, some conventional cable clamps generally clamp the cable between a clamping plate and a side wall or bottom wall of the electrical box. Conventional cable clamps for armored sheathed cabling, typically include a stop member to prevent the armored sheath from extending too far into the electrical box.

SUMMARY

The present disclosure provides embodiments of electrical cable connectors. In one exemplary embodiment the cable connector includes a box mounting portion, a cable receiving portion, an intermediate portion, at least one cable retaining member and at least one shim. The box mounting portion has a cylindrical mounting portion wall with a center opening, one or more box attaching members extending from the mounting portion wall and a flange around the mounting portion wall in close proximity to the one or more box attaching members. The one or more box attaching members and flange being used to releasably attach the cable connector to an electrical box. The cable receiving portion has a cylindrical receiving portion wall with a center opening dimensioned to receive an electrical cable, at least one mounting bracket extending from the receiving portion wall and a cutout in the receiving portion wall. The intermediate portion is positioned between the box mounting portion and the cable receiving portion. The intermediate portion has a cylindrical intermediate portion wall with a center opening. The center opening in the box mounting portion, the center opening in the cable receiving portion and the center opening in the intermediate portion are aligned so that electrical wires within the electrical cable can pass from the cable receiving portion to the box mounting portion. The at least one cable retaining member has a base portion releasably secured to the at least one mounting bracket and at least one leg extending from the base portion into the cutout in the receiving portion wall such that the at least one leg can engage sheathing of the electrical cable within the opening in the cable receiving portion. The at least one leg is able to flex while the sheathing is passed through the opening in the cable receiving portion imparting little resistance to the forward advancement of the sheathing within the opening in the cable receiving portion, while imparting sufficient resistance to rearward movement of the sheathing to prevent withdrawal of the electrical cable from the opening in the cable receiving portion. The at least one shim is positioned between the base portion of the at least one cable retaining member and the at least one mounting bracket, the at least one shim having at least one height position used to adjust the positioned of the at least one cable retaining member relative to the opening in the cable receiving portion.

In another exemplary embodiment the cable connector includes a frame and a cable retaining member. The frame has a top wall, a bottom wall and a front wall between the top wall and the bottom wall. The top wall, bottom wall and front wall are configured and dimensioned to form a cavity capable of receiving an electrical cable. The top wall includes a mounting bracket that has at least one mounting aperture used to secure the frame to an electrical box. The front wall includes at least one wire opening that permits electrical wires within the electrical cable to exit the cavity while preventing sheathing around the electrical cable from exiting the cavity. The at least one cable retaining member has a base secured to the mounting bracket and at least one leg extending from the base into the cavity. The at least one leg extends into the cavity such that the at least one leg can engage sheathing of the electrical cable within the cavity. The at least one leg is able to flex while the sheathing is passed through the cavity imparting little resistance to the forward advancement of the sheathing within the cavity, while imparting sufficient resistance to rearward movement of the sheathing to prevent withdrawal of the electrical cable from the cavity. The at least one cable retaining member may be a plurality of cable retaining members. The cable connector according this exemplary embodiment may also include one or more shims positioned between the base of the at least one cable retaining member and the mounting bracket. The shim may have at least one height position that can be used to adjust the positioned of the at least one cable retaining member relative to the frame. The one or more shims may be a plurality of shims.

In another exemplary embodiment, the cable connector includes a frame and at least one cable retaining member. In this exemplary embodiment the frame has a top wall, a bottom wall and a front wall between the top wall and bottom wall. The top wall, bottom wall and front wall form a cavity configured and dimensioned to receive an electrical cable. The top wall has a mounting bracket that includes a mounting arm having at least one mounting aperture used to secure the frame to an electrical box. The front wall has at least one wire opening that permits electrical wires within the electrical cable to exit the cavity while preventing sheathing around the electrical cable from exiting the cavity. Each of the at least one cable retaining members has a base secured to the mounting bracket and at least one leg extending from the base. The at least one leg extends from the base into the cavity so that the at least one leg can engage the sheathing of the electrical cable within the cavity. The at least one leg is able to flex while the sheathing passes into the cavity imparting little resistance to the forward advancement of the sheathing within the cavity, while imparting sufficient resistance to rearward movement of the sheathing to prevent withdrawal of the electrical cable from the cavity. The at least one cable retaining member may be a plurality of cable retaining members. The cable connector according this exemplary embodiment may also include one or more shims positioned between the base of the at least one cable retaining member and the mounting bracket. The shim may have at least one height position that can be used to adjust the positioned of the at least one cable retaining member relative to the frame. The one or more shims may be a plurality of shims.

In another exemplary embodiment, the cable connector includes a frame, at least one cable retaining member and at least one shim. The frame has a top wall, a bottom wall and a front wall between the top wall and the bottom wall. The top wall, bottom wall and front wall are configured and dimensioned to form a cavity to receive an electrical cable. The top wall has a mounting bracket that includes at least one mounting aperture used to secure the frame to an electrical box. The front wall has at least one wire opening that permits electrical wires within the electrical cable to exit the cavity while preventing sheathing around the electrical cable from exiting the cavity. The at least one cable retaining member has a base secured to the mounting bracket and at least one leg extending from the base into the cavity such that the at least one leg is capable of engaging sheathing of the electrical cable within the cavity. The at least one leg is able to flex while the sheathing passes through the cavity imparting little resistance to the forward advancement of the sheathing within the cavity, while imparting sufficient resistance to rearward movement of the sheathing to prevent withdrawal of the electrical cable from the cavity. The at least one shim is positioned between the base of the at least one cable retaining member and the mounting bracket. The shim may have at least one height position that can be used to adjust the position of the at least one cable retaining member relative to the frame. It is noted that the at least one cable retaining member may be a plurality of cable retaining members, and the at least one shim may be a plurality of shims.

The present disclosure also provides an electrical box assembly comprising an electrical box and at least one cable connector. In one exemplary embodiment, the electrical box has four sides and a bottom wall. At least one of the side walls or the bottom wall has at least one knockout that when removed creates an opening into an interior of the electrical box. The at least one cable connector can be releasably secured to the electrical box through the knockout opening. The at least one cable connector includes a box mounting portion, a cable receiving portion, an intermediate portion, at least one cable retaining member and at least one shim. The box mounting portion has a cylindrical mounting portion wall with a center opening, one or more box attaching members extending from the mounting portion wall and a flange around the mounting portion wall in close proximity to the one or more box attaching members. The one or more box attaching members and flange being used to releasably attach the cable connector to an electrical box. The cable receiving portion has a cylindrical receiving portion wall with a center opening dimensioned to receive an electrical cable, at least one mounting bracket extending from the receiving portion wall and a cutout in the receiving portion wall. The intermediate portion is positioned between the box mounting portion and the cable receiving portion. The intermediate portion has a cylindrical intermediate portion wall with a center opening. The center opening in the box mounting portion, the center opening in the cable receiving portion and the center opening in the intermediate portion are aligned so that electrical wires within the electrical cable can pass from the cable receiving portion to the box mounting portion. The at least one cable retaining member has a base portion releasably secured to the at least one mounting bracket and at least one leg extending from the base portion into the cutout in the receiving portion wall such that the at least one leg can engage sheathing of the electrical cable within the opening in the cable receiving portion. The at least one leg is able to flex while the sheathing is passed through the opening in the cable receiving portion imparting little resistance to the forward advancement of the sheathing within the opening in the cable receiving portion, while imparting sufficient resistance to rearward movement of the sheathing to prevent withdrawal of the electrical cable from the opening in the cable receiving portion. The at least one shim is positioned between the base portion of the at least one cable retaining member and the at least one mounting bracket, the at least one shim having at least one height position used to adjust the positioned of the at least one cable retaining member relative to the opening in the cable receiving portion.

In another exemplary embodiment, the electrical box has four sides and a bottom. At least one of the side walls has at least one mounting tab extending into an interior of the electrical box. The at least one cable connector is releasably secured within the electrical box using the at least one mounting tab. In another exemplary embodiment, the at least one cable connector is releasably secured within the electrical box using a threaded aperture in a mounting arm of the cable connector and passing a fastener through a wall aperture in the electrical box into the threaded aperture. The at least one cable connector includes a frame and at least one cable retainer as described above. The cable connector may also include one or more shims. The one or more shims are positioned between the base a cable retaining member and the mounting bracket. Each shim has at least one height position that can be used to adjust the positioned of the cable retaining member relative to the frame.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein:

FIG. 16 is a bottom perspective view of an exemplary embodiment of a cable retaining member of the cable connector according to the present disclosure;

FIG. 17 is a side elevation view of the cable retaining member of FIG. 16;

FIG. 18 is a bottom plan view of the cable retaining member of FIG. 16;

DETAILED DESCRIPTION

The present disclosure provides descriptions of embodiments for electrical cable connectors used in electrical boxes, electrical boxes to which such electrical cable connectors can be secured, and electrical box assemblies incorporating such electrical cable connectors. The specification and drawings are to be regarded in an illustrative sense rather than a restrictive sense. Various modifications may be made thereto without departing from the spirit and scope of the present disclosure.

Figure 1:
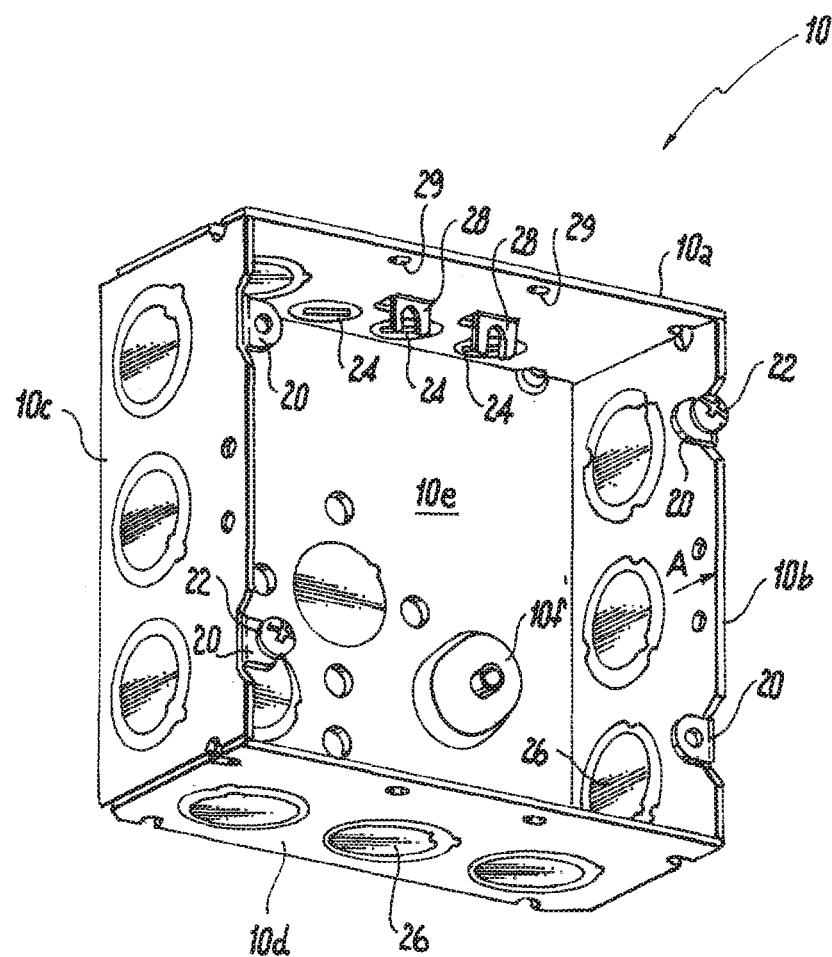
FIG. 1 is a perspective view of an exemplary embodiment of an electrical box according to the present disclosure, illustrating cable connector mounting tabs within the electrical box.
Figure 2:
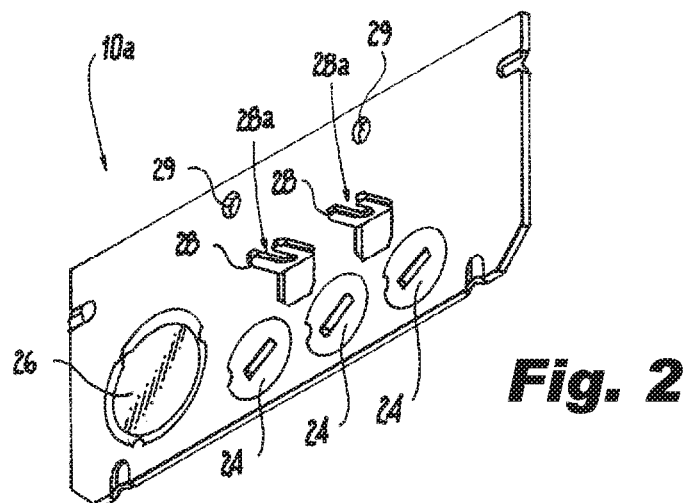
FIG. 2 is a bottom perspective view of an exemplary embodiment of a wall of the electrical box of FIG. 1.
Figure 3:
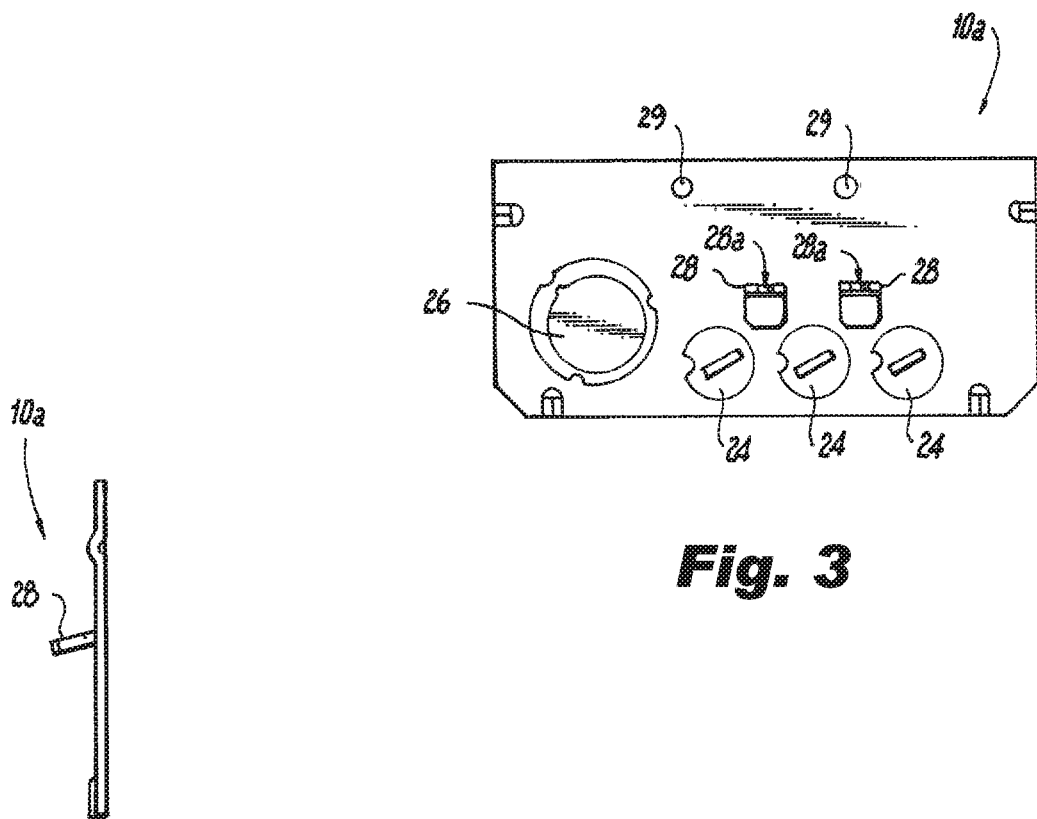
FIG. 3 is a front elevation view of the wall of FIG. 2.
Figure 4:
FIG. 4 is a side elevation view of the wall of FIG. 2.

Referring to FIGS. 1-4, an exemplary embodiment of an electrical box according to the present disclosure is shown. In this exemplary embodiment, the electrical box 10 has four sides 10a-10d and a bottom 10e. The electrical box 10 can be fabricated from metal, e.g., steel or galvanized steel, or from non-metallic materials, such as plastic. An example of a suitable plastic material is injection molded thermoplastic. In the embodiment shown, the electrical box 10 is a conventional 4×4 square box (or what is also known in the industry as a 4" square box or a 1900 box), however any suitable sized electrical box may be used for the present disclosure. For example, additional multi-gang boxes, such as a 3-gang box or raceways, may be used for the electrical box of the present disclosure. Further, the depth of the electrical box 10 may vary. For example, the electrical box may be 1¼ inches, 1½ inches, 2⅛ inches, or 3½ inches in depth. The electrical box 10 may also include one or more mounting tabs 20 with threaded or tapped mounting holes, where threaded screws 22 (e.g., 8/32 machine screws) can be inserted to secure a cover, e.g., a blank cover, a switch cover or a receptacle cover, or to secure an extension ring or plaster ring to the electrical box 10. The electrical box 10 may include one or more cable entrance pry-outs 24, seen in FIGS. 2 and 3, that when removed create an opening in the electrical box 10 to permit electrical cables to be inserted into the electrical box 10. The electrical box 10 may also include one or more knock-outs 26, seen in FIG. 1, used to secure cable clamps or cable connectors to the electrical box. The knock-outs 26 can come in many sizes. For example, the knock-outs 26 can be ½ inch, ¾ inch, 1 inch or greater in diameter. To connect the electrical box 10 to electrical ground, a ground screw aperture may be included in the electrical box 10. In conventional 4×4 electrical boxes, the ground screw aperture is typically on a raised surface 10f of the bottom 10e of the electrical box 10, as seen in FIG. 1. The ground screw aperture is typically a threaded or tapped hole for insertion of a ground screw, e.g., an 8/32 machine screw, that is typically color coded as green.

Continuing to refer to FIGS. 1-4, one or more cable connectors of the present disclosure can be mounted inside the electrical box 10. In the exemplary embodiment shown, to mount the cable connector to the electrical box 10, one or more side walls 10a-10d of the electrical box 10 may include one or more mounting tabs 28 that extend toward an interior of the electrical box 10. The one or more mounting tabs 28 are positioned in proximity to the cable entrance pry-outs 24, on for example side wall 10a. In this exemplary embodiment, having the mounting tabs 28 extend into the interior of the electrical box 10 permits the installation of the cable connector of the present disclosure from inside the electrical box.

Figure 5:
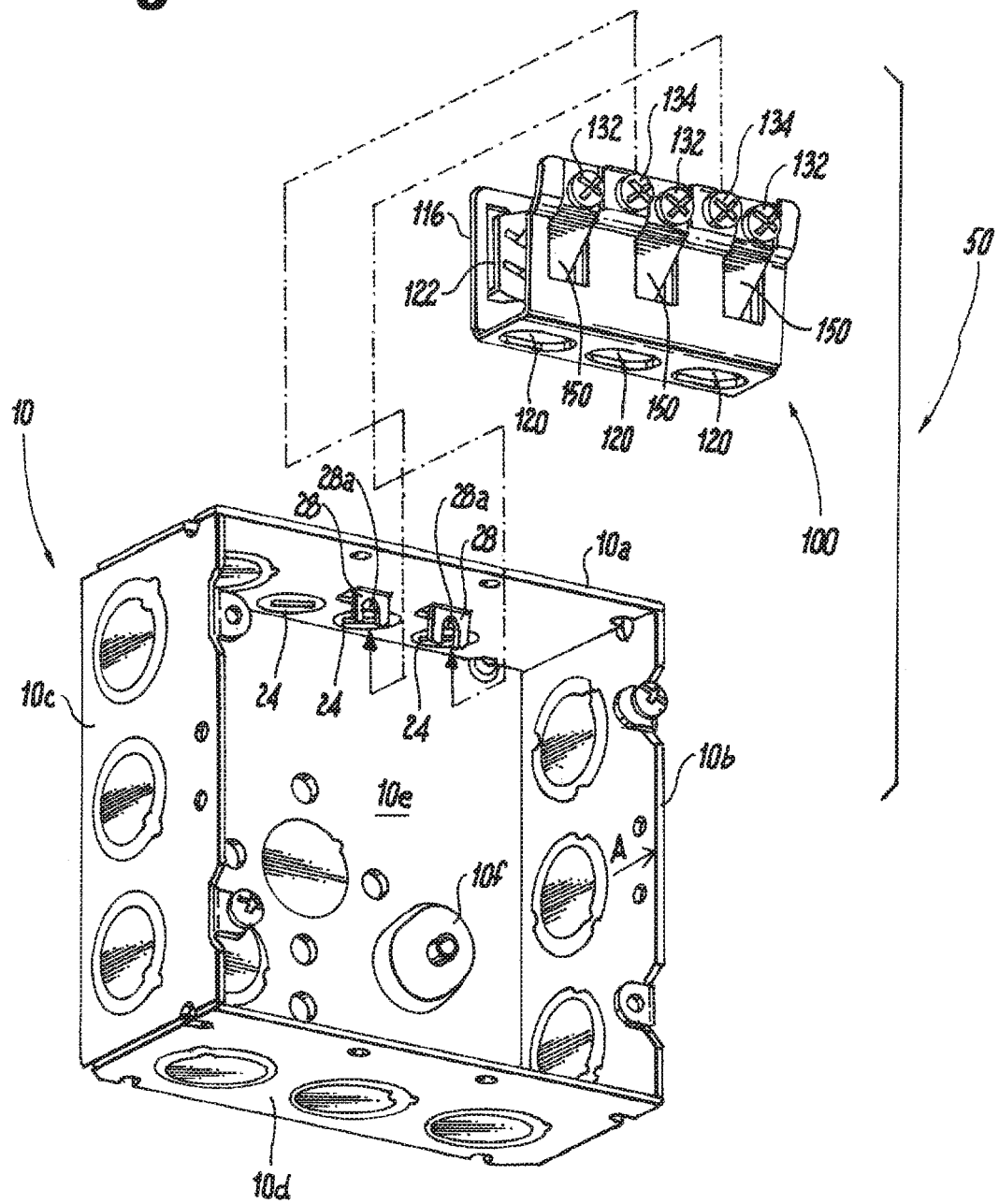
FIG. 5 is a top perspective view with parts separated of an exemplary embodiment of an electrical box assembly according to the present disclosure, illustrating an electrical box and a cable connector.
Figure 6:
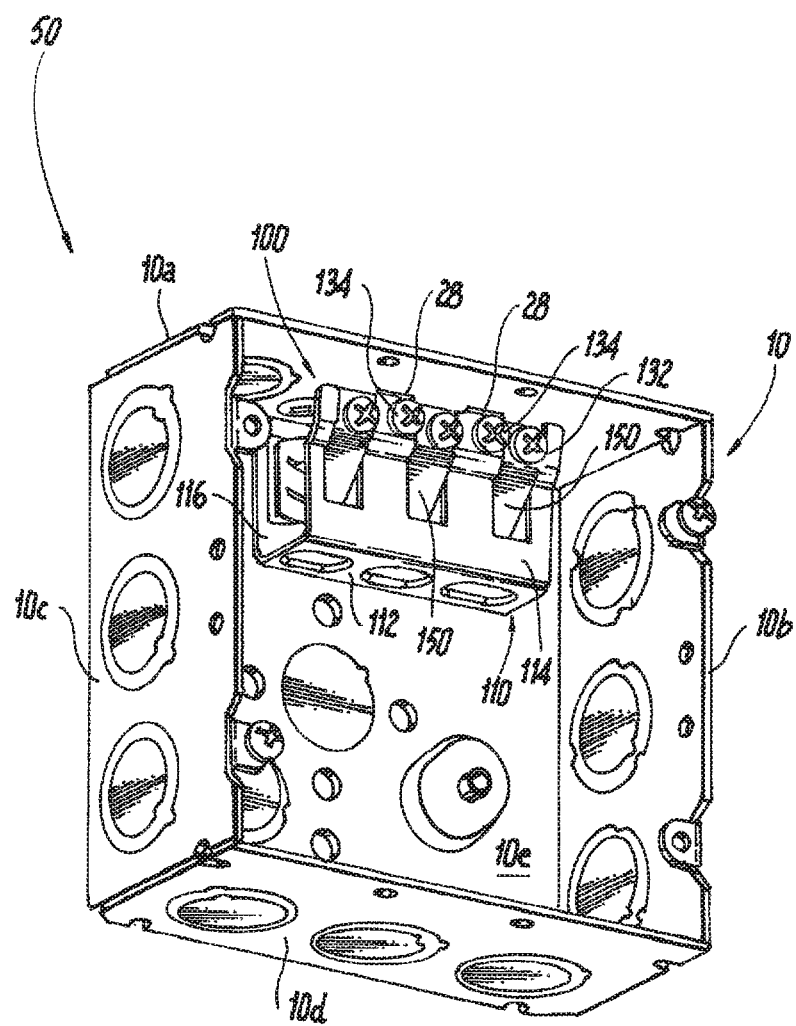
FIG. 6 is a top perspective view of the electrical box assembly of FIG. 5.
Figure 7:
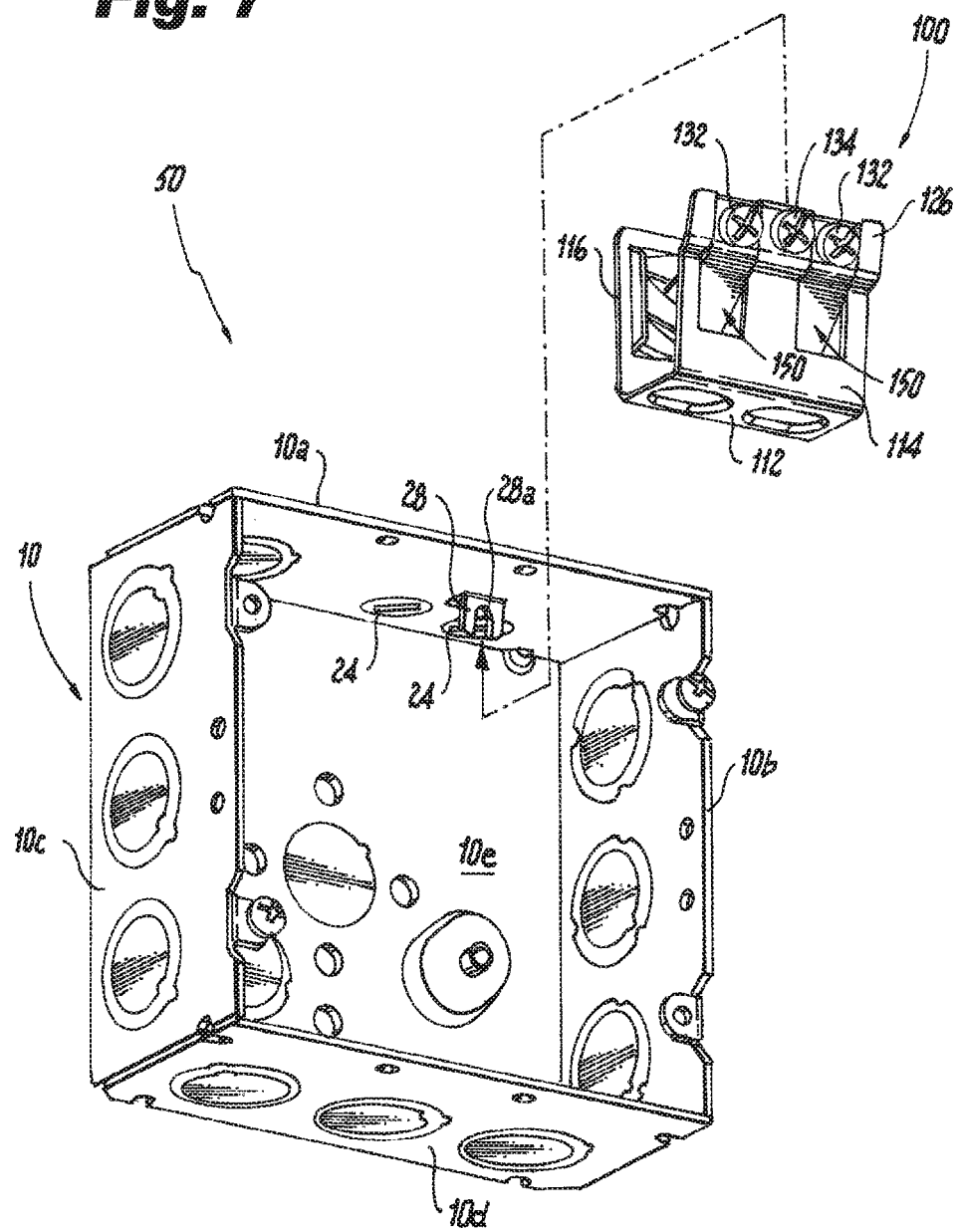
FIG. 7 is a top perspective view with parts separated of another exemplary embodiment of an electrical box assembly according to the present disclosure, illustrating an electrical box and a cable connector.

Referring to FIGS. 5 and 6, an exemplary embodiment of an electrical box assembly according to the present disclosure is shown. In this exemplary embodiment, the electrical box assembly 50 includes an electrical box 10 and a cable connector 100, which may also be referred to as a cable clamp, installed within the electrical box. In the embodiment of FIGS. 5 and 6, the electrical box 10 is configured to receive three cables via three pry-outs 24 and the cable connector is capable of receiving and securing the three cables to the electrical box. However, the electrical box 10 and the cable connector 100 according to the present disclosure can be configured to receive and secure more than three cables or less than three cables. For example, in the exemplary embodiment of FIG. 7, the electrical box assembly 10 is configured to receive two cables via two pry-outs 24 and the cable connector 100 is capable of receiving and securing the two cables to the electrical box. The cable connector 100 is mounted to the electrical box 10 by inserting fasteners 134, e.g., threaded or tapped screws, over slots 28a in the mounting tabs 28 and tightening the fasteners 134.

Turning now to FIGS. 8-25, an exemplary embodiment of a cable connector according to the present disclosure is shown. In this exemplary embodiment, the cable connector 100 has a frame 110 and one or more cable retaining members 150 that are releasably secured to the frame 110. Referring to FIGS. 8-15, the frame 110 has a front wall 112, a top wall 114 and a bottom wall 116. In another exemplary embodiment, the frame 110 may also include side walls (not shown) secured to the front wall 112, the top wall 114 and the bottom wall 116.

Figure 19:
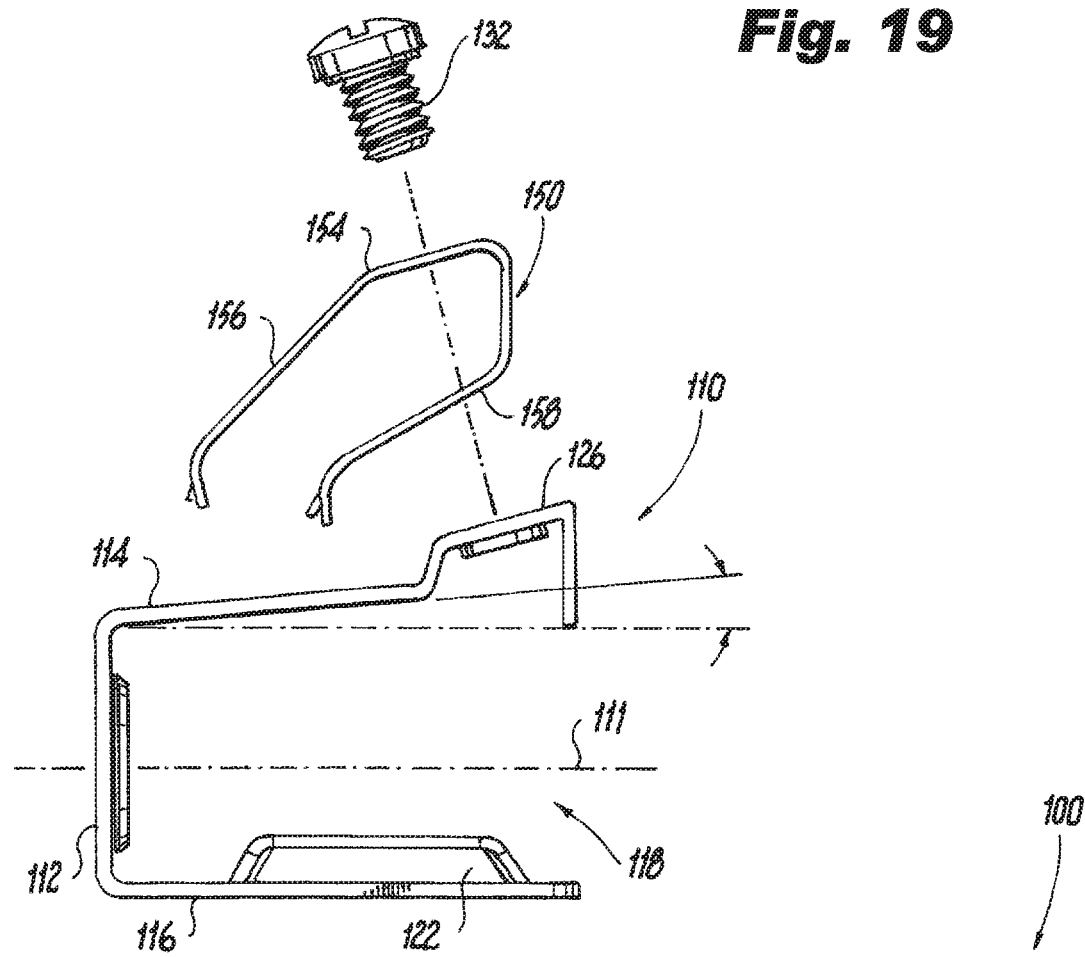
FIG. 19 is side elevation view with parts separated of a cable connector according to the present disclosure illustrating the cable connector frame of FIG. 8 and the cable retaining member of FIG. 16.

The top wall 114 extends from a top portion of the front wall 112, as shown, and can be integrally formed into the front wall 112 or secured to the front wall. The bottom wall 116 extends from a bottom portion of the front wall 112, as shown, and can be integrally formed into the front wall 112 or secured to the front wall. The front wall 112 of the frame 110 in the embodiment shown in FIG. 8, for example, is configured such that it is oriented substantially parallel to a side wall, e.g., side wall 10a, of an electrical box 10. The top wall 114 may be perpendicular to the front wall 112 or the top wall 114 may be at an angle relative to the front wall 112. In the embodiment shown, the top wall 112 is at an angle relative to the front wall, as seen in FIG. 19. The bottom wall 116 is preferably perpendicular to the front wall 112 so that the bottom wall can rest on the bottom 10e of an electrical box 10. The front wall 112, top wall 114 and bottom wall 116 are configured to form a cavity 118 that can receive one or more cables.

Figure 8:
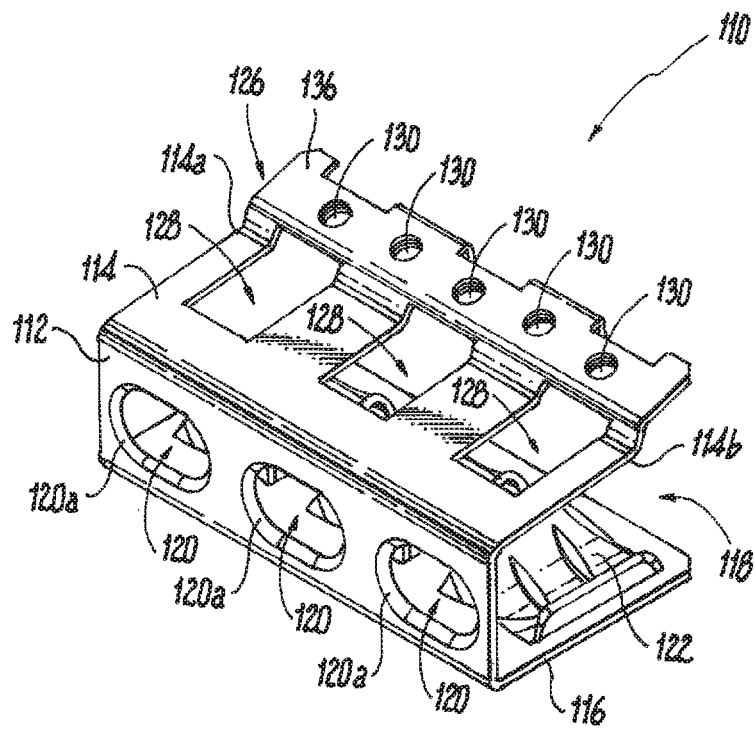
FIG. 8 is a top front perspective view of an exemplary embodiment of a frame for the cable connector according to the present disclosure.
Figure 9:
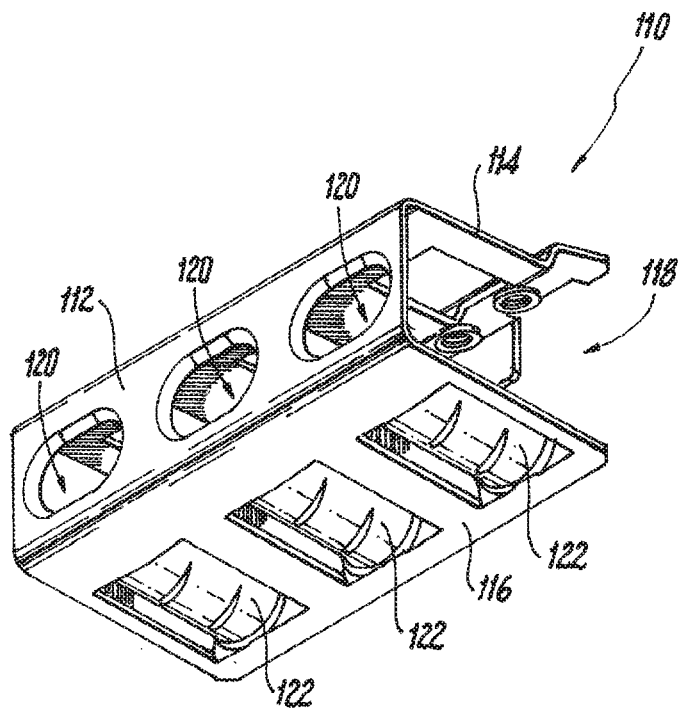
FIG. 9 is a bottom front perspective view of the frame of FIG. 8.
Figure 14:
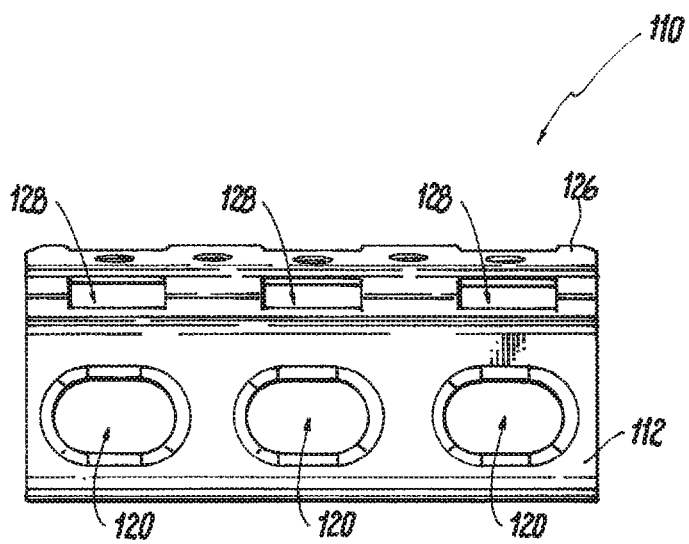
FIG. 14 is a front elevation view of the frame of FIG. 8.
Figure 15:
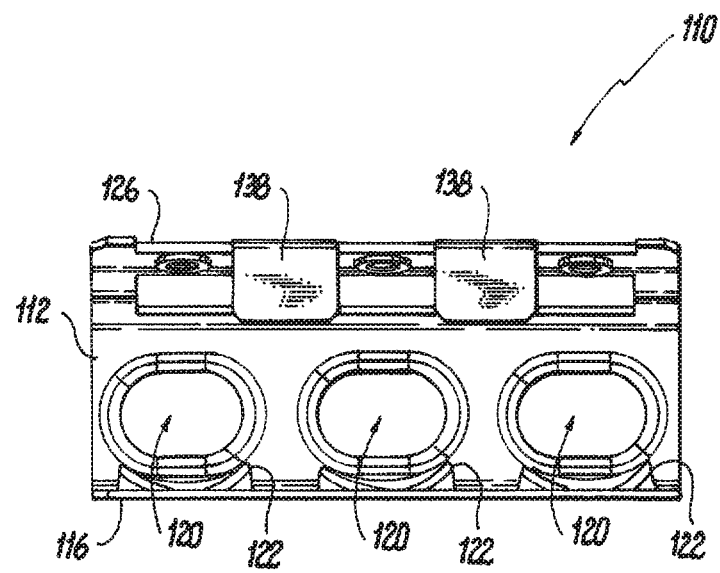
FIG. 15 is a rear elevation view of the frame of FIG. 8.
Figure 35:
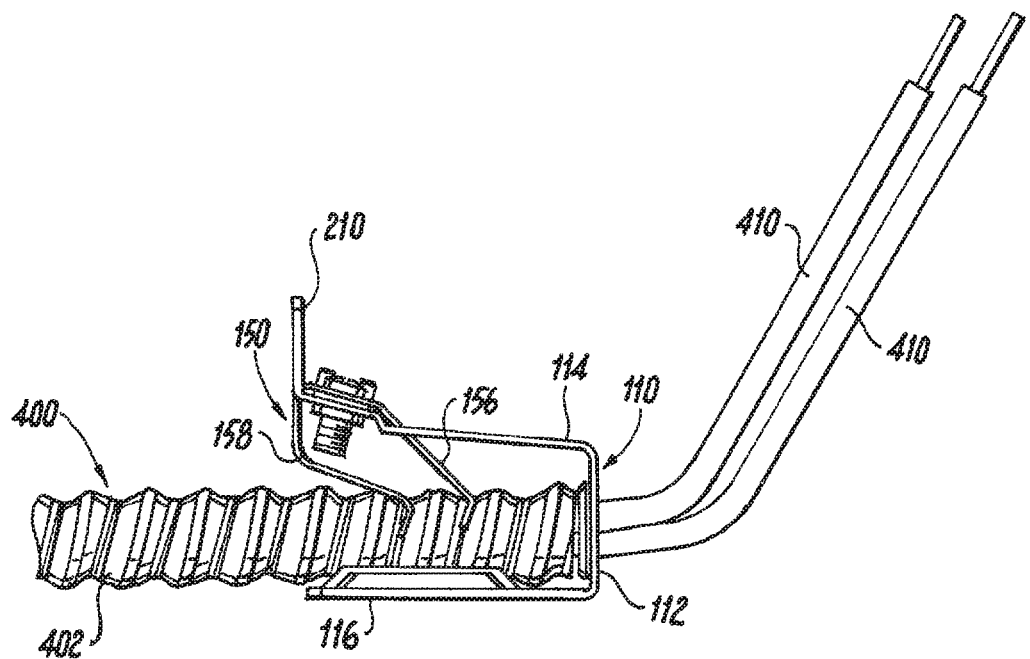
FIG. 35 is a side elevation view of the cable connector of FIG. 34 with a cable having a first diameter inserted into the cable connector.
Figure 36:
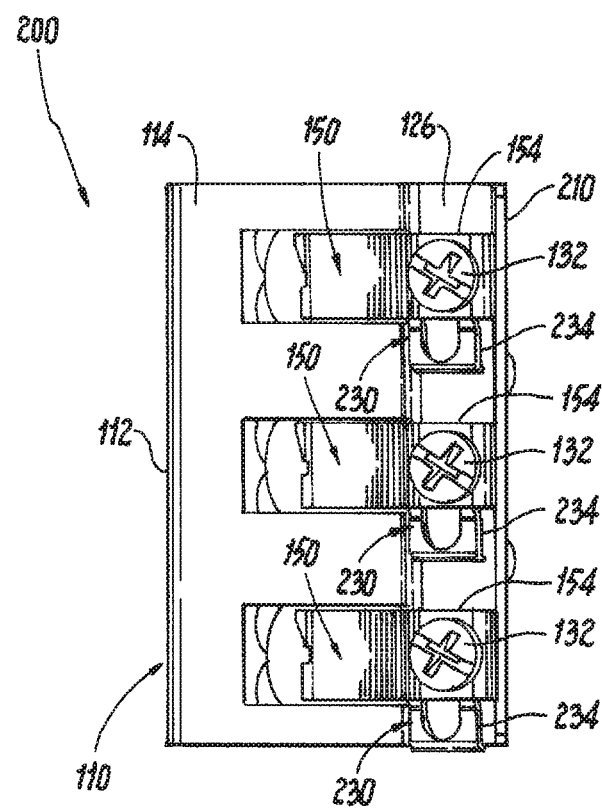
FIG. 36 is a top plan view of the cable connector of FIG. 33.
Figure 37:
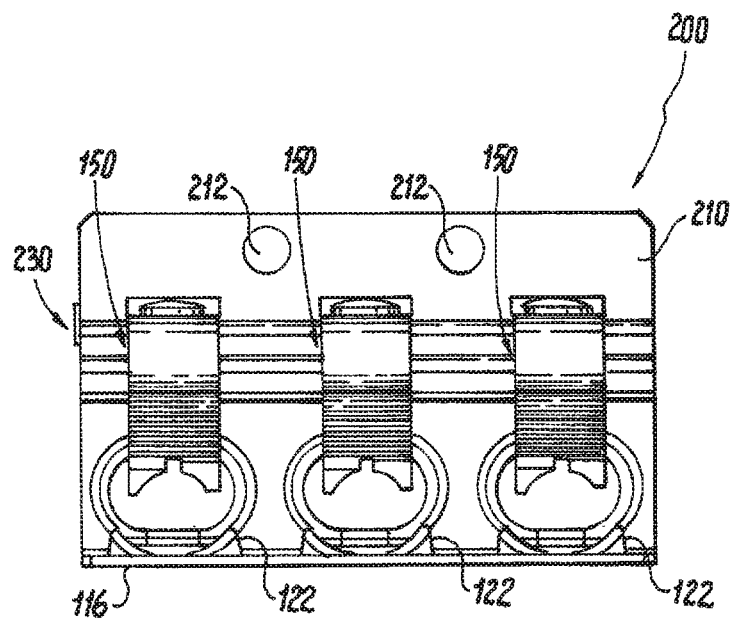
FIG. 37 is a rear elevation view of the cable connector of FIG. 33.
Figure 38:
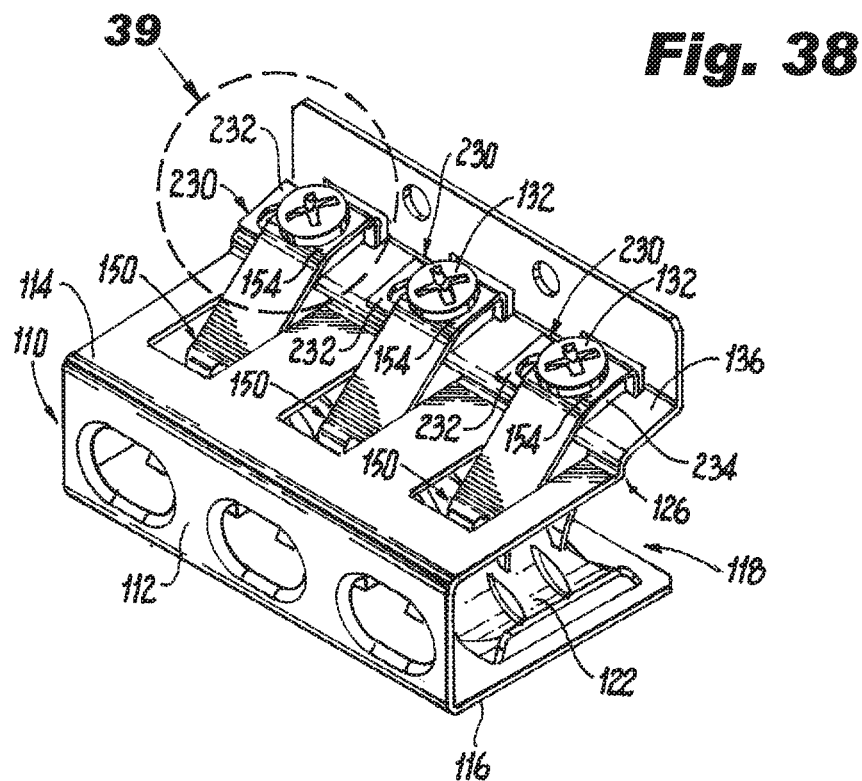
FIG. 38 is a top perspective view of the cable connector of FIG. 33, illustrating a plurality of retaining members attached to the frame and the shim associated with each cable retaining member in a second position.
Figure 39:
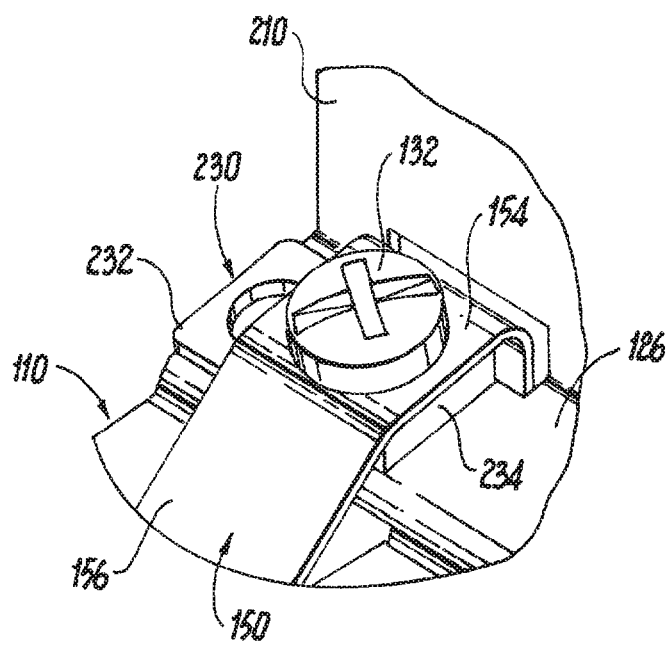
FIG. 39 is an enlarged perspective view of the shim associated with a cable retaining member in the second position taken from detail 39 in FIG. 30.
Figure 40:
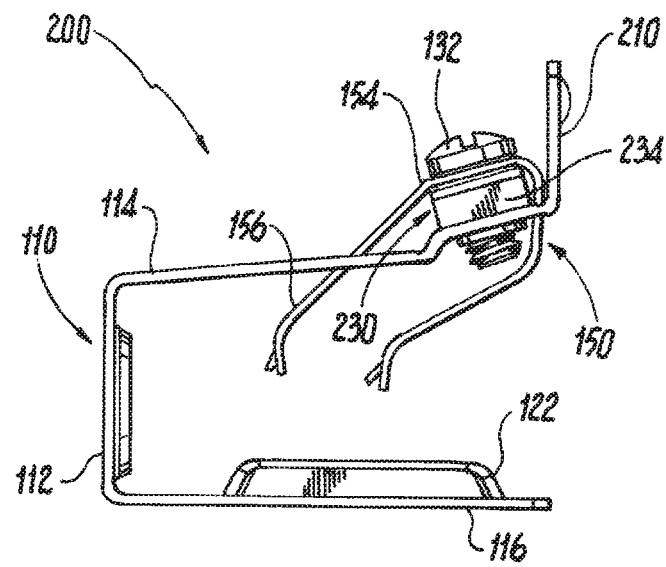
FIG. 40 is a side elevation view of the cable connector of FIG. 38 with the shim associated with a cable retaining member in the second position.
Figure 41:
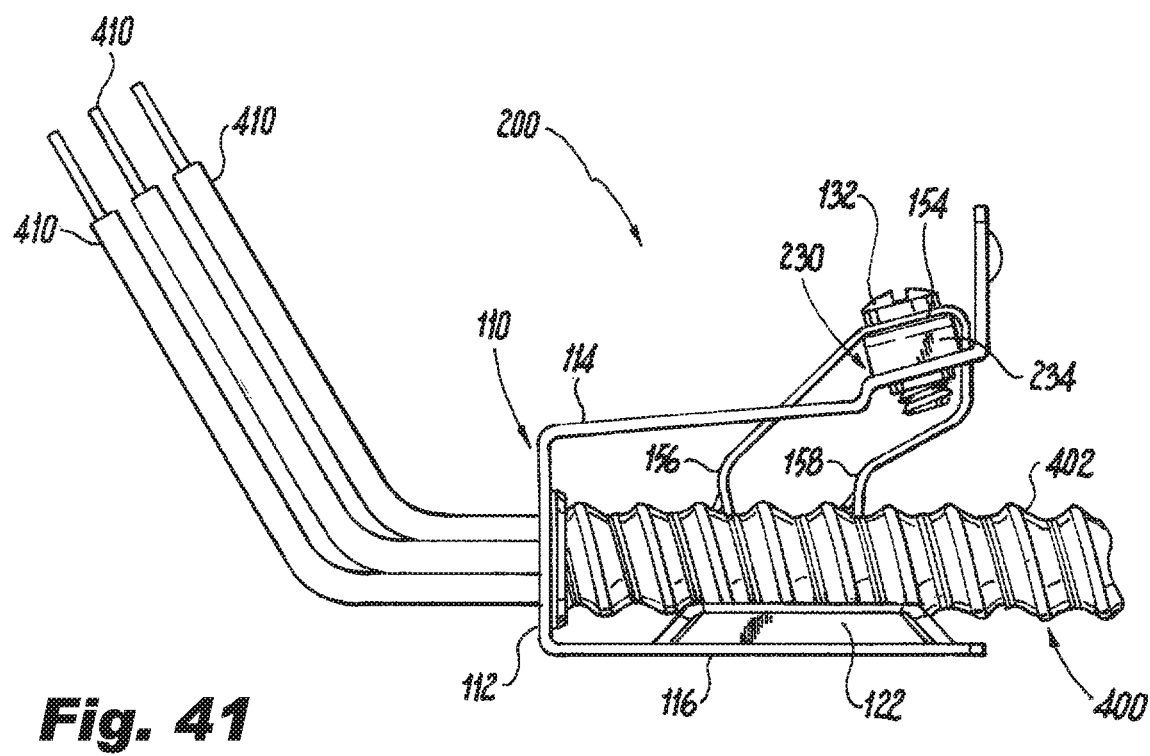
FIG. 41 is a side elevation view of the cable connector of FIG. 40 with a cable having a second larger outer diameter inserted into the cable connector.
Figure 42:
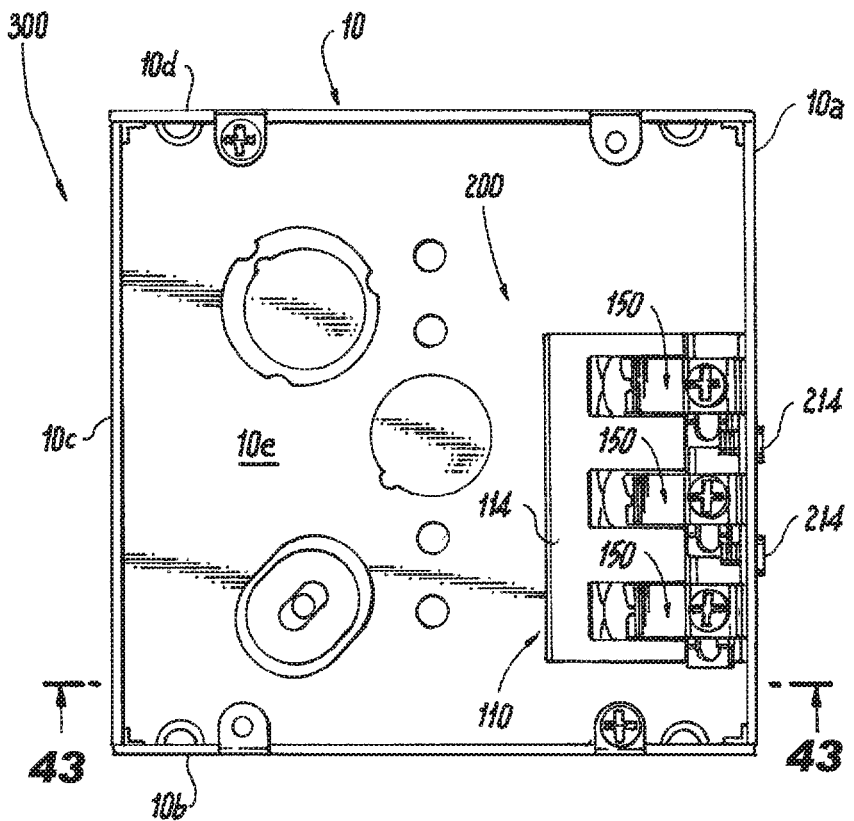
FIG. 42 is a top plan view of another exemplary embodiment of a box assembly according to the present disclosure, illustrating an electrical box and a cable connector attached to the electrical box.

Referring to FIGS. 8, 14 and 15, the front wall 112 of the frame 110 includes at least one wire opening 120 for passing electrical wires, e.g., wires 410 seen in FIG. 35, from an electrical cable 400 within the cavity 118 of the frame 110 into the electrical box 10 for connection to other wires or an electrical device or fixture. In this exemplary embodiment, the front wall 112 has three adjacent wire openings 120, seen in FIG. 35. Each wire opening 120 has a center line 111, seen in FIG. 19, and includes a rounded edge 120a around the periphery of the opening 120 to minimize potential damage to insulation surrounding wires passing through the wire opening 120. Alternatively, the wire opening 120 can include, for example, a rubber or plastic grommet to minimize potential damage to insulation surrounding wires passing through the wire opening 120. The size of each wire opening 120 may vary depending upon a number of factors, including the number of wires within the electrical cable and the diameter of the sheathing of the cable. The front wall 112 also acts as a stop to prevent the cable sheathing, e.g., armored electrical cable sheathing, from passing through the cavity 118 of the frame 110 into the electrical box 10.

Figure 48:
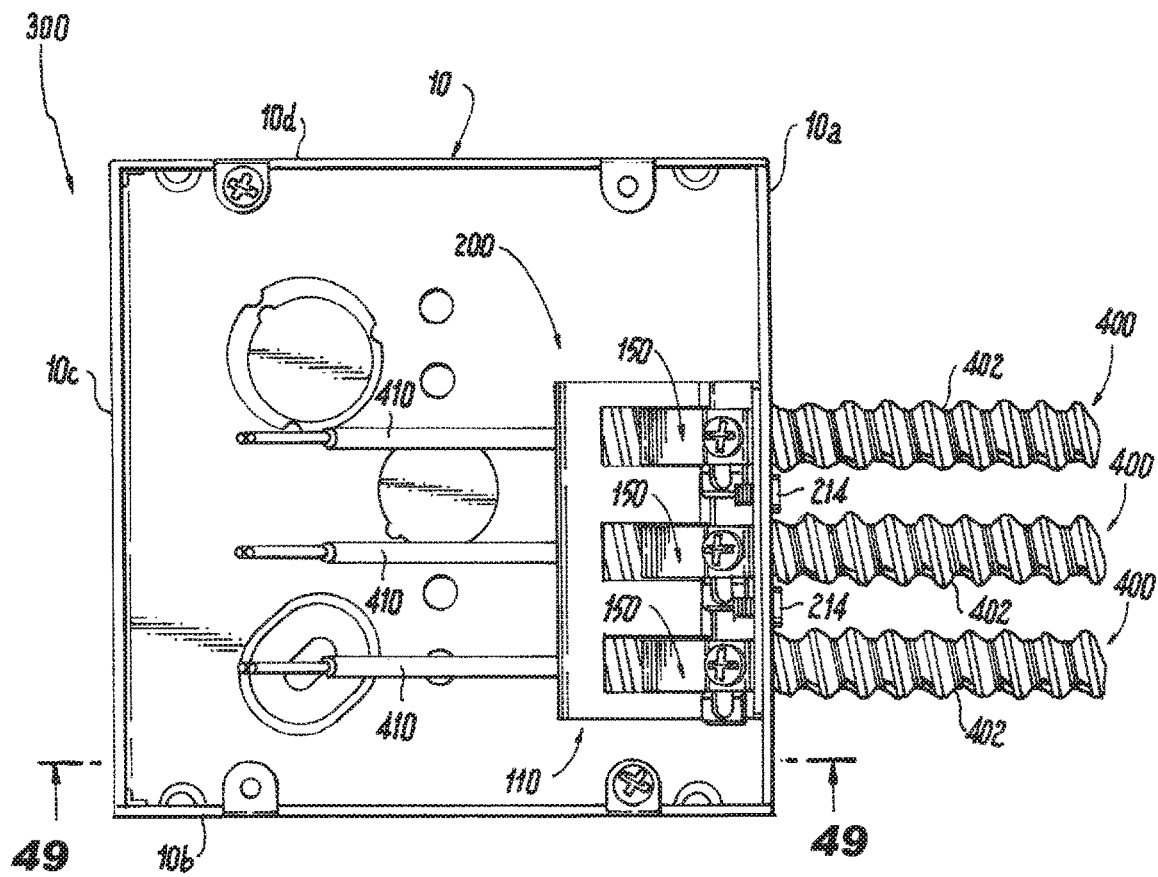
FIG. 48 is a top plan view of the box assembly of FIG. 42, illustrating a plurality of cables secured to the cable connector attached to the electrical box.
Figure 49:
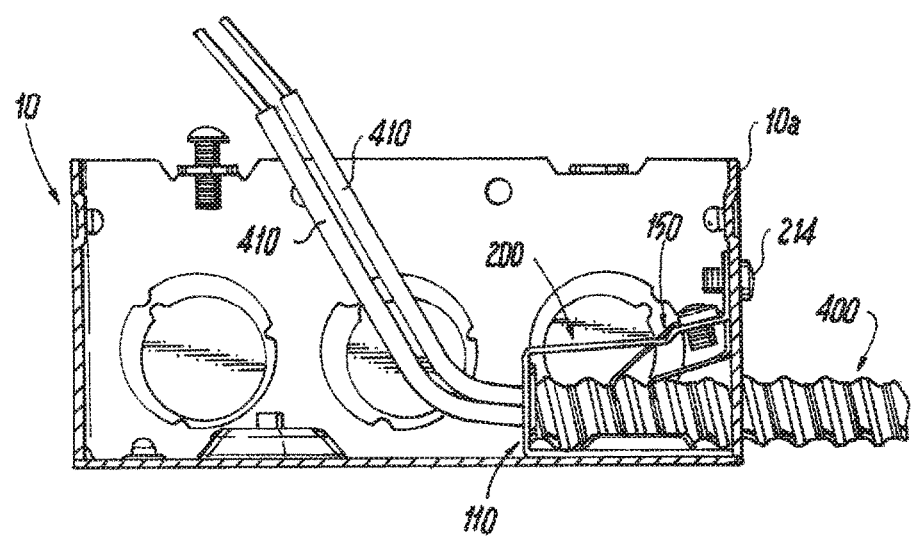
FIG. 49 is a cross-sectional view of the electrical box assembly of FIG. 48 taken along line 49-49, illustrating cables secured to the cable connector attached to the electrical box.
Figure 50:
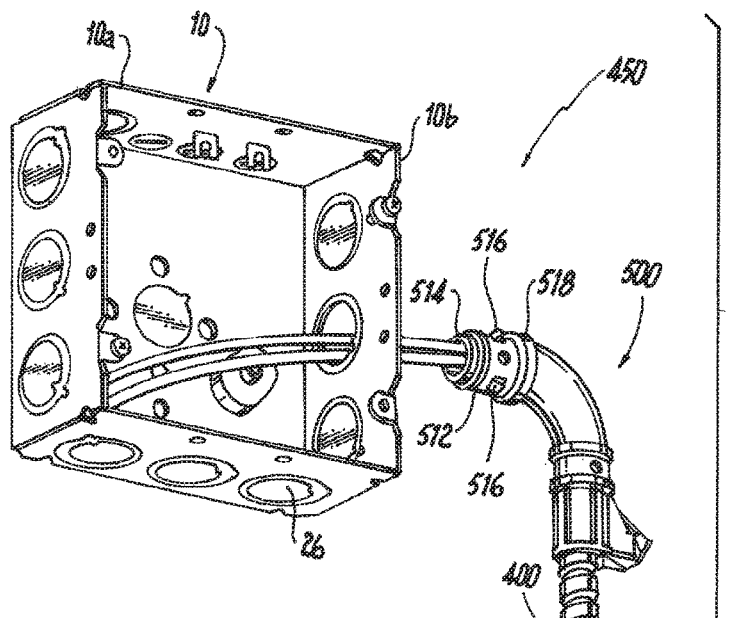
FIG. 50 is a perspective view of another exemplary embodiment of an electrical box and a cable connector according to the present disclosure with the cable connector positioned for insertion into the electrical box.

Each wire opening 120 in the front wall 112 is aligned with a corresponding box pry-out 24 when the frame 110 is mounted or installed within an electrical box. As a result, a cable 400 can be passed through the pry-out 24 opening into the cavity 118, and wires 410 within the cable 400 can pass through the respective wire opening 120 into the electrical box, as seen in FIGS. 48 and 49. Further, the bottom wall 116 of the frame 110 may include one or more cable rest members 122, seen in FIGS. 8 and 10. Each cable rest member 122 is an arcuate member aligned with a respective wire opening 120 in the front wall 112 to act as a guide to position an electrical cable 400 within the cavity 118, as seen in FIG. 35. Non-limiting examples of electrical cables include BX type cables, MC-PCS type cables, and Greenfield type flexible armored cabling. In the exemplary embodiments shown herein, the cable 400 is a BX type armored cable having, for example, an outside diameter of about ½ inch or greater.

Figure 10:
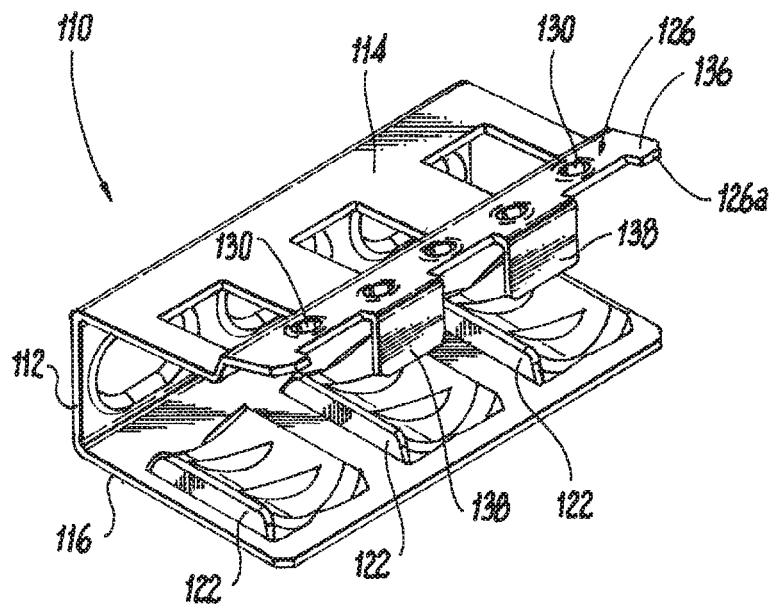
FIG. 10 is a top rear perspective view of the frame of FIG. 8.
Figure 11:
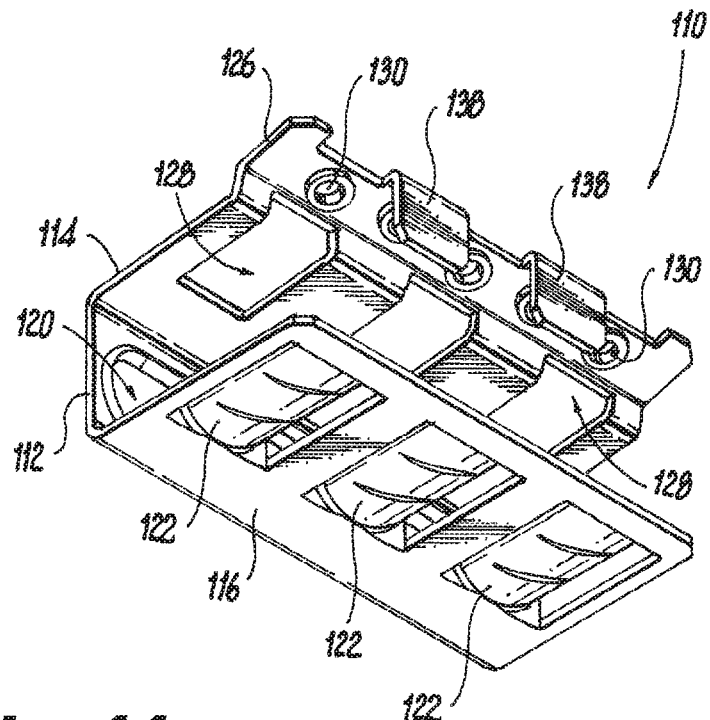
FIG. 11 is a bottom rear perspective view of the frame of FIG. 8.
Figure 12:
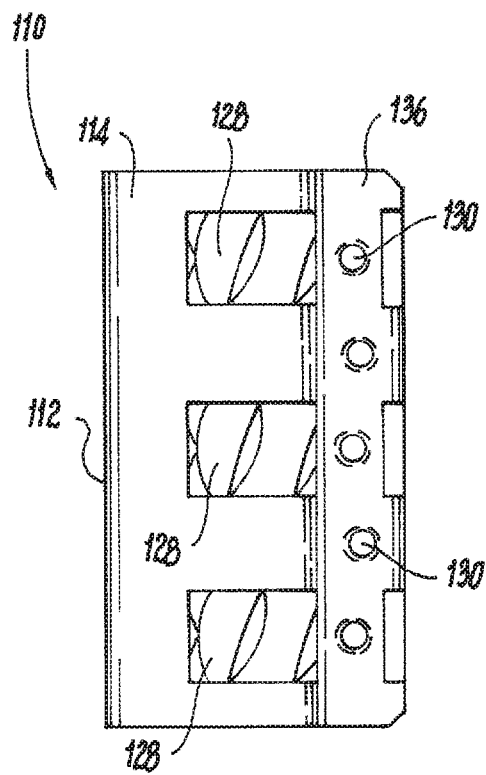
FIG. 12 is a top plan view of the frame of FIG. 8.
Figure 13:
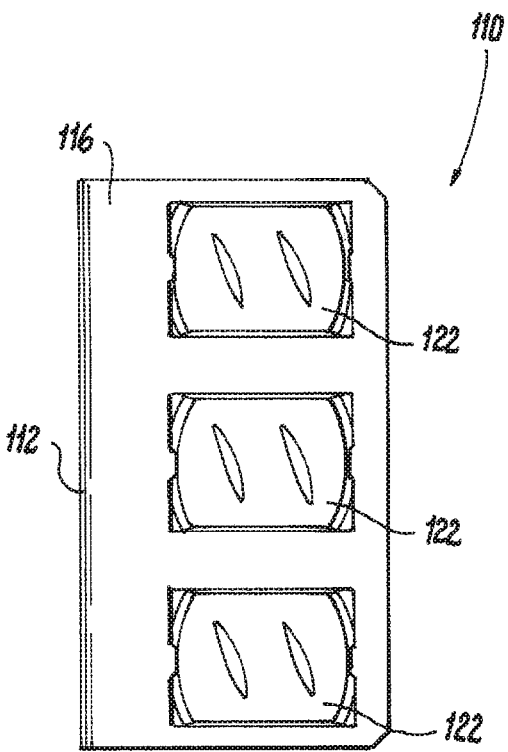
FIG. 13 is a bottom plan view of the frame of FIG. 8.

Referring to FIGS. 8, 10 and 12, the top wall 114 of the frame 110 includes a mounting bracket 126 that extends from one edge 114a of the top wall 114 to an opposite edge 114b. The mounting bracket 126 is offset from the top wall 114. The top wall 114 of the frame 110 also includes one or more cutouts 128 that provide access to the cavity 118 of the frame 110. In the exemplary embodiment shown, the top wall 114 has three cutouts 128. Each cutout 128 is generally rectangular in shape and extends from a point proximate the front wall 112 toward the mounting bracket 126 as shown. While the cutouts are shown as rectangular in shape, one skilled in the art would readily recognize that the cutouts can be in any shape suitable to provide access to the cavity 118 of the frame 110. In this exemplary embodiment, the mounting bracket 126 is positioned adjacent the cutout 128. The mounting bracket 126 has an upper surface 136, seen in FIGS. 8, 10 and 12, configured to permit the base portion 154 of the cable retaining member 150 to rest. The mounting bracket 126 includes a plurality of mounting apertures 130, e.g., a threaded or tapped openings, configured to receive mounting fastener, e.g., threaded set screws. More specifically, some mounting apertures 130 are configured to receive mounting fasteners 132 used to secure the cable retaining members 150 to the frame 110 of the cable connector 100, and other mounting apertures 130 are configured to receive mounting fasteners 134 used to secure the frame 110 of the cable connector 100 to the mounting tabs 28 of an electrical box 10 as described above. Extending downward from a rear edge 126a of the mounting bracket 126 are cover tabs 138. The cover tabs 138 are substantially parallel to the front wall 112 and configured so that they rest against a side wall, e.g., side wall 10a, of an electrical box 10 and cover openings formed in the side wall when the mounting tabs 28 are folded into the electrical box.

Referring now to FIGS. 16-18, an exemplary embodiment of the one or more cable retaining members 150 is shown. While the present disclosure shows the one or more cable retaining members 150 as being releasably secured to the frame 110, the present disclosure also contemplates that the cable retaining members 150 may be integrally formed into the frame 110.

Each cable retaining member 150 is a flexible member that is able to flex (typically upwards away from the bottom wall 116 of the frame) while an electrical cable passes into the cavity 118 in the frame 110 imparting little resistance to the forward advancement of the cable within the frame while imparting sufficient resistance to rearward movement of the cable to prevent withdrawal of the cable from the frame. Each retaining member 150 may be provided in various shapes and sizes sufficient to flex while an electrical cable passes into the cavity 118 in the frame 110. Each retaining member 150 includes a base portion 154 and at least one leg extending from the base portion 154. In the exemplary embodiment shown, there are two legs 156 and 158 extending from the base portion 154. The base portion 154 is generally straight and includes an aperture 160 used in securing the retaining member 150 to the frame 110. In an embodiment where the cable retaining member 150 is integrally formed into the frame 110, the base portion 154 of the cable retaining member 150 would be integral with the frame and the legs 156 and/or 158 would extend from the frame.

The first leg 156 has a substantially straight main body 156a that extends from a front edge 154a of the base portion 154 at an angle "α", and an end portion 156b that is at an angle "β" relative to the main body 156a. As such, the leg 156 is cantilevered from the base portion 154 at the point where the base portion 154 connects to the leg 156. This cantilever permits flexibility of the first leg 156 relative to the base portion 154, which is secured to the frame 110. The angle "α" may depend upon a number of factors, including, the length of the leg portion 156, and the angle between the base portion 154 and a central axis 111 of the frame 110, seen in FIG. 19. As a non-limiting example, the angle "α" can be about 145 degrees, which provides suitable flexibility of the retaining member to allow insertion of a cable into the cavity 118 of the frame 110, while imparting sufficient resistance to rearward movement of the cable to prevent withdrawal of the cable from the frame 110. The angle "β" may depend upon a number of factors, including the angle "α" and the angle between the base portion 154 and the central axis 111 of the frame 110, seen in FIG. 19. As a non-limiting example, the angle "β" can be about 145 degrees. The end portion 156b of the first leg 156 may include an arcuate portion 156c that is configured to substantially conform to an outer periphery of the sheathing of an electrical cable, and to engage the sheathing of the electrical cable.

If the cable retainer 150 includes a second leg 158, the second leg 158 in this exemplary embodiment has a first body portion 158a, a second body portion 158b, and an end portion 158c. The first body portion 158a is substantially straight and extends from a rear edge 154b of the base portion 154 at an angle sufficient to allow the cable retaining member to straddle the mounting bracket 126 so that the second body portion 158b is separated from the body portion 154. A non-limiting example of this angle is about 90 degrees. The second body portion 158b is substantially straight and extends from the first body portion 158a at an angle "ω" relative to the first body portion. The end portion 158c is at an angle "θ" relative to the second body portion 158b. As such, the leg 158 is cantilevered from the base portion 154 at the point where the base portion 154 connects to the leg 158. This cantilever permits flexibility of the second leg 158 relative to the base portion 154, which is secured to the frame 110. The angle "ω" may depend upon a number of factors, including, the length of the first and second leg portions 158a and 158b of the cable retaining member 150, and the angle between the base portion 154 and a central axis 111 of the frame 110, seen in FIG. 19. The angle "ω" should be sufficient to provide suitable flexibility of the retaining member to allow insertion of a cable into the cavity 118 of the frame 110, while imparting sufficient resistance to rearward movement of the cable to prevent withdrawal of the cable from the frame 110. The angle "θ" may depend upon a number of factors, including the angle "ω" and the angle between the base portion 154 and the central axis 111 of the frame 110, seen in FIG. 19. A non-limiting example of the angle "θ" can be about 145 degrees. The end portion 158c of the second leg 158 may include an arcuate portion 158d that is configured to substantially conform to an outer periphery of the sheathing of an electrical cable, and to engage the sheathing of the electrical cable.

In the exemplary embodiment shown in FIGS. 16-18, the retaining member 150 has two legs 156 and 158. Each leg 156 and 158 is connected to an end of the base portion 154 as shown and described above. The legs 156 and 158 are secured to the base portion 154 so that the long surfaces of each leg 156 and 158 are substantially in parallel and capable of flexing while an electrical cable passes into the cavity 118 of the frame 110 imparting little resistance to the forward advancement of the cable. The end portion 156b of the leg 156 and the end portion 158c of the leg 158 engage the cable to impart sufficient resistance to rearward movement of the cable to prevent withdrawal of the cable from the frame 110. The retaining member 150 may be made of metal, e.g., steel or galvanized steel, or from non-metallic materials, such as plastic. An example of a suitable plastic material is injection molded thermoplastic. The retaining member 150 may be made as a single unitary member bent or stamped to a desired size and shape, or the retaining member 150 may comprise a plurality of components joined together with, for example, welds to a size and shape sufficient to retain a cable within the frame 110.

Figure 20:
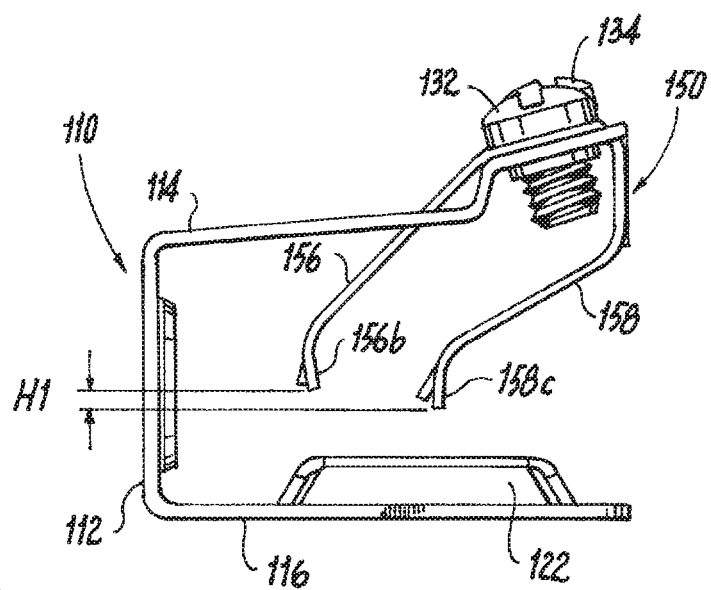
FIG. 20 is a side elevation view of the cable connector of FIG. 19 illustrating the cable retaining member secured to the frame.
Figure 21:
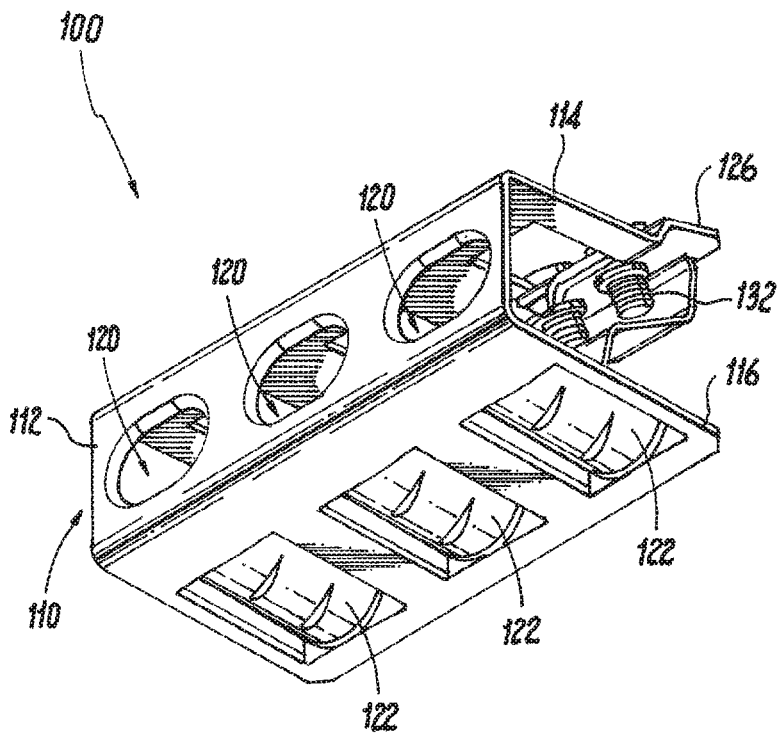
FIG. 21 is a bottom front perspective view of the cable connector of FIG. 20.
Figure 22:
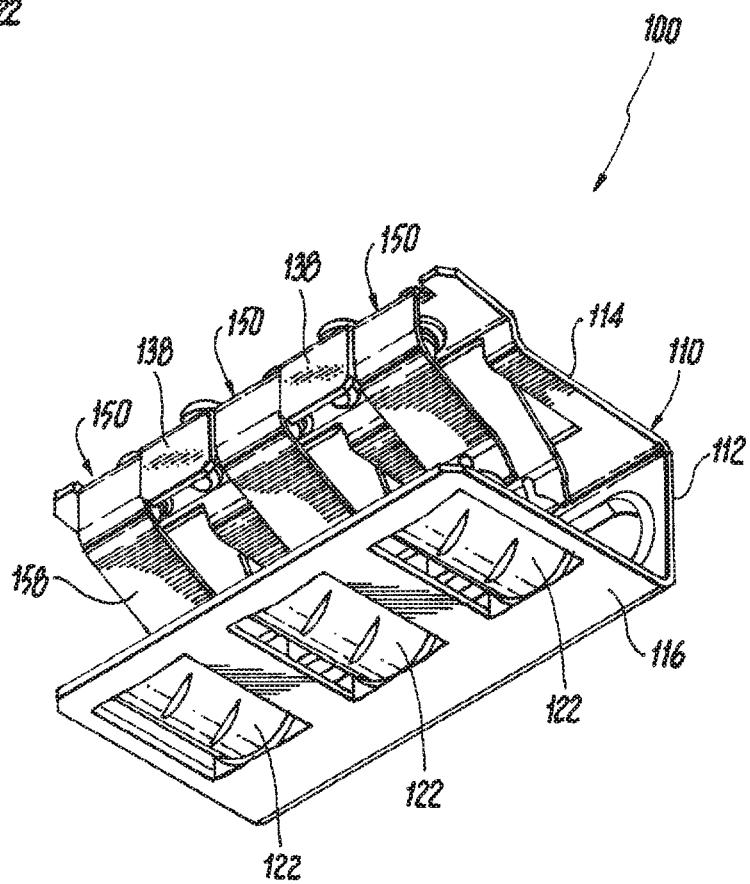
FIG. 22 is a bottom rear perspective view of the cable connector of FIG. 20.
Figure 23:
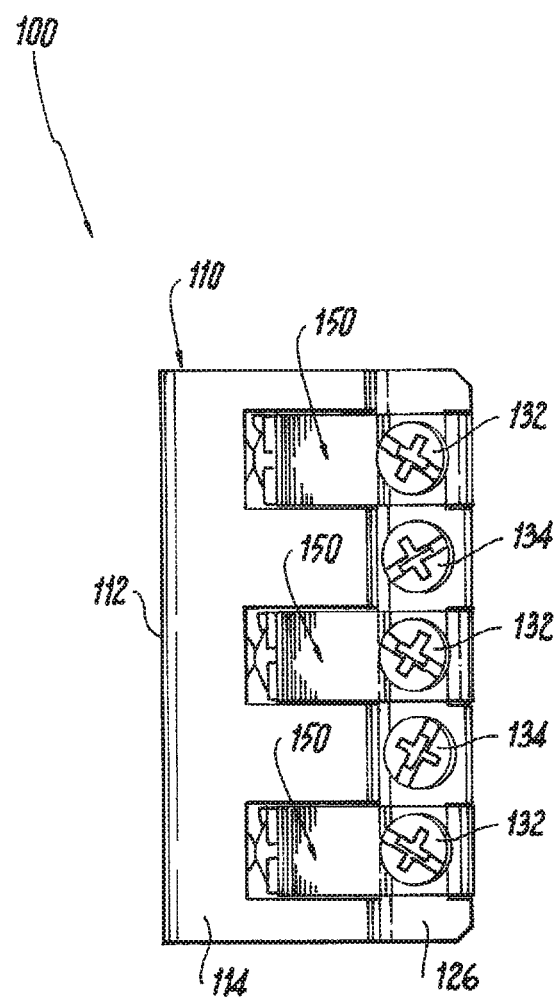
FIG. 23 is a top plan view of the cable connector of FIG. 20.
Figure 24:
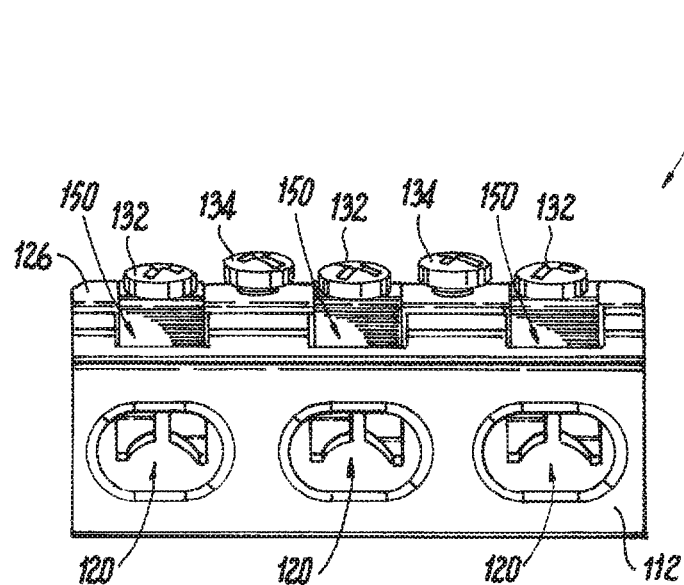
FIG. 24 is a front elevation view of the cable connector of FIG. 20.
Figure 25:
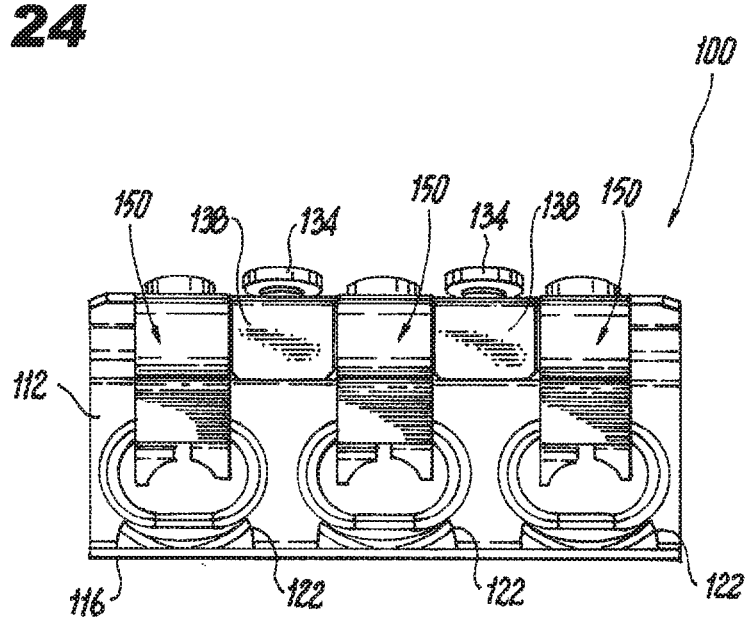
FIG. 25 is a rear elevation view of the cable connector of FIG. 20.
Figure 26:
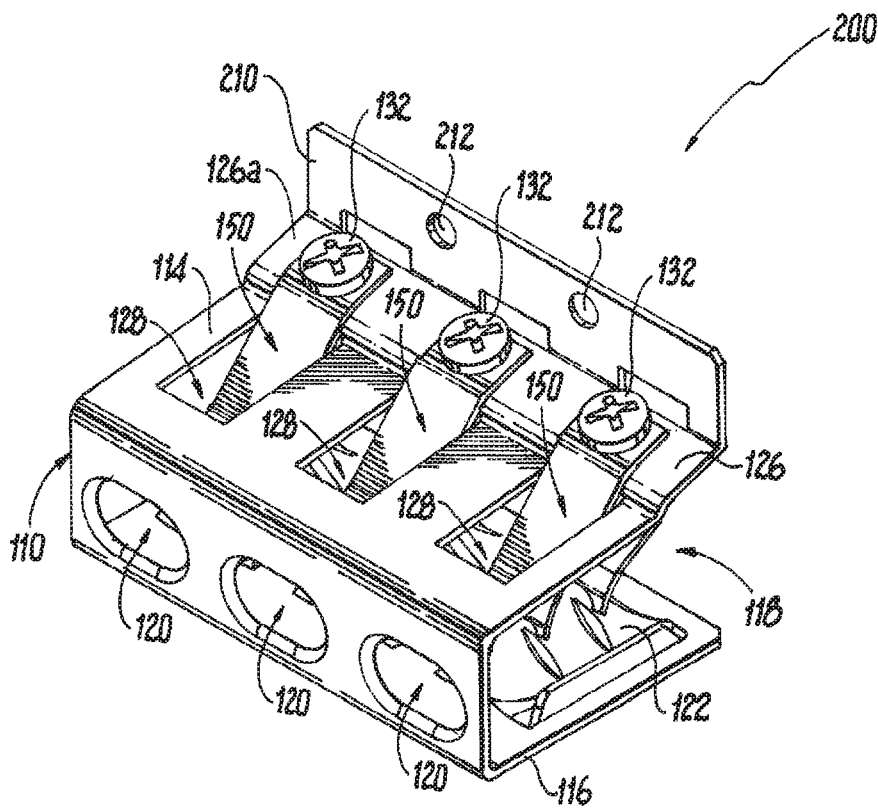
FIG. 26 is a top perspective view of another exemplary embodiment of a cable connector according to the present disclosure, illustrating a plurality of retaining members attached to a frame.
Figure 27:
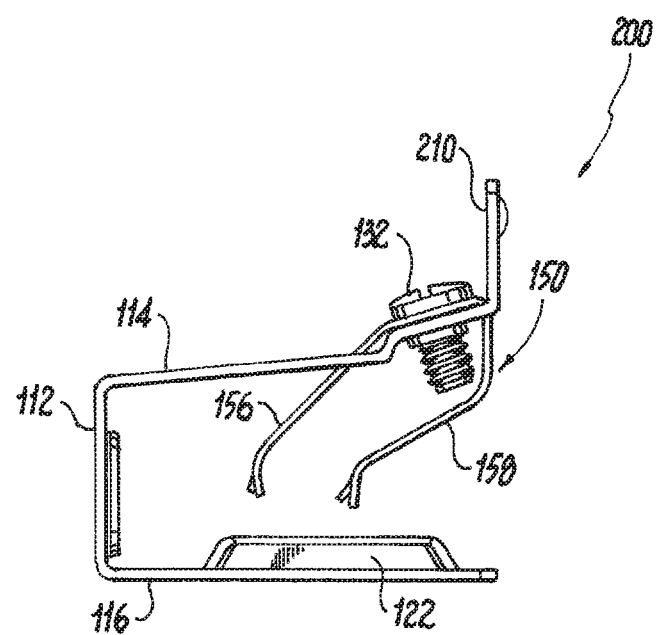
FIG. 27 is a side elevation view of the cable connector of FIG. 26.
Figure 28:
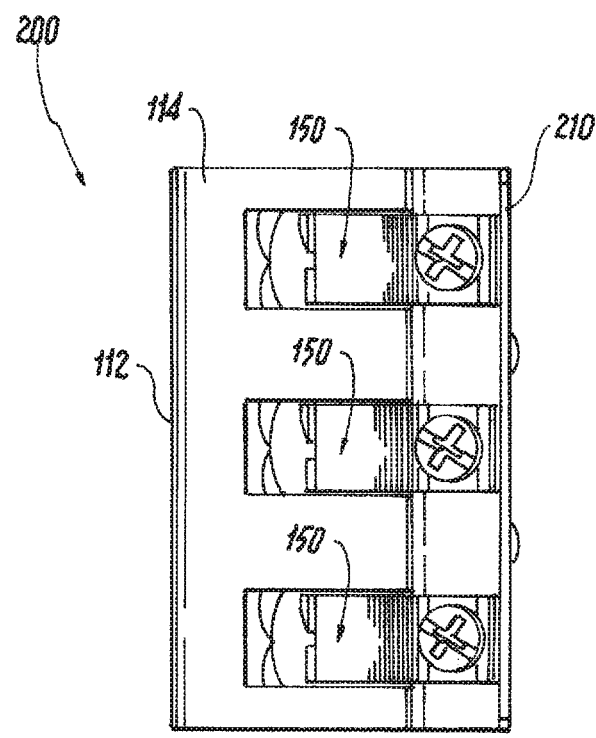
FIG. 28 is a top plan view of the cable connector of FIG. 26.
Figure 29:
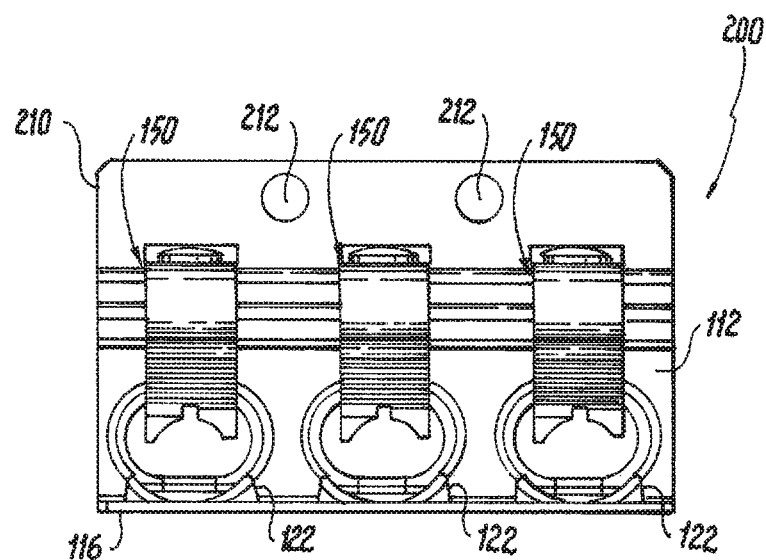
FIG. 29 is a rear elevation view of the cable connector of FIG. 26.

In the exemplary embodiment of the cable retaining member 150 shown, the end portion 156b of leg 156 and the end portion 158c of leg 158 are aligned with the frame 110 so that they can flex when a cable is passed into the cavity 118 in the frame and biased toward a normal state when the cable is fully inserted such that the end portion 156b of leg 156 and/or end portion 158c of leg 158 engage the cable sheathing to impart sufficient resistance to rearward movement of the cable so as to prevent withdrawal of the cable from the housing, as seen in FIG. 35. To accommodate cables having different outside diameters, the legs 156 and 158 can be configured so that the end portions 156b and/or 158c can extend into the cavity 118 and end at different locations within the cavity, such that there is a height difference "H1" between the end portions 156b and 158c, as shown in FIG. 20. To remove the cable from the frame 110, upward pressure can be applied to the legs 156 and 158 of the retaining member 150 so that the end portion 156b and 158c no longer engage the cable sheathing.

Referring to FIGS. 26-29, another exemplary embodiment of the cable connector according to the present disclosure is shown. In this exemplary embodiment, the cable connector 200 is substantially the same as the cable connector 100, except that the cover tabs 138 are replaced with a mounting arm 210 and the mounting bracket 126 does not include mounting apertures 30 for securing the frame 110 of the cable connector 200 to the mounting tabs 28 on the electrical box 10. For ease of description, the common elements between the cable connector 100 and the cable connector 200 will not be repeated, and common element numbers will be the same. In this exemplary embodiment of the cable connector 200, the mounting arm 210 extends from the rear edge 126a of the mounting bracket 126 of the frame 110 in an upward direction, i.e., away from the cavity. The mounting arm 210 is substantially parallel to the front wall 112 so that it can rest against a side wall, e.g., side wall 10a, of an electrical box 10 when installed. The mounting arm 210 includes one or more mounting apertures 212, e.g., threaded or tapped openings, configured to receive mounting fasteners, e.g., threaded set screws, and are used to secure the frame 110 of the cable connector 200 to the electrical box 10. As an example and referring to FIGS. 1 and 42-45, mounting fasteners 214 can be passed through apertures 29 in an electrical box 10, seen in FIG. 1, and threaded into the mounting apertures 212 in the mounting arm 210 of the cable connector 200 and tightened to secure the frame 110 to the electrical box.

Figure 30:
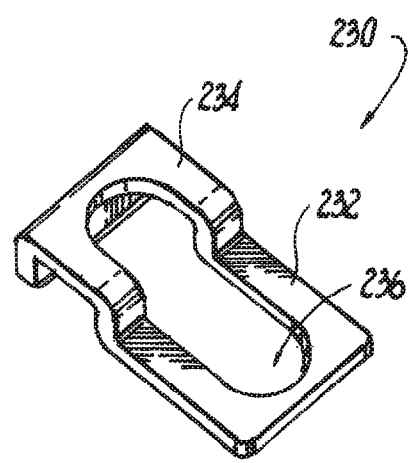
FIG. 30 is a top perspective view of a shim that can be used with the cable connector of the present disclosure.
Figure 31:
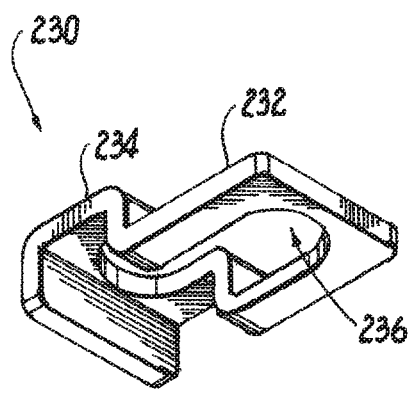
FIG. 31 is a bottom perspective view of the shim of FIG. 30.
Figure 32:
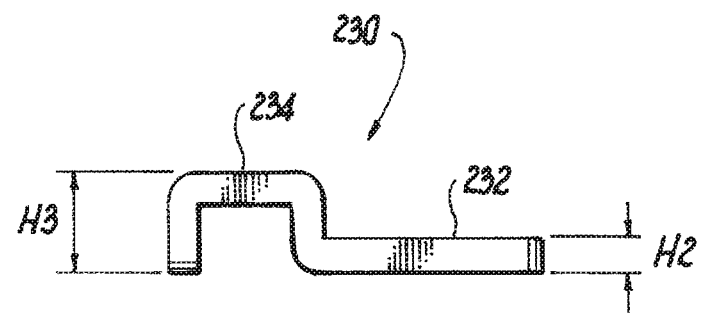
FIG. 32 is a side elevation view of the shim of FIG. 30.
Figure 33:
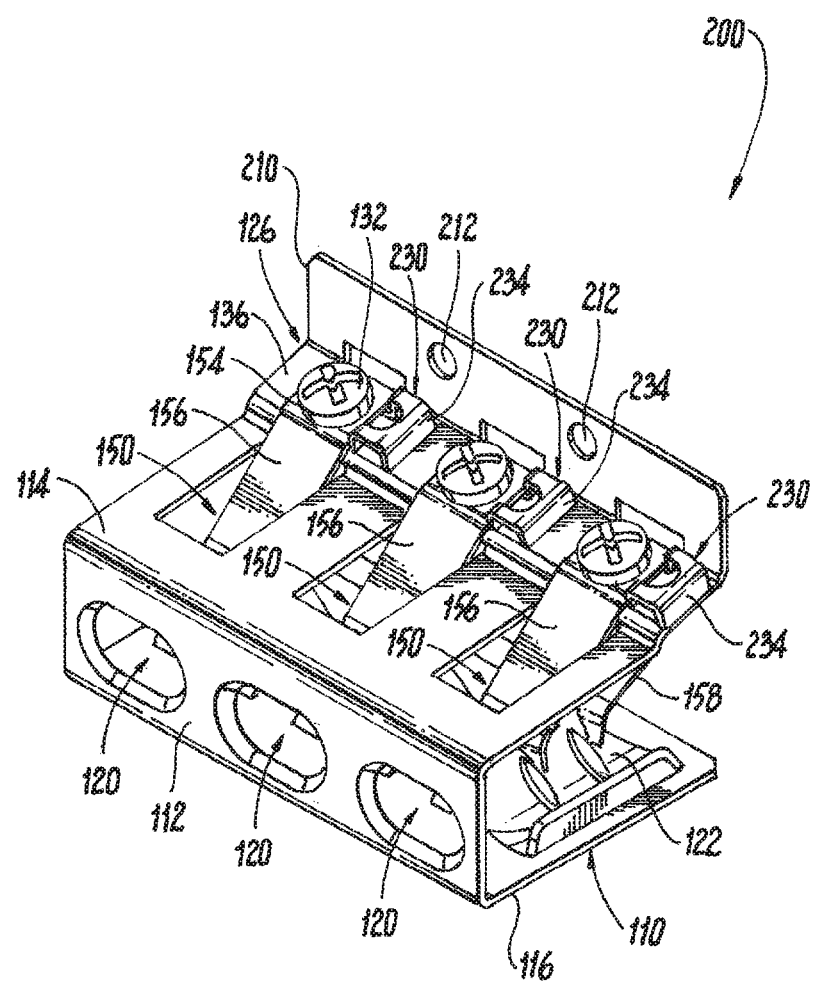
FIG. 33 is a top perspective view of another exemplary embodiment of a cable connector according to the present disclosure, illustrating a plurality of retaining members attached to a frame and a shim associated with each retaining member in a first position.
Figure 34:
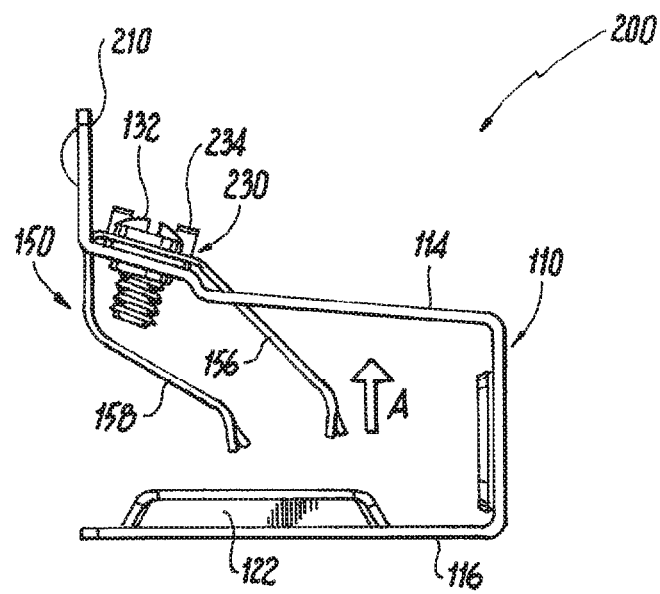
FIG. 34 is a side elevation view of the cable connector of FIG. 33.

Turning to FIGS. 30-32, there may be instances where the cable retaining member 150 may need to be repositioned to receive and secure large diameter cables to the cable connector. To adjust the height position of the cable retaining members 150 relative to the bottom wall 116 of the frame 110, one or more shims 230 can be inserted between the top surface 136 of the mounting bracket 126 and the base portion 154 of the cable retaining member 150 and secured to the frame 110 with the fasteners 132. Each shim 230 has at least one height position to adjust the height position of the of the cable retaining members 150 relative to the bottom wall 116 of the frame 110. In the exemplary embodiment shown, the shim 230 has two height positions. In this exemplary embodiment, each shim 230 is generally rectangular in shape and has a base portion 232, a step portion 234 and a slot 236 extending from the base portion 232 to the step portion 236 so that the shim can be positioned on the frame as described below. The base portion 232 has a height "H2" (seen in FIG. 32) that can raise the legs 156 and 158 of the cable retaining member 150 in the direction of arrow "A" relative to the bottom wall 116 of the frame 110, seen in FIG. 34, by the height "H2." As shown in FIGS. 33-37, when the base portion 232 of the shim 230 is positioned between the base portion 154 of the cable retaining member 150 and the top surface 136 of the mounting bracket 126, the fastener 132 can be tightened to secure the shim 230 to the mounting bracket 126 of the frame 110 so as to adjust the position of the cable retaining member 150 relative to the bottom wall 116 of the frame 110. Similarly, the step portion 234 has a height "H3" (seen in FIG. 32) that can raise the legs 156 and 158 of the cable retaining member 150 in the direction of arrow "A" relative to the bottom wall 116 of the frame 110, seen in FIG. 34, by the height "H3." As shown in FIGS. 38-41, when the step portion 234 of the shim 230 is positioned between the base portion 154 of the cable retaining member 150 and the top surface 136 of the mounting bracket 126, the fastener 132 can be tightened to secure the shim 230 to the mounting bracket 126 of the frame 110 so as to adjust the position of the cable retaining member 150 relative to the bottom wall 116 of the frame 110.

Figure 43:
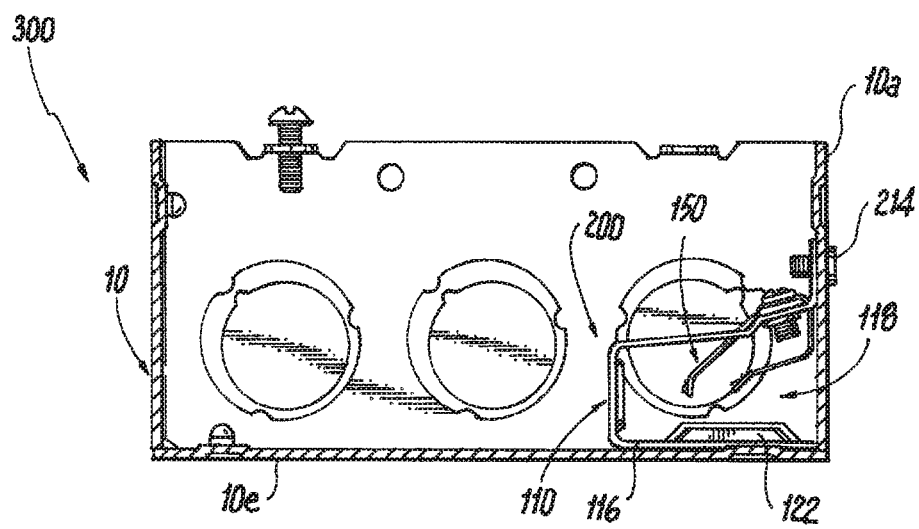
FIG. 43 is a cross-sectional view of the box assembly of FIG. 42 taken along line 43-43, illustrating the cable connector attached to the electrical box.
Figure 44:
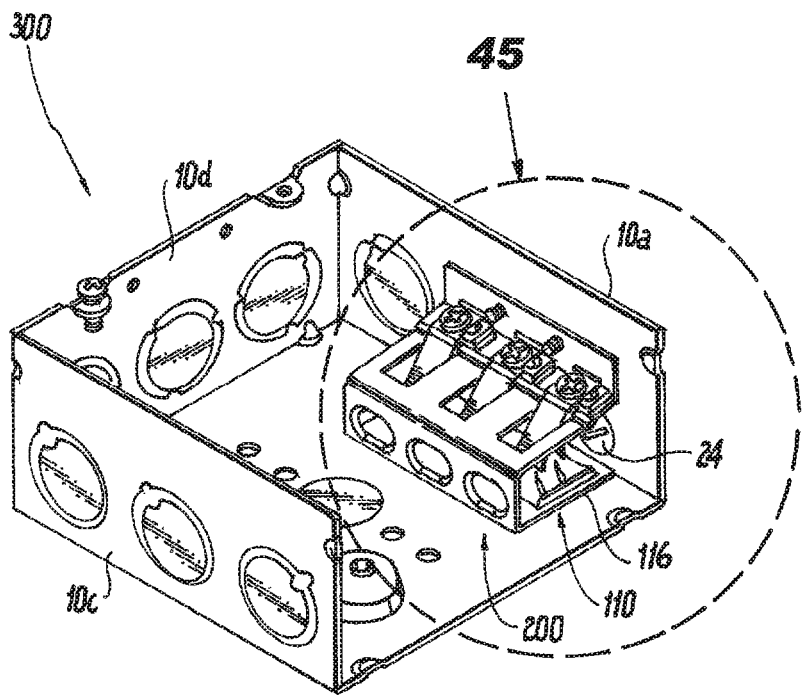
FIG. 44 is top perspective view of the box assembly of FIG. 42 with a side wall removed to reveal the cable connector attached to the electrical box.
Figure 45:
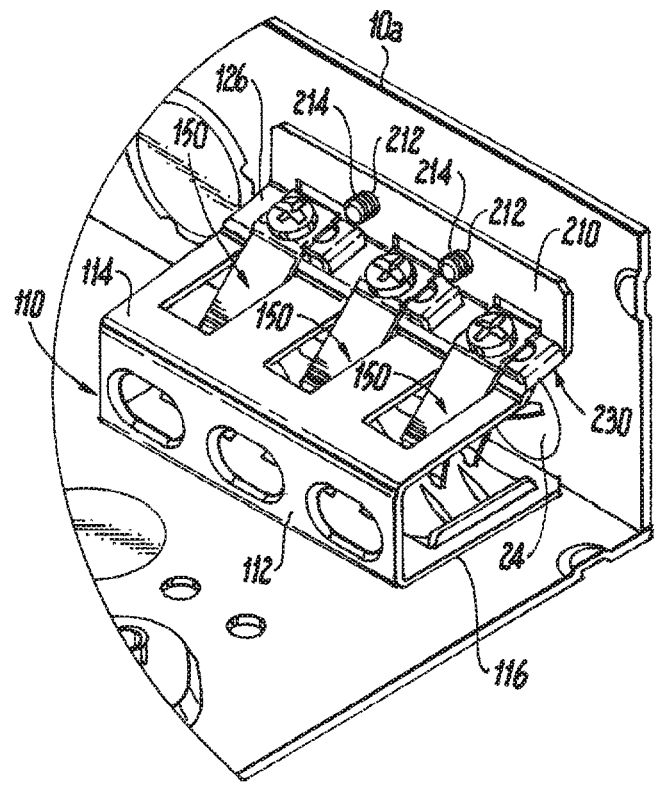
FIG. 45 is an enlarged perspective view of the cable connector attached to the electrical box taken from detail 45 in FIG. 44.
Figure 46:
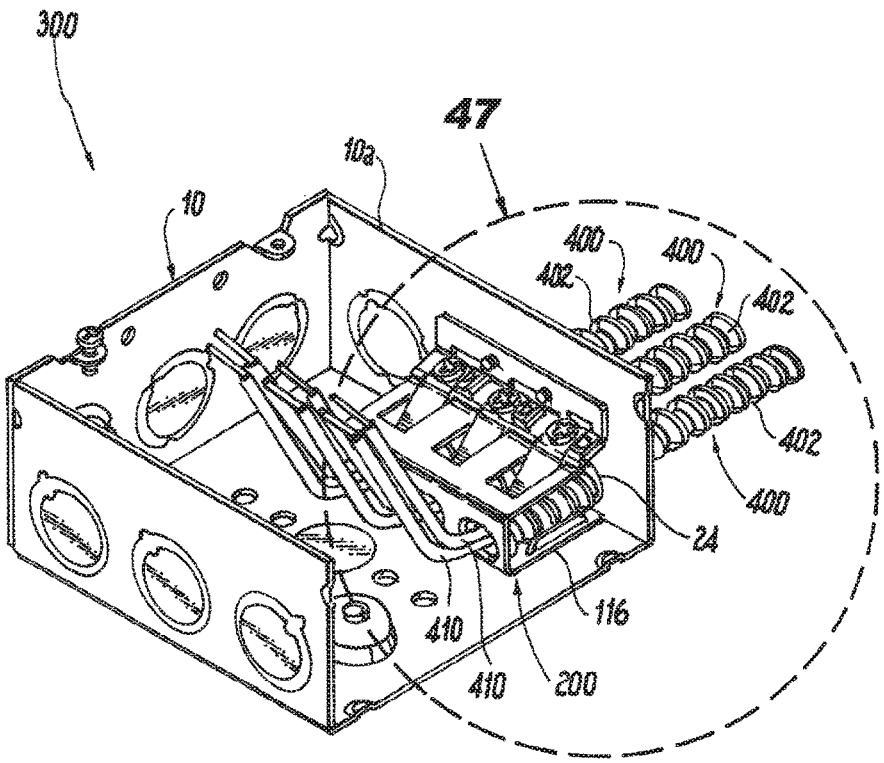
FIG. 46 is top perspective view of the box assembly of FIG. 42 with a side wall removed to reveal cables secured to the cable connector attached to the electrical box.
Figure 47:
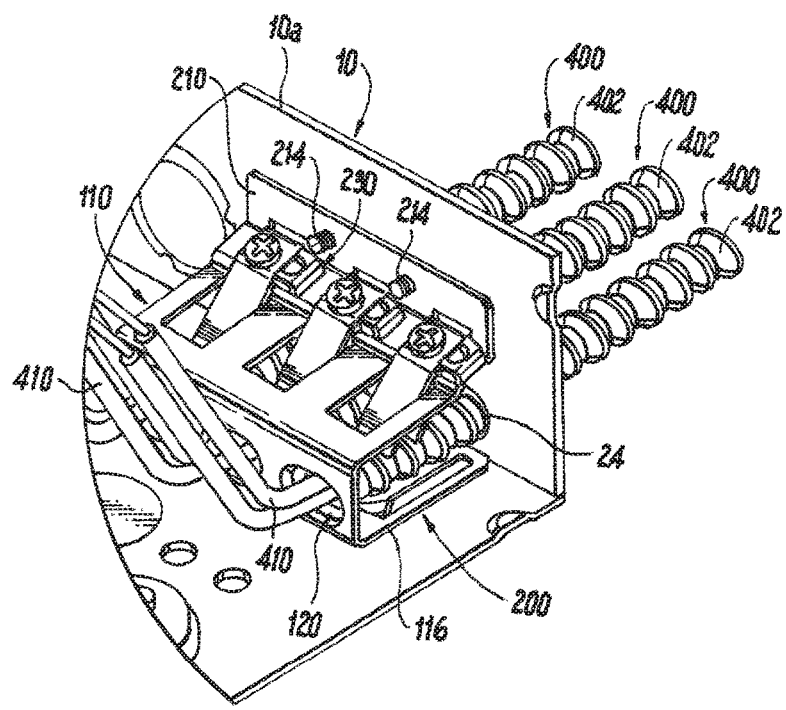
FIG. 47 is an enlarged perspective view of the cables secured to the cable connector attached to the electrical box taken from detail 47 in FIG. 46.

Referring to FIGS. 42-45, another exemplary embodiment of an electrical box assembly according to the present disclosure is shown. In this exemplary embodiment, the electrical box assembly 300 includes an electrical box 10 and one or more cable connectors 200. The electrical box 10 and cable connector 200 are described above and for ease of description are not repeated. In this exemplary embodiment, to mount the cable connector 200 to the electrical box 10, the mounting arm 210 of the frame 110 is positioned against a side wall of the electrical box 10 having cable entrance pry-outs 24, for example side wall 10a. The mounting apertures 212 in the mounting arm 210 of the frame 110 is aligned with apertures 29 in the side wall 10a of an electrical box 10 so that the threaded portion of fasteners 214, e.g., set screws, can pass through the apertures 29 and threaded into mounting apertures 212 to secure the frame 110 to the electrical box 10, as shown. When secured within the electrical box 10, the bottom wall 116 of the frame 110 of the cable connector 200 rests on or is adjacent to the bottom wall 10e of the electrical box 10, as seen in FIG. 43.

Turning to FIGS. 46-49, the operation of the cable connector 100 or 200 according to the present disclosure will be described. For ease of description, the operation will be described with reference to the cable connector 200. When wires 410 of an electrical cable 400 are passed through the pry-out openings 24 in the electrical box 10 the wires 410 enter the cavity 118 of the cable connector 200 and then pass through the corresponding wire opening 120 into the interior of the electrical box. As the wires 410 pass through the wire opening 120 into the electrical box, the cable sheathing 402 enters the cavity 118. As noted, the front wall 112 of the frame 110 acts as a stop to prevent the cable sheathing from entering into the interior of the electrical box. As the cable 400 moves forward within the cavity 118, the end portion 156b of leg 156 and the end portion 158c of leg 158 of the cable retaining member 150 can engage the cable sheathing 402. As described above, the cable retaining member 150 is a flexible member that is able to flex (typically upward) while the sheathing 402 of the electrical cable 400 passes into the cavity 118 of the frame 110 imparting little resistance to the forward advancement of the cable 400 within the cavity 118, while imparting sufficient resistance to rearward movement of the cable 400 to prevent withdrawal of the cable from the frame 110. Thus, releasably securing the cable 400 in the cable connector 200.

Referring now to FIGS. 50-73, exemplary embodiments of electrical box assemblies with one or more cable connectors of the present disclosure that can be secured to an electrical box 10 from outside the electrical box 10 are shown. To secure the cable connector of these exemplary embodiments to the electrical box 10, one or more walls, e.g, side walls 10a-10e, of the electrical box 10 may include one or more knock-outs 26, described above, that can be removed to provide an opening, e.g., a ½ inch or ¾ inch opening, through which a portion of the cable connector is passed and the cable connector is secured to the electrical box with a snap fit, by a nut threaded onto threads of the cable connector or other known techniques.

In the exemplary embodiment of FIGS. 50-57, an electrical box assembly 450 according to the present disclosure is shown. In this exemplary embodiment, the electrical box assembly 450 includes an electrical box 10 and one or more cable connectors 500. The electrical box 10 is described above and for ease of description is not repeated. In this exemplary embodiment, the cable connector 500 is an angled connector having a box mounting portion 510, a cable receiving portion 520 and an intermediate portion 540, seen in FIG. 51. It is noted that the box mounting portion 510, the cable receiving portion 520 and the intermediate portion 540 are for general reference and orientation. The cable connector 500 may be a monolithic structure or formed by securing the portions 510, 520 and/or 540 together using welds, mechanical fasteners and/or adhesive fasteners.

Figure 53:
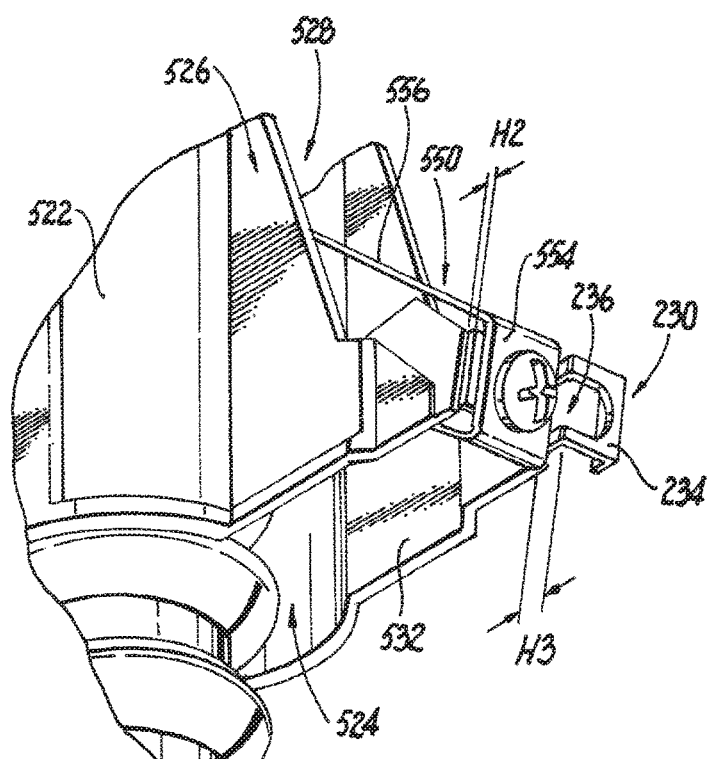
FIG. 53 is an enlarged perspective view of the cable connector of FIG. 52 taken from detail 53, and illustrating the shim mounted to the mounting bracket in a first position.
Figure 54:
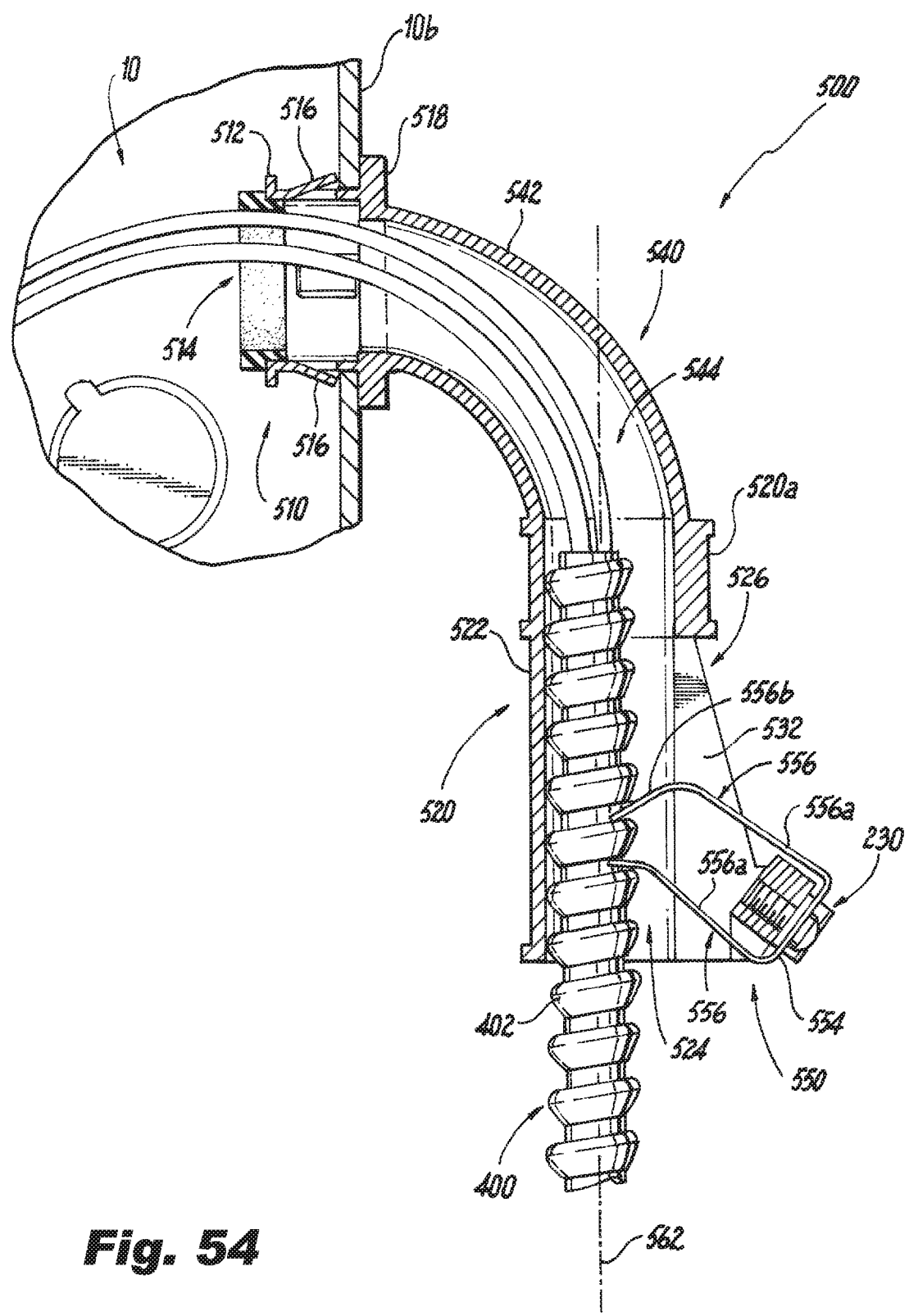
FIG. 54 is a cross sectional view of the cable connector of FIG. 52 taken from line 54-54, and illustrating the retaining member attached to the mounting bracket of the cable connector and engaging a cable inserted into the cable connector, and the shim mounted to the mounting bracket in the first position.

The box mounting portion 510 is configured to secure the cable connector 500 to the electrical box 10 from an exterior of the electrical box. In the embodiment shown in FIGS. 51-57, the box mounting portion 510 has a cylindrical wall 512 with a center opening 514 through which electrical wires can pass. The box mounting portion 510 also includes one or more tabs 516 extending outwardly from the wall 512 and a flange 518 at one end or the box mounting portion 510. The one or more tabs 516 and flange 518 are used to releasably attach the cable connector 500 to an electrical box 10. More specifically, when attaching the cable connector 500 to the electrical box 10, a free end of the box mounting portion 510 is passed through a knock-out opening in a wall of the box, such that the tabs 516 flex inwardly until the tabs pass through the knock-out opening at which point the force flexing the tabs 516 is removed allowing the tabs to spring back to their normal position, as seen in FIG. 54, so that they can engage an interior surface of a wall of the electrical box 10. The flange 518 engages an exterior surface of the electrical box 10 such that the tabs 516 and flange 518 releasably attach the cable connector 500 to the electrical box 10, as seen in FIG. 54.

Figure 51:
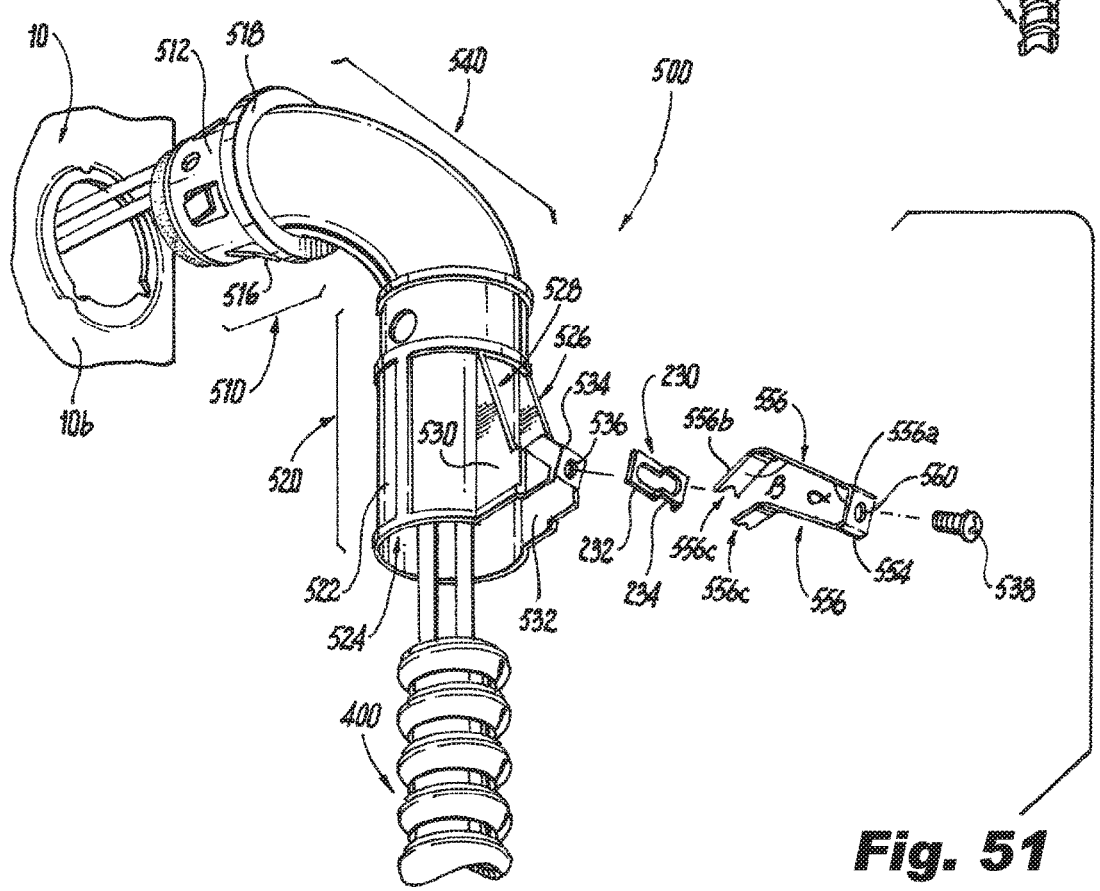
FIG. 51 is an enlarged perspective view of the cable connector positioned for insertion into the electrical box shown in FIG. 50, illustrating a retaining member for attachment to a mounting bracket and a shim associated with the retaining member.
Figure 52:
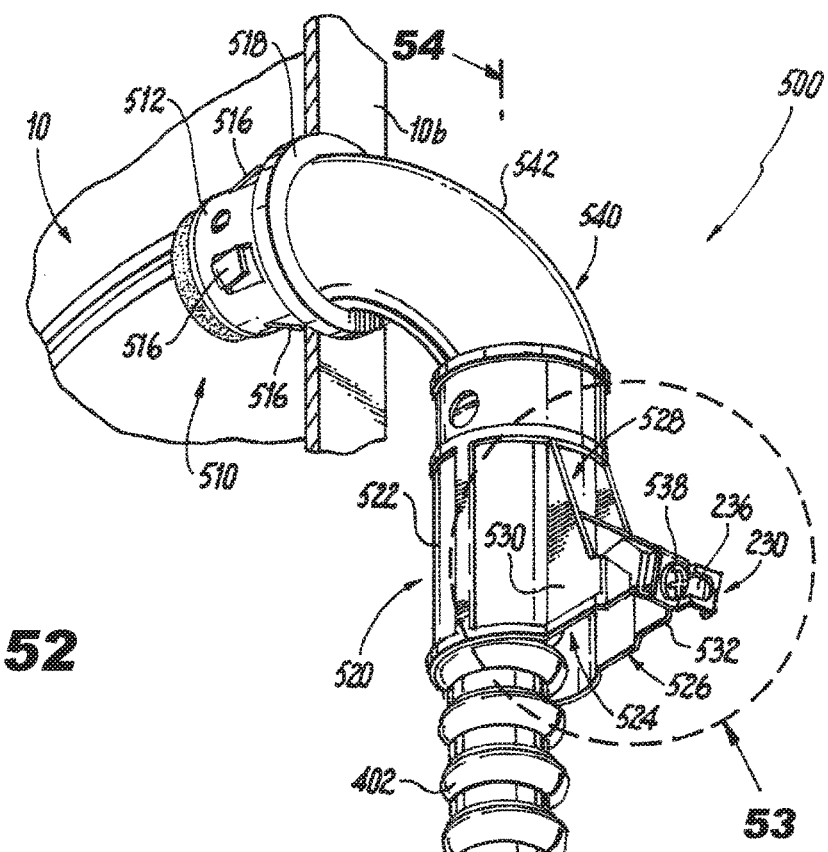
FIG. 52 is a perspective view of the cable connector of FIG. 51 inserted into the electrical box, and illustrating the retaining member attached to the mounting bracket of the cable connector and the shim mounted to the mounting bracket in a first position.

The cable receiving portion 520 of the cable connector 500 is a frame that includes a cylindrical wall 522 having a central opening 524. A mounting bracket 526 extends from the wall 522, and a cutout 528 in the wall 522 permits one or more legs 556 of a cable retaining member 550 to pass into the opening 524. In the exemplary embodiment shown, the mounting bracket 526 has two side walls 530 and 532 and a top wall 534 connected between the side walls 530 and 532 as shown. The side walls 530 and 532 may be inclined walls, as shown in FIGS. 52 and 53, or they may be straight walls. The top wall 534 of the mounting bracket 526 is configured to permit the base portion 554 of the cable retaining member 550 to rest. The top wall 534 may be at an angle relative to a central axis 562 of the cable receiving portion 520 or the top wall 534 may be parallel to the central axis 562 of the cable receiving portion 520. The top wall 534 includes a mounting aperture 536, e.g., a threaded or tapped opening seen in FIG. 51, configured to receive a mounting fastener, e.g., threaded set screws. More specifically, the mounting aperture 536 is configured to receive a mounting fastener 538 used to secure the cable retaining member 550 to the top wall 534 of the cable connector 500.

Continuing to refer to FIGS. 50-57, the cutout 528 in the wall 522 is positioned between the side walls 530 and 532 of the mounting bracket 526 and aligned with the top wall 534. The cutout 528 is generally rectangular in shape and extends along a portion of the wall 522 and is sufficient to permit the legs 556 of a cable retaining member 550 to pass into the opening 524 in the cable receiving portion 520 of the cable connector 500. While the cutout 528 is shown as rectangular in shape, one skilled in the art would readily recognize that the cutout can be in any shape suitable to provide access to the central opening 524 in the cable receiving portion 520.

The cable retaining member 550 may be provided in various shapes and sizes sufficient to flex while an electrical cable passes into the cable receiving portion 520 imparting little resistance to the forward advancement of the cable into the cable receiving portion 520, while imparting sufficient resistance to rearward movement of the cable to prevent withdrawal of the cable from the cable receiving portion 520. In other words, the flexible legs extending into the opening 524 can engage an electrical cable and hold the electrical cable while preventing withdrawal of the electrical cable from the cable receiving portion 520. Referring to FIGS. 51 and 54, an exemplary embodiment of the retaining member 550 includes a base portion 554 and at least one leg 556 extending from the base portion 554. The base portion 554 is generally straight and includes an aperture 560 used in securing the cable retaining member 550 to the mounting bracket 526.

The leg 556 has a substantially straight main body 556a that extends from the base portion 554 at an angle "α", and an end portion 556b that is at an angle "β" relative to the main body 556a. As such, the leg 556 is cantilevered from the base portion 554 at the point where the base portion 554 connects to the leg 556. This cantilever permits flexibility of the leg 556 relative to the base portion 554, which is secured to the mounting bracket 526. The angle "α" may depend upon a number of factors, including, the length of the leg portion 556 of cable retaining member 550, and the angle between the base portion 554 and a central axis 562 of the cable retaining member 520, seen in FIG. 54. As an example, the angle "α" can be 150 degrees, which provides suitable flexibility of the cable retaining member 550 to allow insertion of a cable into the cable receiving portion 520 while imparting sufficient resistance to rearward movement of the cable to prevent withdrawal of the cable from the cable receiving portion 520. The angle "β" may depend upon a number of factors, including the angle "α" and the angle between the base portion 554 and the central axis 562 of the cable receiving portion 520. As an example, the angle "β" can be 130 degrees. The end portion 556b of leg 556 may include an arcuate portion 556c that is configured to substantially conform to an outer periphery of the sheathing of an electrical cable, and to engage the sheathing of the electrical cable, as will be described below.

In the exemplary embodiment shown in FIGS. 51 and 54, the cable retaining member 550 has two legs 556. Each leg 556 is connected to an end of the base portion 554 as shown. The legs 556 are secured to the base portion 54 so that the long surfaces of each leg 556 are in parallel, and capable of flexing while an electrical cable passes into the cable receiving portion 520 imparting little resistance to the forward advancement of the cable into the cable receiving portion 520. The end portion 556b of the leg 556 engages the cable to impart sufficient resistance to rearward movement of the cable to prevent withdrawal of the cable from the cable receiving portion 520. The cable retaining member 550 may be made of metal, e.g., steel or galvanized steel, or from non-metallic materials, such as plastic. An example of a suitable plastic material is injection molded thermoplastic. The cable retaining member 550 may be made as a single unitary member bent or stamped to a desired size and shape, or the cable retaining member 550 may comprise a plurality of components joined together with, for example, welds to a size and shape sufficient to retain a cable within the cable receiving portion 520.

The intermediate portion 540 of the cable connector 500 is a tubular like member having a wall 542 and a center opening 544, seen in FIG. 54, that permits electrical wires to pass from the cable receiving portion 520 to the box mounting portion 510 and into the electrical box 10, as seen in FIG. 54. One end of the intermediate portion 540 is integral with or monolithically formed into the flange 518 so that the center opening 544 aligns with the center opening 514 of the box mounting portion 510. The other end of the intermediate portion 540 is integral with or monolithically formed into one end of the wall 522 of the cable receiving portion 520 so that the center opening 544 aligns with the center opening 524 of the cable receiving portion 520. With an angled cable connector 500, the intermediate portion 540 is curved or bent to have a radius that may range from about 22 degrees to about 90 degrees. The radius may be a sharp radius or a sweeping radius. In the exemplary embodiment shown, the radius is a sweeping radius.

Figure 55:
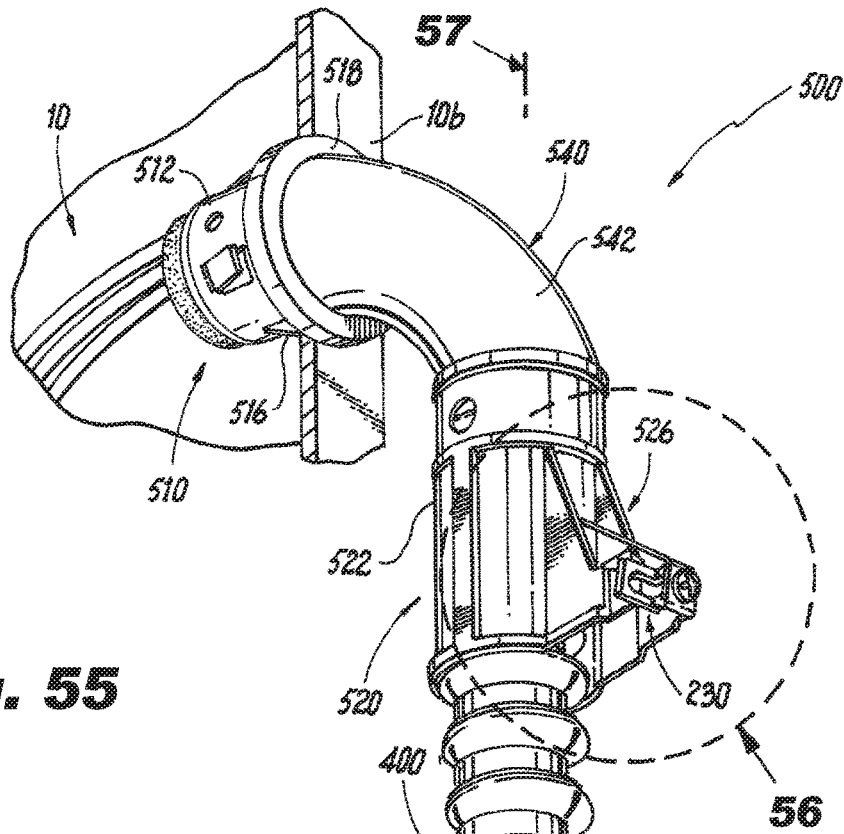
FIG. 55 is a perspective view of the cable connector of FIG. 52, illustrating the shim mounted to the mounting bracket in a second position.
Figure 56:
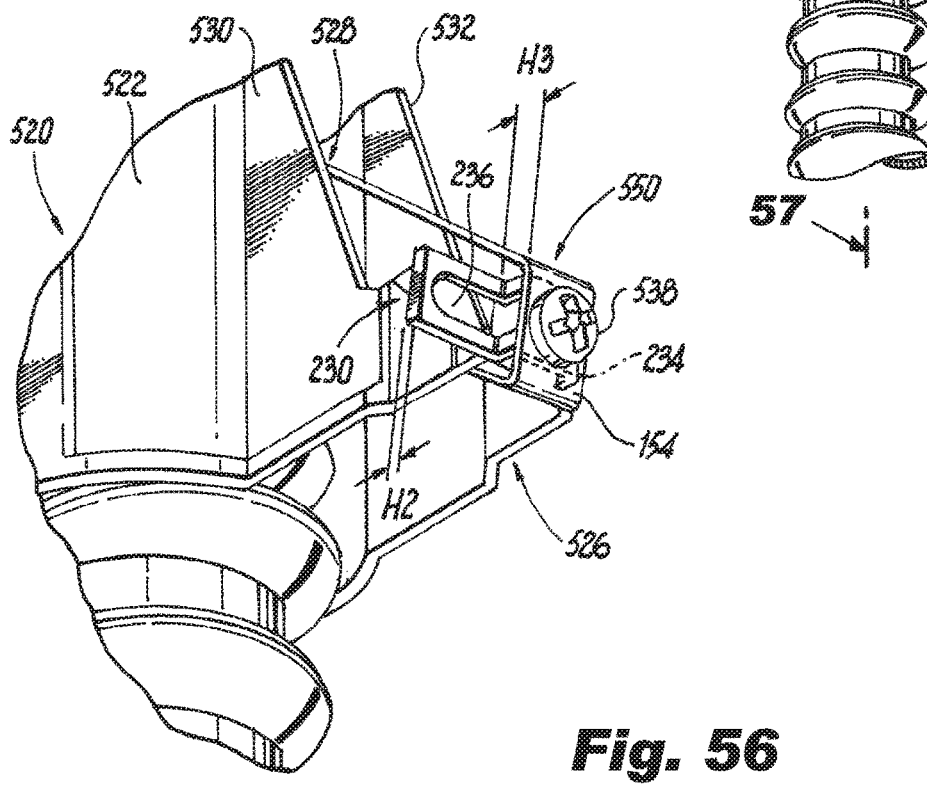
FIG. 56 is an enlarged perspective view of the cable connector of FIG. 55 taken from detail 56, and illustrating the shim mounted to the mounting bracket in the second position.
Figure 57:
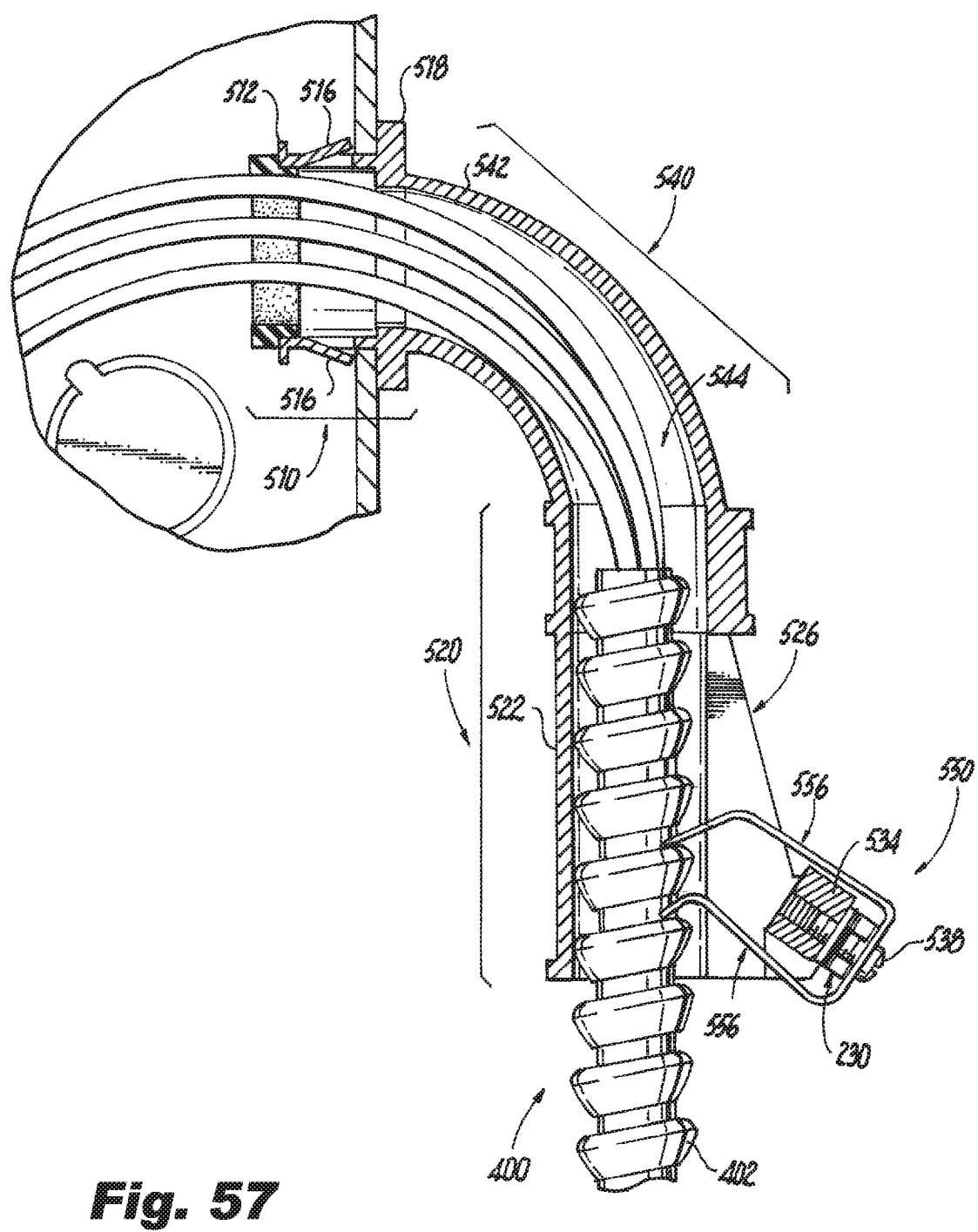
FIG. 57 is a cross sectional view of the cable connector of FIG. 55 taken from line 57-57, and illustrating the retaining member attached to the mounting bracket of the cable connector and engaging a cable inserted into the cable connector, and the shim mounted to the mounting bracket in the second position.
Figure 58:
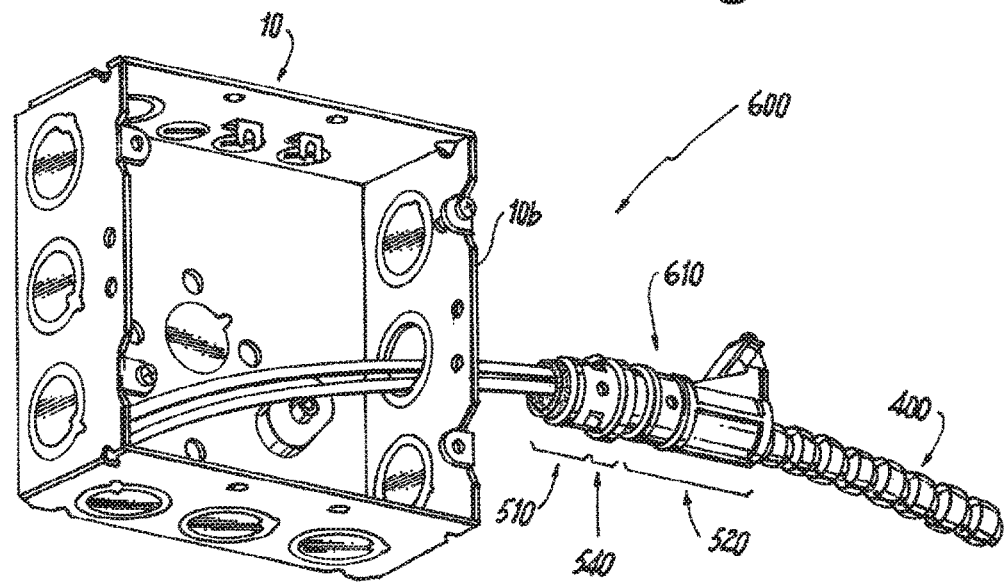
FIG. 58 is a perspective view of another exemplary embodiment of an electrical box and a cable connector according to the present disclosure with the cable connector positioned for insertion into the electrical box.

Referring to FIGS. 30-32, 51 and 53, there may be instances where the cable retaining member 550 may need to be repositioned to receive and secure large diameter cables to the cable connector 500. To adjust the height position of the cable retaining members 550 relative to the top wall 534 of the mounting bracket 526, one or more shims 230 can be inserted between the top wall 534 of the mounting bracket 526 and the base portion 554 of the cable retaining member 550 and secured to the mounting bracket 526 with the fasteners 538. Each shim 230 has at least one height position to adjust the height position of the of the cable retaining members 550 relative to the top wall 534 of the mounting bracket 526. In the exemplary embodiment shown, the shim 230 has two height positions. In this exemplary embodiment, each shim 230 is generally rectangular in shape and has a base portion 232, a step portion 234 and a slot 236 extending from the base portion 232 to the step portion 236 so that the shim can be positioned on the top wall 534 as described below. The base portion 232 has a height "H2," seen in FIG. 32, that can raise the legs 556 of the cable retaining member 150 relative to the central opening 524 of the cable receiving portion 520 by the height "H2." As shown in FIGS. 52-54, when the base portion 232 of the shim 230 is positioned between the base portion 554 of the cable retaining member 550 and the top wall 534 of the mounting bracket 526, the fastener 538 can be tightened to secure the shim 230 to the mounting bracket 526 so as to adjust the position of the cable retaining member 550 relative to the central opening 524 of the cable receiving portion 540 of the cable connector 500. Similarly, the step portion 234 has a height "H3," seen in FIG. 32, that can raise the legs 556 of the cable retaining member 150 relative to the central opening 524 of the cable receiving portion 540 by the height by the height "H3." As shown in FIGS. 55-57, when the step portion 234 of the shim 230 is positioned between the base portion 554 of the cable retaining member 550 and the top wall 534 of the mounting bracket 526, the fastener 538 can be tightened to secure the shim 230 to the mounting bracket 526 so as to adjust the position of the cable retaining member 550 relative to central opening 524 of the cable receiving portion 520.

Figure 59:
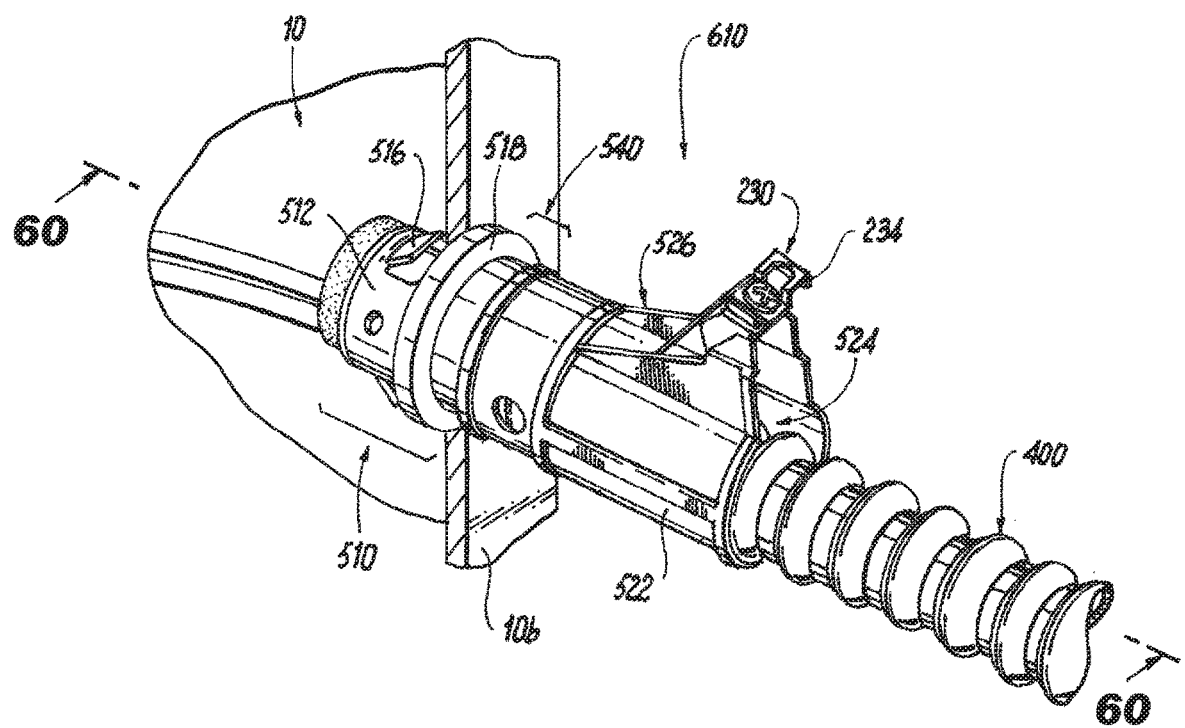
FIG. 59 is an enlarged perspective view of the cable connector inserted into the electrical box shown in FIG. 58, illustrating a retaining member attached to a mounting bracket and a shim mounted to the mounting bracket in a first position.
Figure 60:
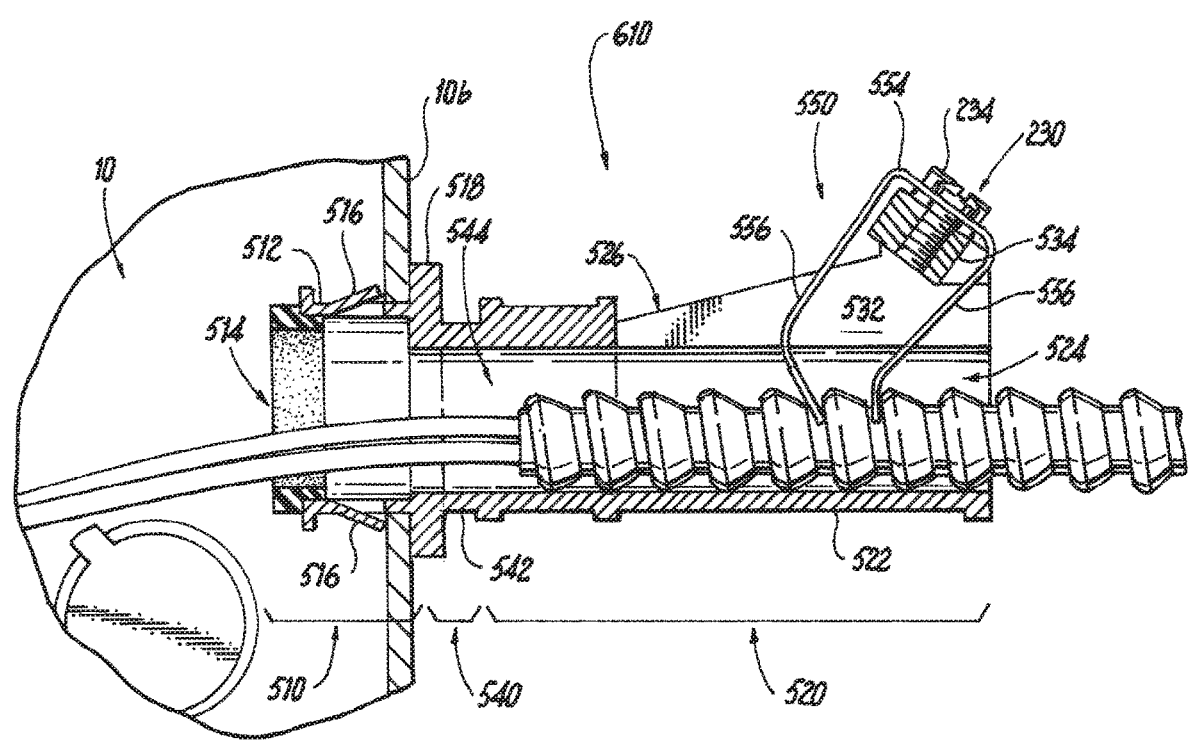
FIG. 60 is a cross sectional view of the cable connector of FIG. 59 taken from line 60-60, illustrating the retaining member attached to the mounting bracket of the cable connector and engaging a cable inserted into the cable connector, and the shim mounted to the mounting bracket in the first position.

In the exemplary embodiment of FIGS. 58-62, an electrical box assembly 600 according to the present disclosure is shown. In this exemplary embodiment, the electrical box assembly 600 includes an electrical box 10 and one or more cable connectors 610. The electrical box 10 is described above and for ease of description is not repeated. In this exemplary embodiment, the cable connector 600 is substantially similar to the cable connector 500 described above, except the intermediate portion 540 can be removed or the intermediate portion can be a straight tubular member. Common elements of cable connector 500 and cable connector 600 will have the same identifying numbers. In the exemplary embodiment shown, the intermediate portion 540 is a straight member so that the cable connector 600 is a straight cable connector. The cable connector 600 has a box mounting portion 510, a cable receiving portion 520 and the intermediate portion 540, seen in FIG. 58. The box mounting portion 510 is configured to secure the cable connector 600 to the electrical box 10 from an exterior of the electrical box. In the embodiment shown in FIGS. 58-62, the box mounting portion 510 has a cylindrical wall 512 with a center opening 514 through which electrical wires can pass. The box mounting portion 510 also includes one or more tabs 516 extending outwardly from the wall 512 and a flange 518. The one or more tabs 516 and flange 518 are used to releasably attach the cable connector 600 to an electrical box 10 as described above. More specifically, when attaching the cable connector 600 to the electrical box 10, a free end of the box mounting portion 510 is passed through a knock-out opening in a wall of the electrical box 10, such that the tabs 516 flex inwardly until the tabs pass through the knock-out opening at which point the force flexing the tabs 516 is removed allowing the tabs to spring back to their normal position, as seen in FIG. 60, so that they can engage an interior surface of a wall of the electrical box 10. The flange 518 engages an exterior surface of a wall of the electrical box 10 such that the tabs 516 and flange 518 releasably attach the cable connector 500 to the electrical box 10, as seen in FIG. 60.

The cable receiving portion 520 of the cable connector 500 includes a cylindrical wall 522 having a central opening 524. A mounting bracket 526 extends from the wall 522, and a cutout 528 in the wall 522 permits one or more legs 556 of a cable retaining member 550 to pass into the central opening 524. In the exemplary embodiment shown, the mounting bracket 526 has two side walls 530 and 532 and a top wall 534 connected between the side walls 530 and 532 as shown. The side walls 530 and 532 may be inclined walls, as shown in FIGS. 52 and 53, or they may be straight walls. The top wall 534 of the mounting bracket 526 is configured to permit the base portion 554 of the cable retaining member 550 to rest. The top wall 534 may be at an angle relative to the central axis 562 of the cable receiving portion 520 or the top wall 534 may be parallel to the central axis 562 of the cable receiving portion 520. The top wall 534 includes a mounting aperture similar to the mounting aperture 536, e.g., a threaded or tapped opening, shown in FIG. 51. The mounting aperture 536 is configured to receive a mounting fastener 538, e.g., threaded set screws. More specifically, the mounting aperture 536 is configured to receive a mounting fastener 538 used to secure the cable retaining member 150 to the top wall 534 of the cable connector 600.

The cutout 528 in the wall 522 is positioned between the side walls 530 and 532 of the mounting bracket 526 and aligned with the top wall 534. The cutout 528 is generally rectangular in shape and extends along a portion of the wall 522 and is sufficient to permit the legs 556 of a cable retaining member 550 to pass into the central opening 524 in the cable receiving portion 520 of the cable connector 600. While the cutout 528 is shown as rectangular in shape, one skilled in the art would readily recognize that the cutout can be in any shape suitable to provide access to the central opening 524 in the cable receiving portion 520.

The cable retaining member 550 shown in the embodiments of FIGS. 58-62 is substantially similar to the cable retaining member 550 described above and for ease of description will not be described again in detail.

Figure 62:
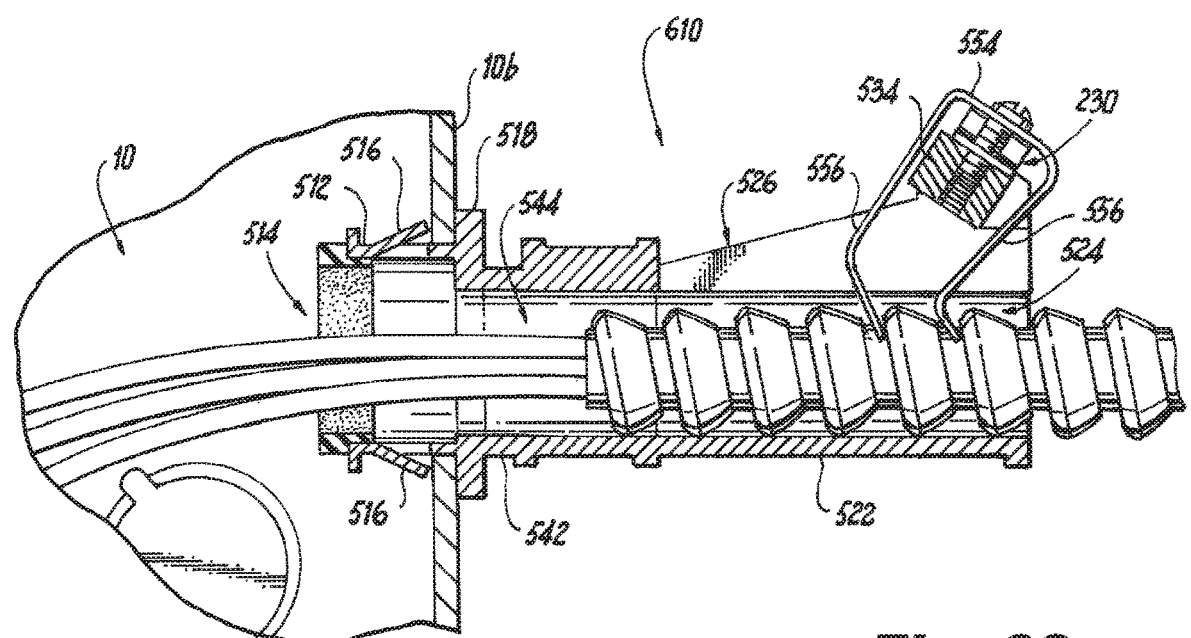
FIG. 62 is a cross sectional view of the cable connector of FIG. 61 taken from line 62-62, illustrating the retaining member attached to the mounting bracket of the cable connector and engaging a cable inserted into the cable connector, and the shim mounted to the mounting bracket in the second position.

Referring to FIGS. 60 and 62, the intermediate portion 540 in this exemplary embodiment of the cable connector 600 is a straight tubular like member having a wall 542 and a center opening 544 that permits electrical wires to pass from the cable receiving portion 520 to the box mounting portion 510 and into the electrical box 10. One end of the intermediate portion 540 is integral with or monolithically formed into the flange 518 so that the center opening 544 aligns with the center opening 514 of the box mounting portion 510. The other end of the intermediate portion 540 is integral with or monolithically formed into one end of the wall 522 of the cable receiving portion 520 so that the center opening 544 aligns with the center opening 524 of the cable receiving portion 520.

Figure 61:
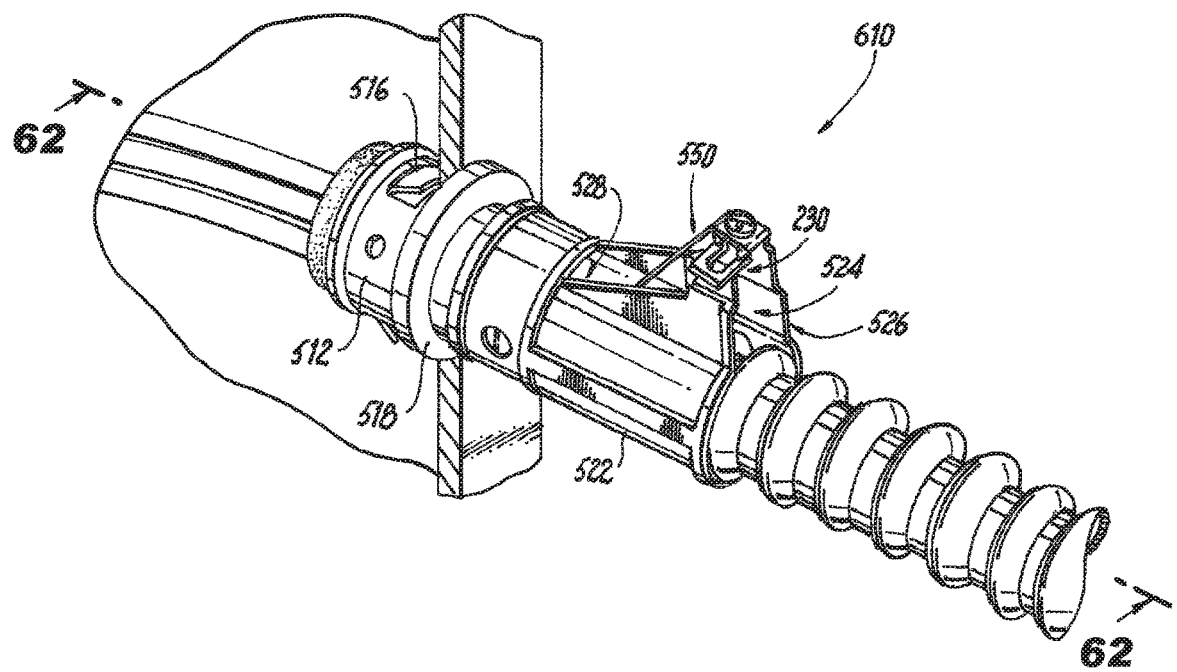
FIG. 61 is an enlarged perspective view of the cable connector inserted into the electrical box shown in FIG. 58, illustrating a retaining member attached to a mounting bracket and a shim mounted to the mounting bracket in a second position.

Referring to FIGS. 30-32, 59-62, there may be instances where the cable retaining member 550 may need to be repositioned to receive and secure large diameter cables to the cable connector 600. To adjust the height position of the cable retaining members 550 relative to the top wall 534 of the mounting bracket 526, one or more shims 230 can be inserted between the top wall 534 of the mounting bracket 526 and the base portion 554 of the cable retaining member 550 and secured to the mounting bracket 526 with the fastener 538. Each shim 230 has at least one height position to adjust the height position of the of the cable retaining member 550 relative to the top wall 534 of the mounting bracket 526. In the exemplary embodiment shown, the shim 230 has two height positions. In this exemplary embodiment, each shim 230 is generally rectangular in shape and has a base portion 232, a step portion 234 and a slot 236 extending from the base portion 232 to the step portion 236 so that the shim can be positioned on the top wall 534 as described herein. The base portion 232 has a height "H2," seen in FIG. 32, that can raise the legs 556 of the cable retaining member 550 relative to the central opening 524 of the cable receiving portion 520 by the height "H2." As shown in FIGS. 59 and 60, when the base portion 232 of the shim 230 is positioned between the base portion 554 of the cable retaining member 550 and the top wall 534 of the mounting bracket 526, the fastener 538 can be tightened to secure the shim 230 to the mounting bracket 526 so as to adjust the position of the cable retaining member 550 relative to the central opening 524 of the cable receiving portion 540 of the cable connector 600. Similarly, the step portion 234 has a height "H3," seen in FIG. 32, that can raise the legs 556 of the cable retaining member 550 relative to the central opening 524 of the cable receiving portion 520 by the height "H3." As shown in FIGS. 61 and 62, when the step portion 234 of the shim 230 is positioned between the base portion 554 of the cable retaining member 550 and the top wall 534 of the mounting bracket 526, the fastener 538 can be tightened to secure the shim 230 to the mounting bracket 526 so as to adjust the position of the cable retaining member 550 relative to central opening 524 of the cable receiving portion 520.

Referring now to FIGS. 63-67, exemplary embodiments of electrical box assemblies with one or more dual cable connectors that can be secured to the electrical box 10 from outside the electrical box 10 are shown. To secure the cable connector of these exemplary embodiments to the electrical box 10, one or more walls, e.g., walls 10a-10e, of the electrical box 10 may include one or more knock-outs 26, described above, that can be removed to provide an opening, e.g., a ½ inch or ¾ inch opening, through which a portion of the cable connector is passed and the cable connector is secured to the electrical box with a snap fit, by a nut threaded onto threads of the cable connector or other known techniques. In the exemplary embodiment shown, the cable connector is secured to the electrical box by a nut threaded onto threads of the cable connector.

In the exemplary embodiment of FIGS. 63-66, an electrical box assembly 650 according to the present disclosure is shown. In this exemplary embodiment, the electrical box assembly 650 includes an electrical box 10 and one or more cable connectors 700. The electrical box 10 is described above and for ease of description is not repeated. In this exemplary embodiment, the cable connector 700 is a dual connector capable of receiving two electrical cables. The cable connector 700 has a box mounting portion 710, a cable receiving portion 720 and an intermediate portion 740, seen in FIG. 63. It is noted that the box mounting portion 710, the cable receiving portion 720 and the intermediate portion 740 are for general reference and orientation. The cable connector 700 may be a monolithic structure or formed by securing the portions 710, 720 and/or 740 together using welds, mechanical fasteners and/or adhesive fasteners.

Figure 63:
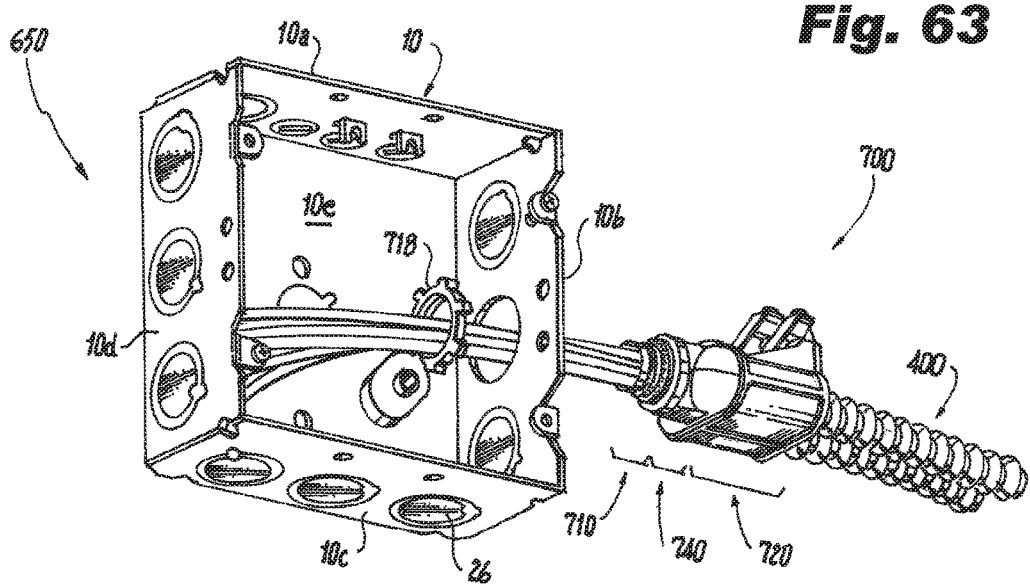
FIG. 63 is a perspective view of another exemplary embodiment of an electrical box and a cable connector according to the present disclosure where the cable connector is capable of receiving multiple cables and is positioned for insertion into the electrical box.

The box mounting portion 710 is configured to secure the cable connector 700 to the electrical box 10 from an exterior of the electrical box. In the embodiment shown in FIGS. 63-66, the box mounting portion 710 has a threaded head 712 with a center opening 714 through which electrical wires can pass. The threaded head 712 includes a flange 716. The threaded head 712 and flange 716 are used to releasably attach the cable connector 700 to an electrical box 10. More specifically, when attaching the cable connector 700 to the electrical box 10, the threaded head 712 of the box mounting portion 710 is passed through a knock-out opening in a wall, e.g., walls 10a-10e, of the electrical box 10, as seen in FIG. 65, until the flange 716 engages an exterior surface of a wall of the electrical box 10. A nut 718, seen in FIG. 63, is threaded on the head 712 and tightened to releasably attach the cable connector 700 to the electrical box 10.

Figure 64:
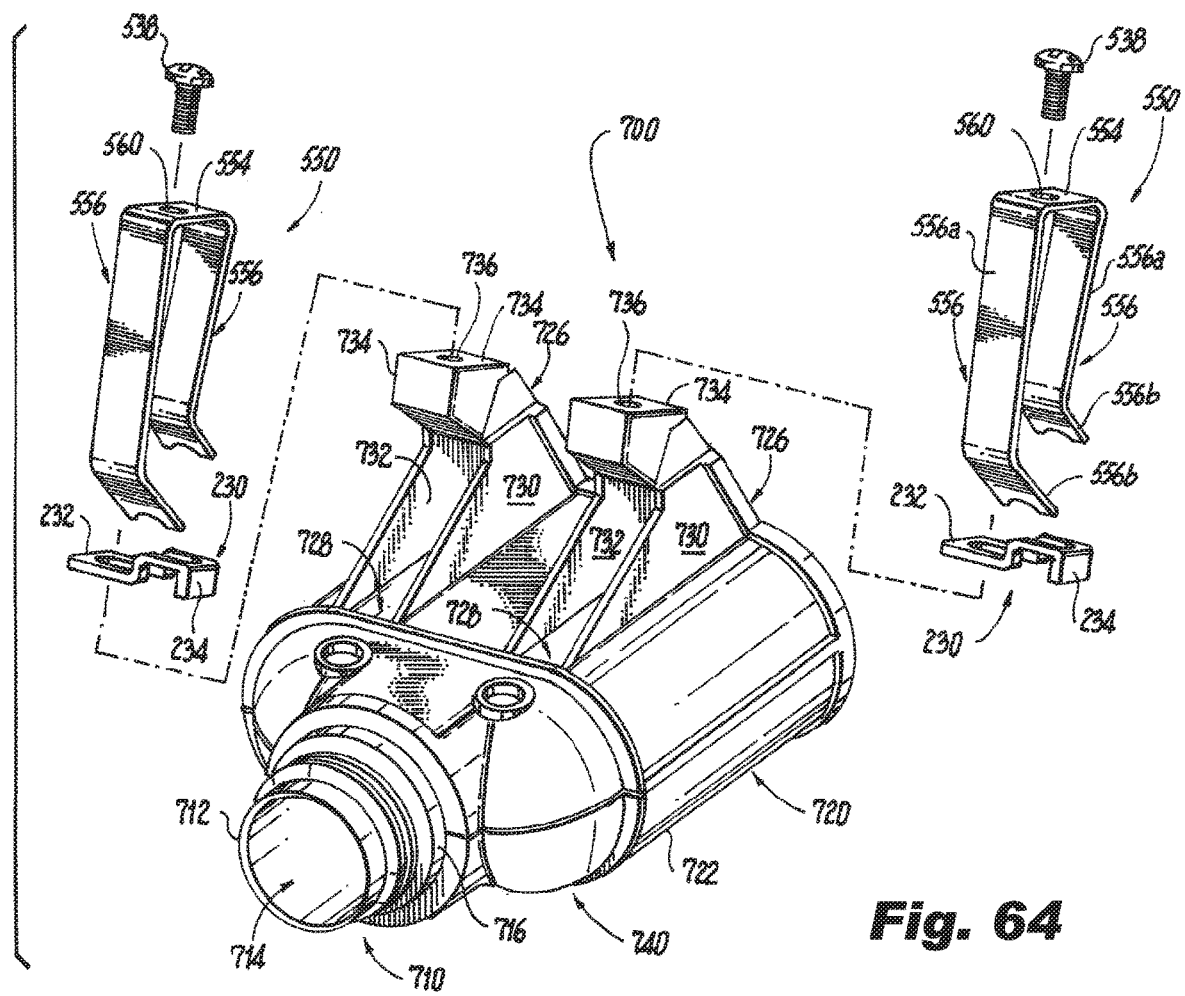
FIG. 64 is a front perspective view with parts separated of the cable connector of FIG. 63.
Figure 65:
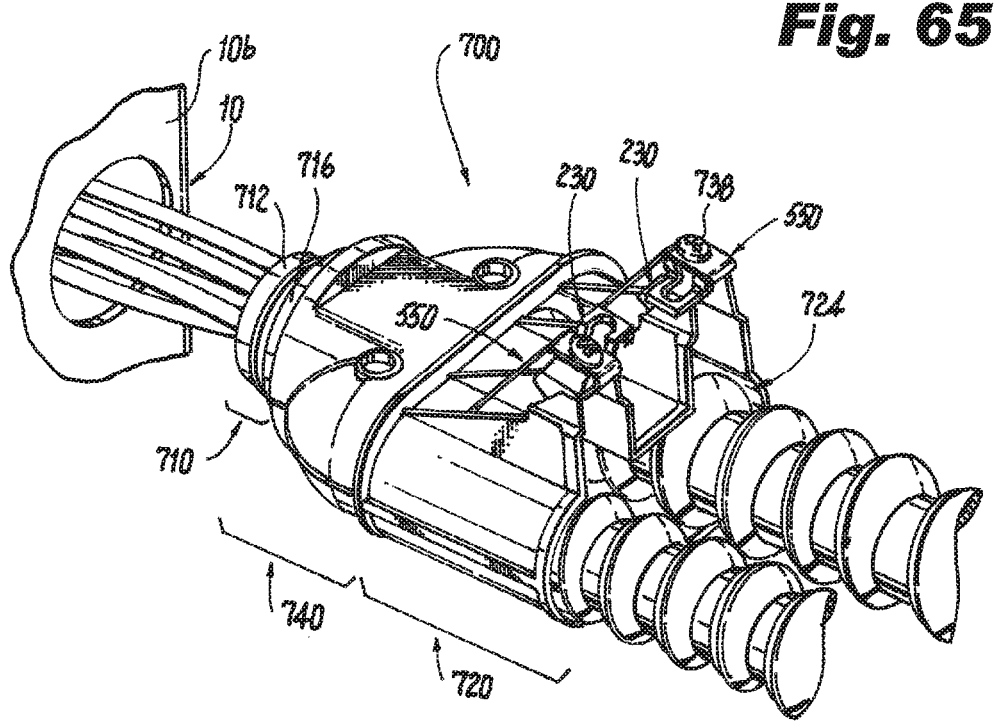
FIG. 65 is a rear perspective of the cable connector of FIG. 63, illustrating two cables inserted into the cable connector and illustrating two retaining members each attached to a mounting bracket of the cable connector and engaging a cable, a first shim mounted to one of the mounting brackets in a first position and a second shim mounted to another mounting bracket in a second position.

The cable receiving portion 720 of the cable connector 700 includes a wall 722 having a central opening 724, a plurality of mounting brackets 726 that extend from the wall 722, and plurality of cutouts 728, seen in FIG. 64, that permit one or more legs 556 of a cable retaining member 550 to pass into the central opening 724. In the exemplary embodiment shown, each mounting bracket 726 has two side walls 730 and 732 and a top wall 734 connected between the side walls 730 and 732 as shown. The side walls 730 and 732 may be inclined walls, as shown in FIG. 64, or they may be straight walls. The top wall 734 of the mounting bracket 726 is configured to permit the base portion 554 of the cable retaining member 550 to rest. The top wall 734 may be at an angle relative to a central axis 562 of the cable receiving portion 720 or the top wall 734 may be parallel to the central axis 562 of the cable receiving portion 720. The top wall 734 includes a mounting aperture 736, e.g., a threaded or tapped opening seen in FIG. 64, configured to receive a mounting fastener, e.g., a threaded set screw. More specifically, the mounting aperture 736 is configured to receive a mounting fastener 738, seen in FIG. 66, used to secure the cable retaining member 550 to the top wall 734 of the cable connector 700.

Each cutout 728 in the wall 722 is positioned between the side walls 730 and 732 of the respective mounting bracket 726 and aligned with the top wall 734. Each cutout 728 is generally rectangular in shape and extends along a portion of the wall 722 and is sufficient to permit the legs 556 of a cable retaining member 550 to pass into the central opening 724 in the cable receiving portion 720 of the cable connector 700. While each cutout is shown as rectangular in shape, one skilled in the art would readily recognize that each cutout 728 can be in any shape suitable to provide access to the central opening 724 in the cable receiving portion 720.

The cable retaining member 550 shown in the embodiments of FIGS. 63-67 is substantially similar to the cable retaining member 550 described above and for ease of description will not be described again in detail.

In the exemplary embodiment of FIGS. 63-66, the intermediate portion 740 of the cable connector 700 is a reducing member, e.g., a T-shaped like member, that reduces the opening 724 of the cable receiving portion 720 to the opening 714 of the box receiving portion 710. In this configuration, the intermediate portion 740 funnels electrical wires within the cable receiving portion 720 into the box receiving portion 710 and into the electrical box 10, as seen in FIGS. 63 and 65. One end of the intermediate portion 740 is integral with or monolithically formed into the flange 716 and the other end of the intermediate portion 740 is integral with or monolithically formed into the wall 722 of the cable receiving portion 720. In the exemplary embodiment of FIG. 67, the intermediate portion 740 of the cable connector 700 is a reducing member 742, e.g., a T-shaped like member, with a curved or angled tube 744 between the flange 716 of the box receiving portion 710 and the reducing member 742. The curved or angled tube 744 has a radius that may range from about 22 degrees to about 90 degrees. The radius may be a sharp radius or a sweeping radius. In the exemplary embodiment shown, the radius is a sweeping radius.

Figure 66:
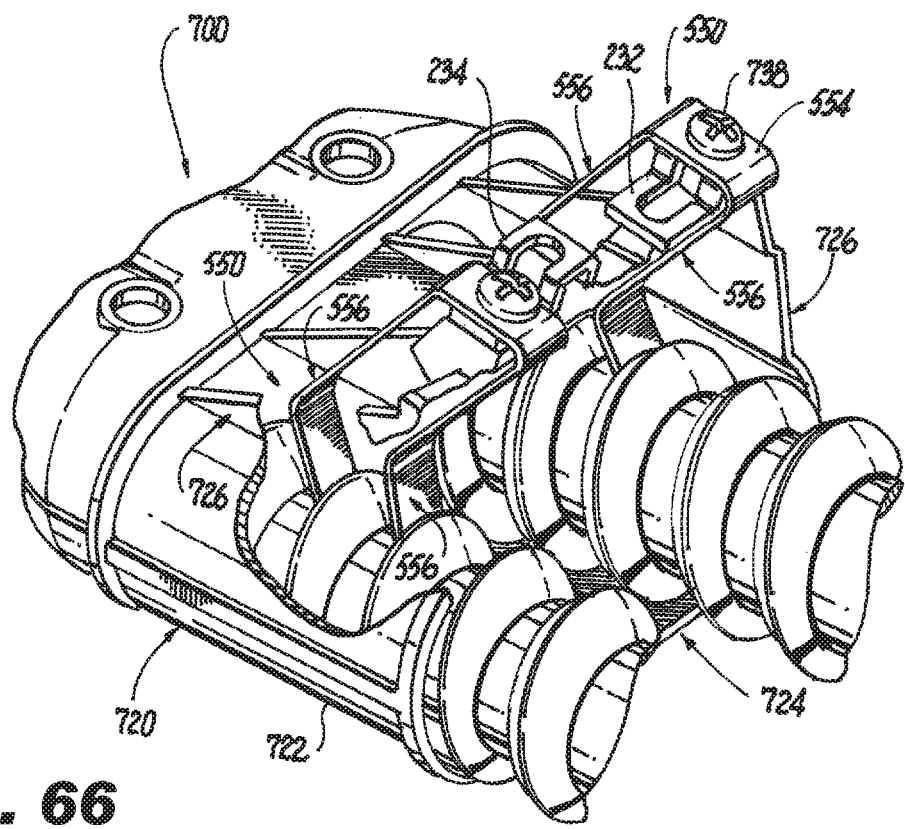
FIG. 66 is an enlarged view of the cable connector of FIG. 65 illustrating the two cables inserted into the cable connector and illustrating the two retaining members engaging a cable, the first shim mounted in the first position and the second shim in the second position.
Figure 67:
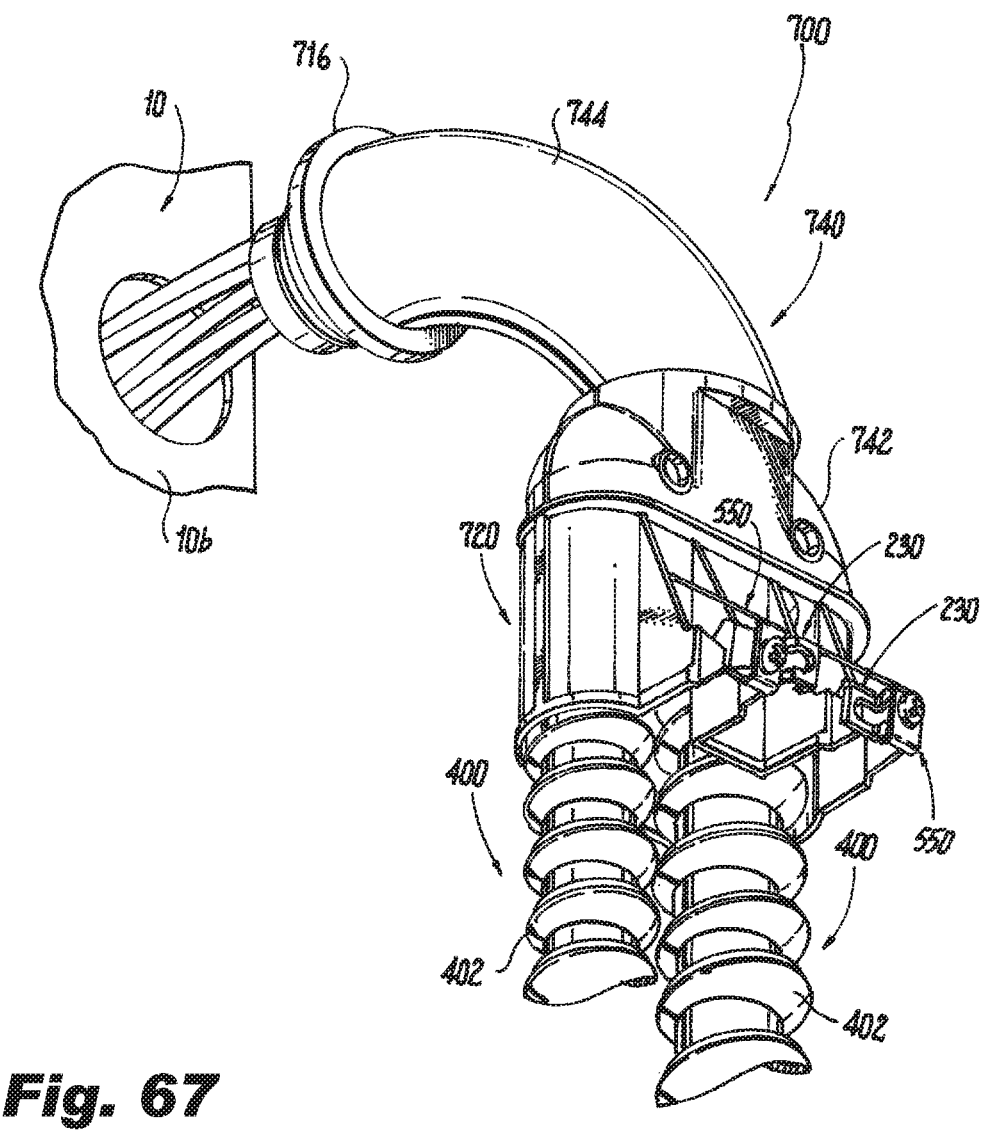
FIG. 67 is a perspective view of another exemplary embodiment of an angled cable connector according to the present disclosure that is capable of receiving multiple cables.

Referring to FIGS. 30-32, 64-66, there may be instances where the cable retaining member 550 may need to be repositioned to receive and secure large diameter cables to the cable connector 700. To adjust the height position of the cable retaining members 550 relative to the top wall 734 of each mounting bracket 726, one or more shims 230 can be inserted between the top wall 734 of the mounting bracket 726 and the base portion 554 of the cable retaining member 550 and secured to the mounting bracket with the fastener 738. Each shim 230 has at least one height position to adjust the height position of the of the cable retaining members 550 relative to the top wall 734 of each mounting bracket 726. In the exemplary embodiment shown, the shim 230 has two height positions. In this exemplary embodiment, each shim 230 is generally rectangular in shape and has a base portion 232, a step portion 234 and a slot 236 extending from the base portion 232 to the step portion 236 so that the shim can be positioned on the top wall 734 as described below. The base portion 232 has a height "H2," seen in FIG. 32, that can raise the legs 556 of the cable retaining member 550 relative to the central opening 724 of the cable receiving portion 720 by the height "H2." As shown in FIGS. 65 and 66, when the base portion 232 of the shim 230 is positioned between the base portion 554 of the cable retaining member 550 and the top wall 734 of the mounting bracket 726, the fastener 738 can be tightened to secure the shim 230 to the mounting bracket 726 so as to adjust the position of the cable retaining member 550 relative to the central opening 724 of the cable receiving portion 740 of the cable connector 700. Similarly, the step portion 234 has a height "H3," seen in FIG. 32, that can raise the legs 556 of the cable retaining member 550 relative to the central opening 724 of the cable receiving portion 740 by the height "H3." As shown in FIGS. 65 and 66, when the step portion 234 of the shim 230 is positioned between the base portion 554 of the cable retaining member 550 and the top wall 734 of a mounting bracket 726, the fastener 738 can be tightened to secure the shim 230 to the mounting bracket 726 so as to adjust the position of the cable retaining member 550 relative to central opening 724 of the cable receiving portion 720.

Figure 68:
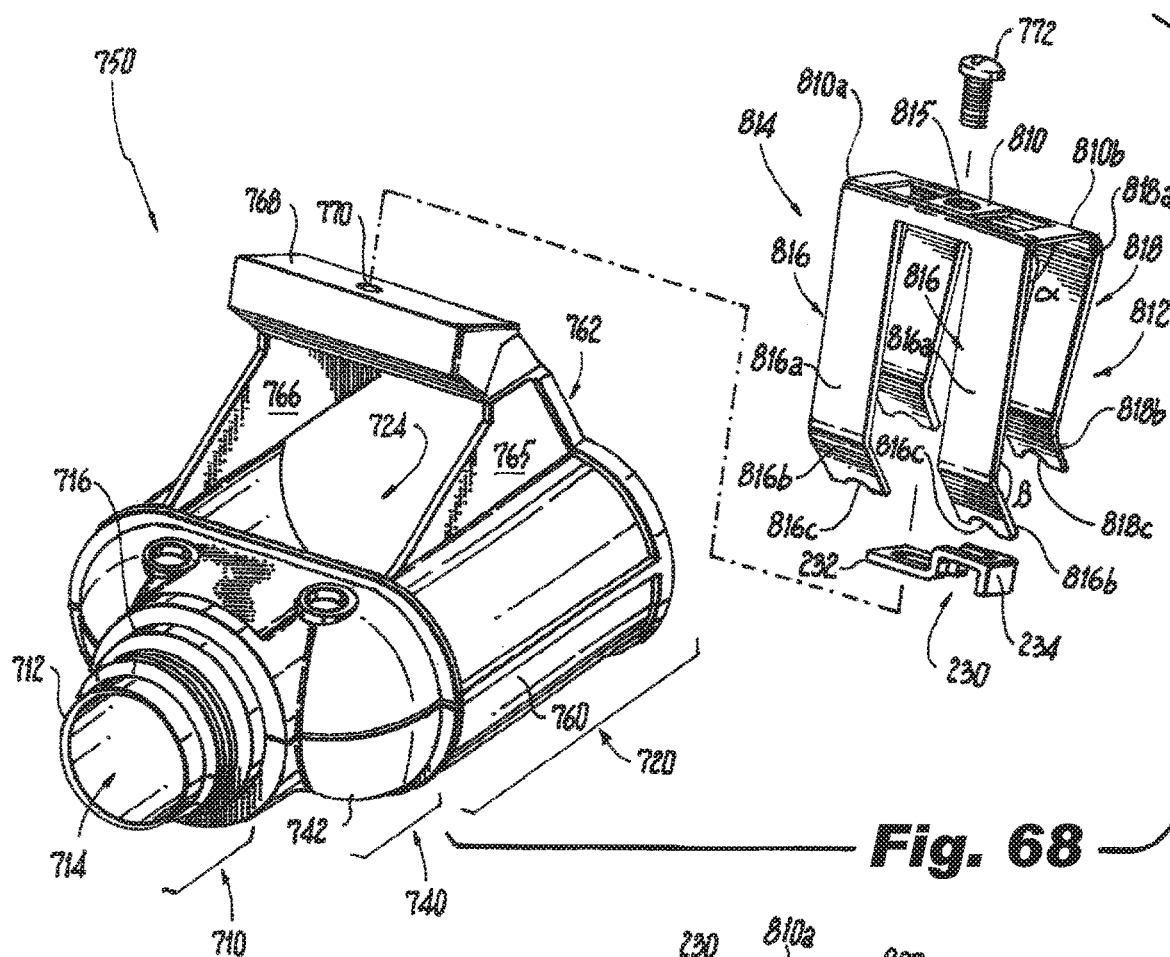
FIG. 68 is a front perspective view with parts separated of another exemplary embodiment of a cable connector according to the present disclosure, illustrating a retaining member having a base and multiple legs extending from the base and a shim associated with the retaining member.
Figure 69:
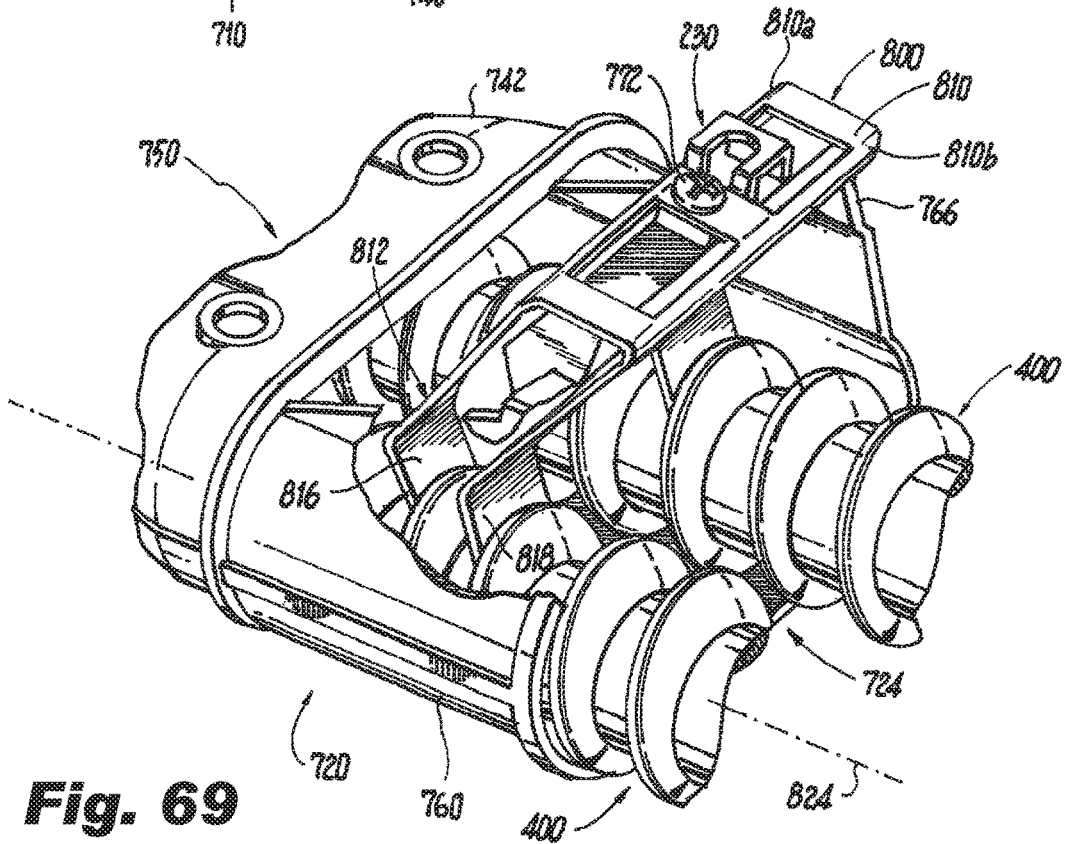
FIG. 69 is a rear perspective of the cable connector of FIG. 68, illustrating two cables inserted into the cable connector, and illustrating the retaining member attached to a mounting bracket of the cable connector and engaging each cable with the shim in a first position.
Figure 70:
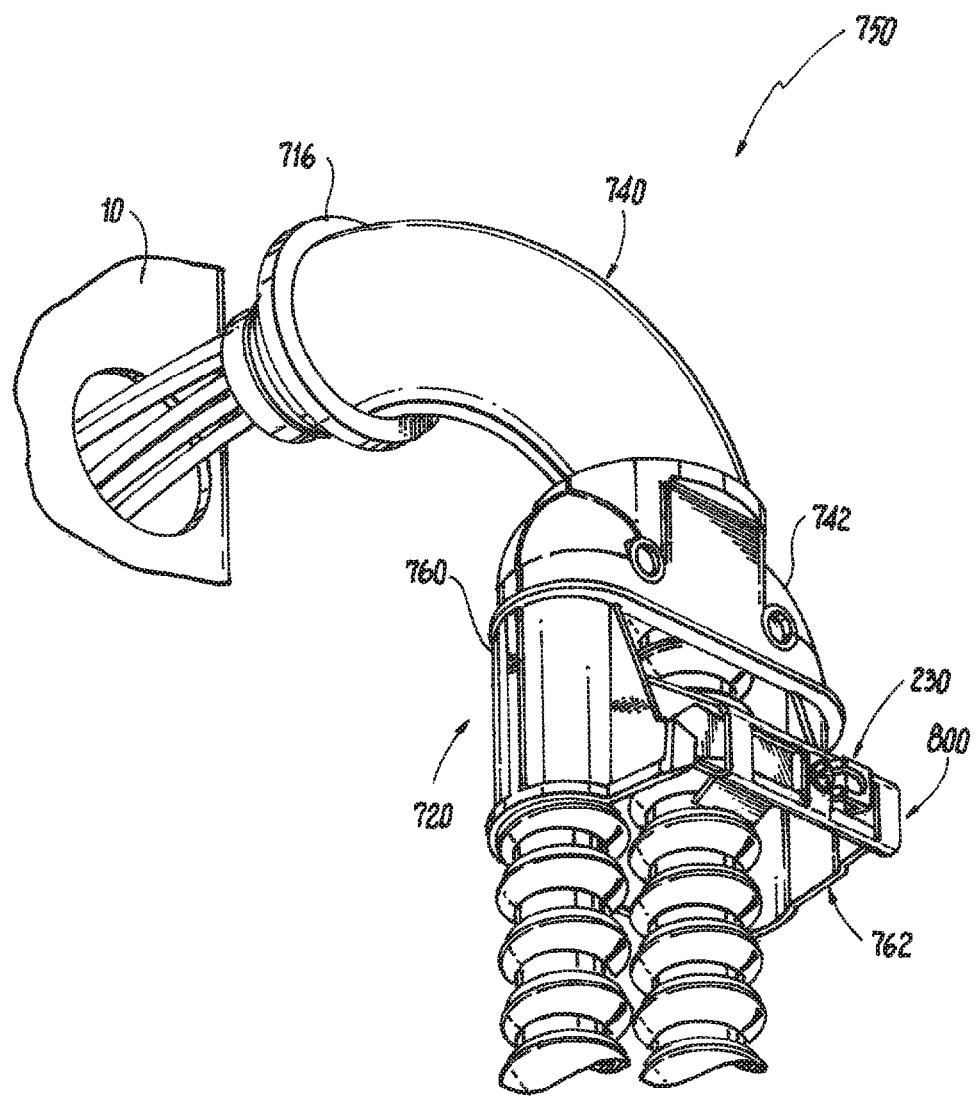
FIG. 70 is a rear perspective view of another exemplary embodiment of an angled cable connector according to the present disclosure, illustrating a retaining member similar to the retaining member in FIG. 68 having a base and multiple leg pairs extending from the base and a shim associated with the retaining member.

In the exemplary embodiment of FIGS. 68-70, another electrical box assembly according to the present disclosure is shown. In this exemplary embodiment, the electrical box assembly includes an electrical box 10 and one or more cable connectors 750. The electrical box 10 is described above and for ease of description is not repeated. The cable connector 750 is substantially similar to the cable connector 700 described above, except that the cable receiving portion 720 and the one or more retaining members differ. Therefore, for ease of description, the common features between the cable connector 700 of FIGS. 63-67 and the cable connector 750 of 68-70 are not repeated. In this exemplary embodiment, the cable connector 750 is a dual connector capable of receiving two electrical cables. The cable connector 750 has a box mounting portion 710, a cable receiving portion 720 and an intermediate portion 740, seen in FIG. 68.

The cable receiving portion 720 of the cable connector 750 includes a wall 760 having a central opening 724, a mounting bracket 762 that extends from the wall 722 from one side of the wall 722 to another side of the wall 722, as shown in FIG. 68. The cable connector 750 also includes a cutout 764 in the wall 760, seen in FIG. 68, that permits one or more legs 816 and 818 (described below) of a cable retaining member 800 to pass into the central opening 724. In the exemplary embodiment shown, the mounting bracket 762 has two side walls 764 and 766 and a top wall 768 connected between the side walls 764 and 766 as shown. The side walls 764 and 766 may be inclined walls, as shown in FIG. 68, or they may be straight walls. The top wall 768 of the mounting bracket 762 is configured to permit the base portion 810 of the cable retaining member 800 to rest. The top wall 768 may be at an angle relative to a central axis 562 of the cable receiving portion 720 or the top wall 768 may be parallel to the central axis 562 of the cable receiving portion 720. The top wall 768 includes a mounting aperture 770, e.g., a threaded or tapped opening seen in FIG. 68, configured to receive a mounting fastener, e.g., threaded set screws. More specifically, the mounting aperture 770 is configured to receive a mounting fastener 772, seen in FIG. 68, used to secure the cable retaining member 800 to the top wall 768 of the cable connector 700.

Continuing to refer to FIGS. 68-70, the cutout 764 in the wall 760 is positioned between the side walls 764 and 766 of the mounting bracket 762 and aligned with the top wall 768. The cutout 764 is generally rectangular in shape and extends along a portion of the wall 760 and is sufficient to permit the legs 816 and 818 of a cable retaining member 800 to pass into the central opening 724 in the cable receiving portion 720 of the cable connector 750. While the cutout 764 is shown as a generally square shape, one skilled in the art would readily recognize that the cutout can be in any shape suitable to provide access to the central opening 724 in the cable receiving portion 720.

Continuing to refer to FIGS. 68-70, the cable retaining member 800 includes one or more flexible legs that are able to flex while an electrical cable passes into the opening 724 in the cable receiving portion 720 imparting little resistance to the forward advancement of the cable within the cable receiving portion 720 while imparting sufficient resistance to rearward movement of the cable to prevent withdrawal of the cable from the cable receiving portion. In other words, the flexible legs extending into the opening 724 can engage an electrical cable and hold the electrical cable while preventing withdrawal of the electrical cable from the cable receiving portion 720.

The cable retaining member 800 may be provided in various shapes and sizes sufficient to flex while an electrical cable passes into the opening 724 in the cable receiving portion 720. The cable retaining member 800 includes a base portion 810 having a first cable retaining member 812 on one side of the base portion 810 and a second cable retaining member 814 on another side of the base portion 810. The base portion 810 is generally straight and includes an aperture 815 used in securing the retaining member 800 to the top wall 768 of the mounting bracket 762. The first cable retaining member 812 includes at least one leg extending from the base portion 810. In the exemplary embodiment shown, the first cable retaining member 812 has two legs 816 and 818 extending from the base portion 810. Similarly, the second cable retaining member 814 includes at least one leg extending from the base portion 810. In the exemplary embodiment shown, the second cable retaining member 812 has two legs 820 and 822 extending from the base portion 810.

The first leg 816 of the first cable retaining member 812 has a substantially straight main body 816a that extends from a front edge 810a of the base portion 810 at an angle "α", and an end portion 816b that is at an angle "β" relative to the main body 816a. As such, the leg 816 is cantilevered from the base portion 810 at the point where the base portion 810 connects to the leg 816. This cantilever permits flexibility of the first leg 816 relative to the base portion 810, which is secured to the top wall 768 of the mounting bracket 762. The angle "α" may depend upon a number of factors, including, the length of the leg portion 816, and the angle between the base portion 810 and a central axis 824 of the cable receiving portion 720, seen in FIG. 69. As a non-limiting example, the angle "α" can be about 145 degrees, which provides suitable flexibility of the first retaining member 812 to allow insertion of a cable into the opening 724 in the cable receiving portion 720, while imparting sufficient resistance to rearward movement of the cable to prevent withdrawal of the cable from the cable receiving portion 720. The angle "β" may depend upon a number of factors, including the angle "α" and the angle between the base portion 810 and the central axis 824 of the cable receiving portion 720, seen in FIG. 69. As a non-limiting example, the angle "β" can be about 145 degrees. The end portion 816b of the first leg 816 may include an arcuate portion 816c that is configured to substantially conform to an outer periphery of the sheathing of an electrical cable, and to engage the sheathing of the electrical cable.

If the first cable retainer member 812 includes a second leg 818, the second leg 818 may include a substantially straight main body 818a that extends from a rear edge 810b of the base portion 810 at an angle "α", and an end portion 816b that is at an angle "β" relative to the main body 818a. As such, the leg 818 is cantilevered from the base portion 810 at the point where the base portion 810 connects to the leg 818. This cantilever permits flexibility of the second leg 818 relative to the base portion 810, which is secured to the top wall 768 of the mounting bracket 762. The angle "α" may depend upon a number of factors, including, the length of the leg portion 818, and the angle between the base portion 810 and a central axis 824 of the cable receiving portion 720, seen in FIG. 69. As a non-limiting example, the angle "α" can be about 145 degrees, which provides suitable flexibility of the first retaining member 812 to allow insertion of a cable into the opening 724 in the cable receiving portion 720, while imparting sufficient resistance to rearward movement of the cable to prevent withdrawal of the cable from the cable receiving portion 720. The angle "β" may depend upon a number of factors, including the angle "α" and the angle between the base portion 810 and the central axis 824 of the cable receiving portion 720, seen in FIG. 69. As a non-limiting example, the angle "β" can be about 145 degrees. The end portion 818b of the second leg 818 may include an arcuate portion 818c that is configured to substantially conform to an outer periphery of the sheathing of an electrical cable, and to engage the sheathing of the electrical cable.

In the exemplary embodiment of FIGS. 68 and 69, the intermediate portion 740 of the cable connector 750 is a reducing member, e.g., a T-shaped like member, as described above. In the exemplary embodiment of FIG. 70, the intermediate portion 740 of the cable connector 750 has the reducing member 742, e.g., a T-shaped like member, with a curved or angled hollow tube 744 between the flange 716 of the box receiving portion 710 and the reducing member 742 as described above.

Referring to FIGS. 30-32, 68-70, there may be instances where the cable retaining member 800 may need to be repositioned to receive and secure large diameter cables to the cable connector. To adjust the height position of the cable retaining members 800 relative to the top wall 768 of the mounting bracket 762, one or more shims 230 can be inserted between the top wall 768 of the mounting bracket 762 and the base portion 810 of the cable retaining member 800 and secured to the mounting bracket 762 with fastener 772. Each shim 230 has at least one height position to adjust the height position of the of the cable retaining members 800 relative to the top wall 768 of the mounting bracket 762. In the exemplary embodiment shown, the shim 230 has two height positions. In this exemplary embodiment, each shim 230 is generally rectangular in shape and has a base portion 232, a step portion 234 and a slot 236 extending from the base portion 232 to the step portion 236 so that the shim can be positioned on the top wall 768 as described below. The base portion 232 has a height "H2," seen in FIG. 32, that can raise the legs 816 and 818 of the cable retaining member 800 relative to the central opening 764 of the cable receiving portion 720 by the height "H2." As shown in FIGS. 65 and 66, when the base portion 232 of the shim 230 is positioned between the base portion 810 of the cable retaining member 800 and the top wall 768 of the mounting bracket 762, the fastener 772 can be tightened to secure the shim 230 to the mounting bracket 762 so as to adjust the position of the cable retaining member 800 relative to the central opening 724 of the cable receiving portion 720 of the cable connector 750. Similarly, the step portion 234 has a height "H3," seen in FIG. 32, that can raise the legs 816 and 818 of the cable retaining member 800 relative to the central opening 724 of the cable receiving portion 720 by the height "H3." As shown in FIGS. 65 and 66, when the step portion 234 of the shim 230 is positioned between the base portion 810 of the cable retaining member 800 and the top wall 768 of a mounting bracket 762, the fastener 772 can be tightened to secure the shim 230 to the mounting bracket 762 so as to adjust the position of the cable retaining member 800 relative to central opening 724 of the cable receiving portion 720.

Figure 71:
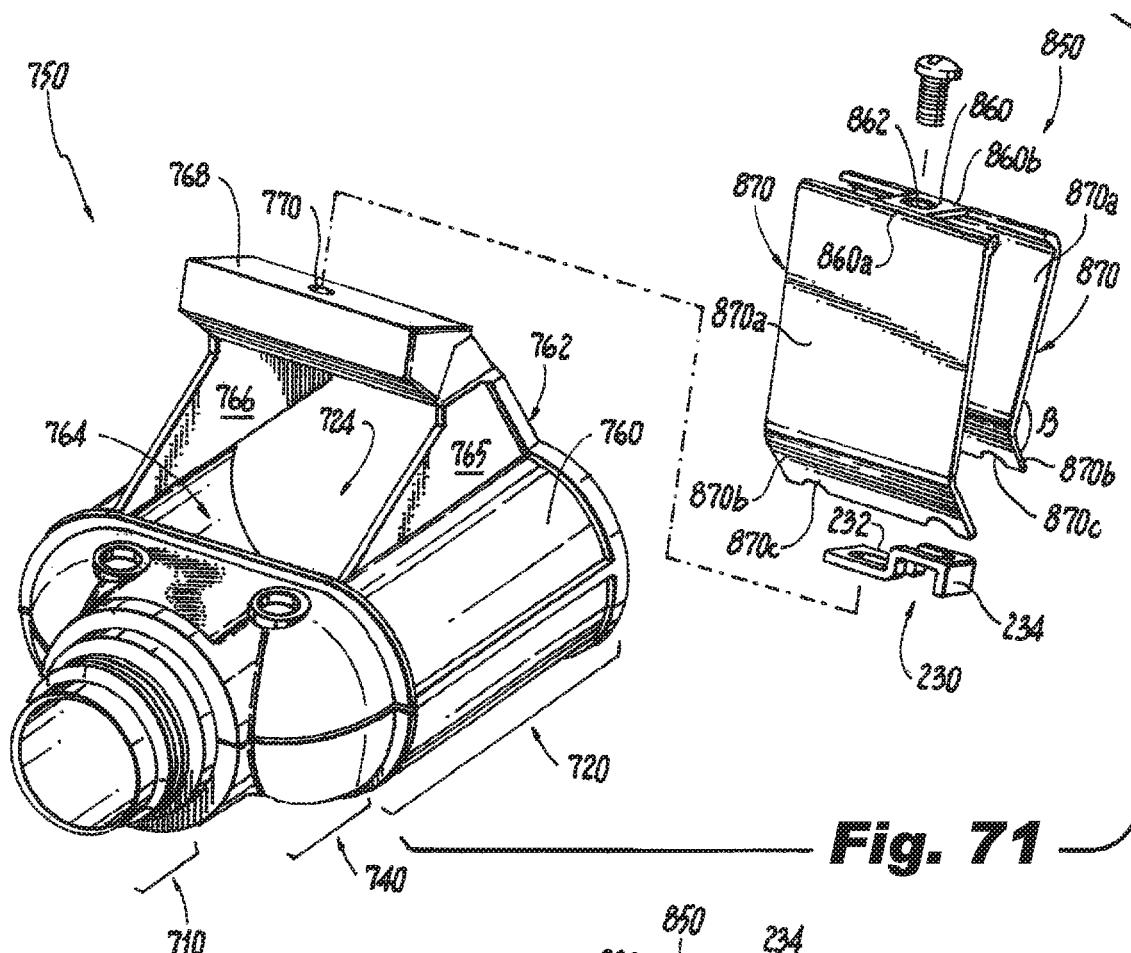
FIG. 71 is a front perspective view with parts separated of another exemplary embodiment of a cable connector according to the present disclosure, illustrating a retaining member having a base and a single leg pair extending from the base and a shim mounted to the mounting bracket in a first position.
Figure 72:
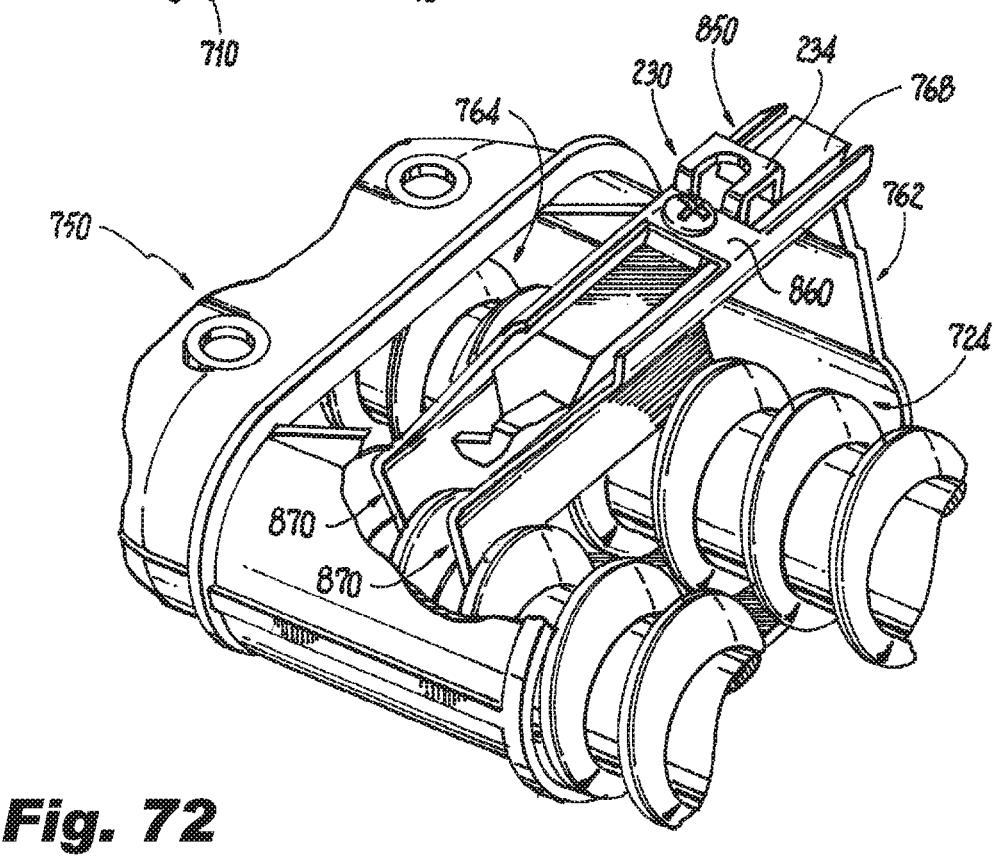
FIG. 72 is a rear perspective of the cable connector of FIG. 71, illustrating two cables inserted into the cable connector, and illustrating the retaining member attached to a mounting bracket of the cable connector and engaging each cable with the shim in a first position.
Figure 73:
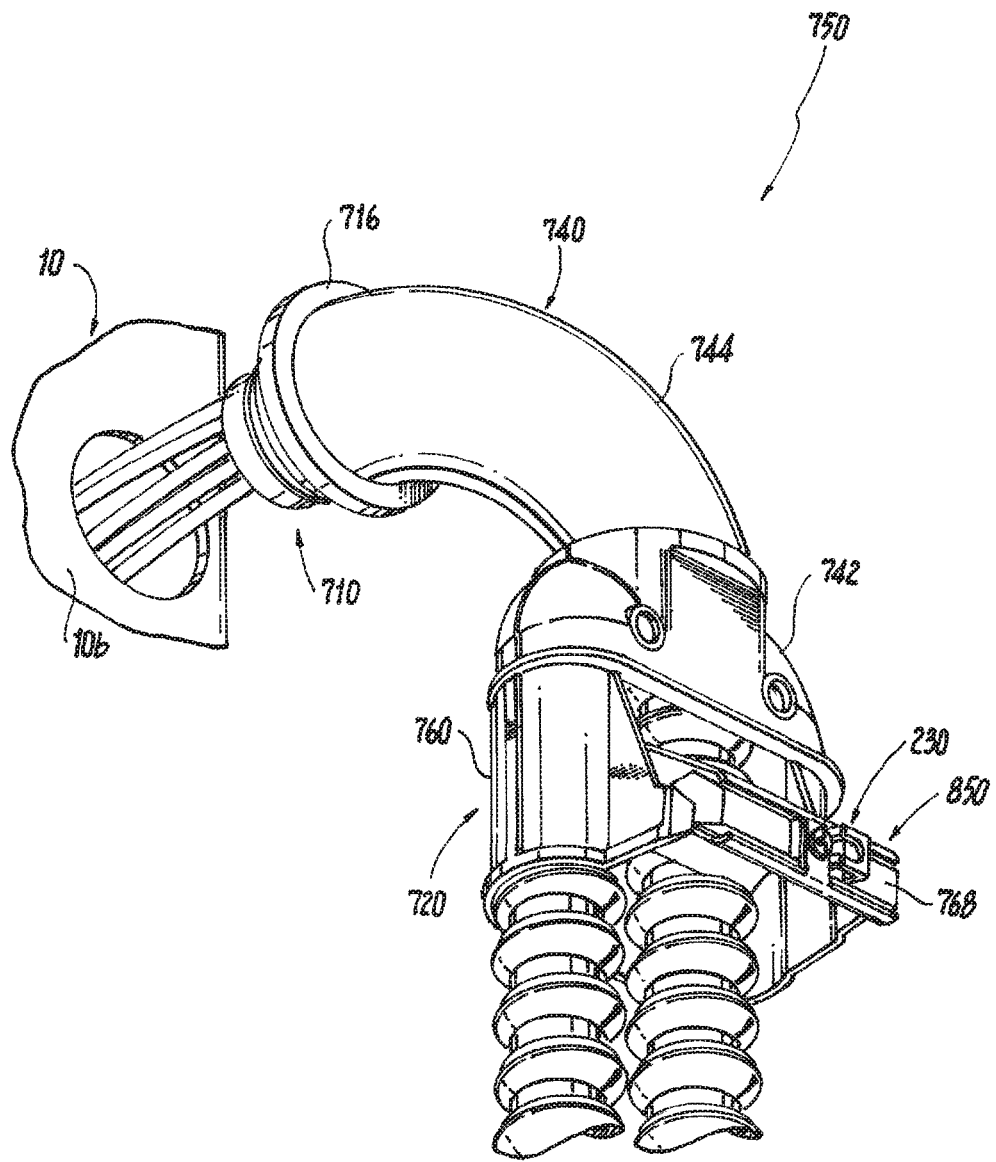
FIG. 73 is a rear perspective view of another exemplary embodiment of an angled cable connector according to the present disclosure, illustrating a retaining member similar to the retaining member in FIG. 71 having a base and a single leg pair extending from the base and a shim mounted to the mounting bracket in a first position.

In the exemplary embodiment of FIGS. 71-73, another electrical box assembly according to the present disclosure is shown. In this exemplary embodiment, the electrical box assembly includes an electrical box 10 and one or more cable connectors 750. The electrical box 10 is described above and for ease of description is not repeated. The cable connector 750 is substantially similar to the cable connector 750 described above and for ease of description is not repeated, except that the one or more retaining members differ.

Continuing to refer to FIGS. 61-73, the cable retaining member 850 includes one or more flexible legs that are able to flex while an electrical cable passes into the opening 724 in the cable receiving portion 720 imparting little resistance to the forward advancement of the cable within the cable receiving portion 720 while imparting sufficient resistance to rearward movement of the cable to prevent withdrawal of the cable from the cable receiving portion. In other words, the flexible legs extending into the opening 724 can engage an electrical cable and hold the electrical cable while preventing withdrawal of the electrical cable from the cable receiving portion 720.

The cable retaining member 850 may be provided in various shapes and sizes sufficient to flex while an electrical cable passes into the opening 724 in the cable receiving portion 720. The cable retaining member 850 includes a base portion 860 that is generally straight and includes an aperture 862 used in securing the retaining member 850 to the top wall 768 of the mounting bracket 762. The cable retaining member 850 also includes at least one leg 870 extending from the base portion 860. In the exemplary embodiment shown, the cable retaining member 850 has two legs 870 extending from the base portion 860. Each leg 870 of the cable retaining member 850 has a substantially straight main body 870a that extends from a front edge 860a of the base portion 860 at an angle "α" which is similar to the angle "α" described herein. An end portion 870b of the base portion 860 is at an angle "β" relative to the main body 870a. The angle "β" is similar to the angle "β" described herein. As such, the leg 870 is cantilevered from the base portion 860 at the point where the base portion 860 connects to the leg 870. This cantilever permits flexibility of the leg 870 relative to the base portion 860, which is secured to the top wall 768 of the mounting bracket 762. The end portion 870b of the leg 870 may include an arcuate portion 870c that is configured to substantially conform to an outer periphery of the sheathing of an electrical cable, and to engage the sheathing of the electrical cable. In the exemplary embodiment of FIGS. 71-73, each leg 870 has a sufficient width so that the leg 870 can engage two electrical cable passing through the opening 724 in the cable receiving portion 720 as shown in FIG. 72.

In the exemplary embodiment of FIGS. 71 and 72, the intermediate portion 740 of the cable connector 750 is a reducing member, e.g., a T-shaped like member, as described above. In the exemplary embodiment of FIG. 73, the intermediate portion 740 of the cable connector 750 has the reducing member 742, e.g., a T-shaped like member, with a curved or angled hollow tube 744 between the flange 716 of the box receiving portion 710 and the reducing member 742 as described above.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. An electrical cable connector comprising:
   a box mounting portion having a cylindrical mounting portion wall with a center opening, one or more box attaching members extending from the mounting portion wall and a flange around the mounting portion wall in close proximity to the one or more box attaching members, the one or more box attaching members and flange being used to releasably attach the cable connector to an electrical box;
   a cable receiving portion having a cylindrical receiving portion wall with a center opening dimensioned to receive an electrical cable, at least one mounting bracket extending from the receiving portion wall and a cutout in the receiving portion wall;
   an intermediate portion between the box mounting portion and the cable receiving portion, the intermediate portion having a cylindrical intermediate portion wall with a center opening, wherein the center opening in the box mounting portion, the center opening in the cable receiving portion and the center opening in the intermediate portion are aligned so that electrical wires within the electrical cable can pass from the cable receiving portion to the box mounting portion;
   at least one cable retaining member having a base portion releasably secured to the at least one mounting bracket and at least one leg extending from the base portion into the cutout in the receiving portion wall such that the at least one leg can engage sheathing of the electrical cable within the opening in the cable receiving portion, wherein the at least one leg is able to flex while the sheathing is passed through the opening in the cable receiving portion imparting little resistance to the forward advancement of the sheathing within the opening in the cable receiving portion, while imparting sufficient resistance to rearward movement of the sheathing to prevent withdrawal of the electrical cable from the opening in the cable receiving portion; and
   at least one shim positioned between the base portion of the at least one cable retaining member and the at least one mounting bracket, the at least one shim having at least one height position used to adjust the positioned of the at least one cable retaining member relative to the opening in the cable receiving portion.

2. The electrical cable connector according to claim 1, wherein the at least one leg of the at least one cable retaining member comprises a first leg extending from one end of the base portion and a second leg extending from another end of the base portion.

3. The electrical cable connector according to claim 1, wherein the base portion is secured to the at least one mounting bracket such that the first and second legs straddle the at least one mounting bracket and extend into the cutout.

4. The electrical cable connector according to claim 1, wherein the at least one cable retaining member comprises a plurality of cable retaining members, and wherein the base portion of the cable retaining members is secured to the at least one mounting bracket.

5. The electrical cable connector according to claim 4, wherein the receiving portion wall includes a plurality of cutouts, wherein one cutout is associated with one cable retaining member, and wherein the at least one leg of one cable retaining member extends through the associated cutout into the opening in the cable receiving portion.

6. The electrical cable connector according to claim 5, wherein the at least one leg of each cable retaining member comprises a first leg extending from one end of the base portion and a second leg extending from another end of the base portion, and wherein the first leg extends through the associated cutout into the opening in the cable receiving portion.

7. The electrical cable connector according to claim 6, wherein the base portion is secured to the mounting bracket such that the first and second legs straddle the mounting bracket and extend into the opening in the cable receiving portion.

8. The electrical cable connector according to claim 1, wherein the at least one mounting bracket comprises a plurality of mounting brackets, wherein the at least one cable retaining member comprises a plurality of cable retaining members, and wherein the base portion of one of the cable retaining members is secured to one of the mounting brackets.

9. The electrical cable connector according to claim 8, wherein the at least one shim comprises a plurality of shims, and wherein one shim is positioned between the base portion of one of the cable retaining members and one of the mounting brackets.

10. The electrical cable connector according to claim 1, wherein intermediate portion wall is straight.

11. The electrical cable connector according to claim 1, wherein intermediate portion wall is curved.

12. An electrical box assembly comprising:
- an electrical box having four side walls and a bottom wall, at least one of the side walls or the bottom wall having at least one knockout that when removed creates an opening into an interior of the electrical box; and
- at least one cable connector that can be releasably secured to the electrical box through the knockout opening, wherein the at least one cable connector comprises:
  - a box mounting portion having a cylindrical mounting portion wall with a center opening, one or more box attaching members extending from the mounting portion wall and a flange around the mounting portion wall in close proximity to the one or more box attaching members, the one or more box attaching members and flange being used to releasably attach the cable connector to an electrical box;
  - a cable receiving portion having a cylindrical receiving portion wall with a center opening dimensioned to receive an electrical cable, at least one mounting bracket extending from the receiving portion wall and a cutout in the receiving portion wall;
  - an intermediate portion between the box mounting portion and the cable receiving portion, the intermediate portion having a cylindrical intermediate portion wall with a center opening, wherein the center opening in the box mounting portion, the center opening in the cable receiving portion and the center opening in the intermediate portion are aligned so that electrical wires within the electrical cable can pass from the cable receiving portion to the box mounting portion;
  - at least one cable retaining member having a base portion releasably secured to the at least one mounting bracket and at least one leg extending from the base portion into the cutout in the receiving portion wall such that the at least one leg can engage sheathing of the electrical cable within the opening in the cable receiving portion, wherein the at least one leg is able to flex while the sheathing is passed through the opening in the cable receiving portion imparting little resistance to the forward advancement of the sheathing within the opening in the cable receiving portion, while imparting sufficient resistance to rearward movement of the sheathing to prevent withdrawal of the electrical cable from the opening in the cable receiving portion; and
  - at least one shim positioned between the base portion of the at least one cable retaining member and the at least one mounting bracket, the at least one shim having at least one height position used to adjust the positioned of the at least one cable retaining member relative to the opening in the cable receiving portion.

13. The electrical box assembly according to claim 12, wherein the at least one leg of the at least one cable retaining member comprises a first leg extending from one end of the base portion and a second leg extending from another end of the base portion.

14. The electrical box assembly according to claim 12, wherein the base portion is secured to the at least one mounting bracket such that the first and second legs straddle the at least one mounting bracket and extend into the cutout.

15. The electrical box assembly according to claim 12, wherein the at least one cable retaining member comprises a plurality of cable retaining members, and wherein the base portion of the cable retaining members is secured to the at least one mounting bracket.

16. The electrical box assembly according to claim 15, wherein the receiving portion wall includes a plurality of cutouts, wherein one cutout is associated with one cable retaining member, and wherein the at least one leg of one cable retaining member extends through the associated cutout into the opening in the cable receiving portion.

17. The electrical box assembly according to claim 16, wherein the at least one leg of each cable retaining member comprises a first leg extending from one end of the base portion and a second leg extending from another end of the base portion, and wherein the first leg extends through the associated cutout into the opening in the cable receiving portion.

18. The electrical box assembly according to claim 17, wherein the base portion is secured to the mounting bracket such that the first and second legs straddle the mounting bracket and extend into the opening in the cable receiving portion.

19. The electrical box assembly according to claim 12, wherein the at least one mounting bracket comprises a plurality of mounting brackets, wherein the at least one cable retaining member comprises a plurality of cable retaining members, and wherein the base portion of one of the cable retaining members is secured to one of the mounting brackets.

20. The electrical box assembly according to claim 19, wherein the at least one shim comprises a plurality of shims, and wherein one shim is positioned between the base portion of one of the cable retaining members and one of the mounting brackets.

21. The electrical box assembly according to claim 12, wherein intermediate portion wall is straight.

22. The electrical box assembly according to claim 12, wherein intermediate portion wall is curved.

23. The electrical box assembly according to claim 12, wherein the electrical box and at least one cable connector are made of metal.

24. The electrical box assembly according to claim 12, wherein the electrical box and at least one cable connector are made of a non-metallic material.

* * * * *